(12) United States Patent
Higley et al.

(10) Patent No.: US 12,124,093 B2
(45) Date of Patent: Oct. 22, 2024

(54) ADAPTER FOR SMALL FORM FACTOR DUPLEX FIBER OPTIC CONNECTORS

(71) Applicant: US Conec Ltd., Hickory, NC (US)

(72) Inventors: Jason Higley, Hickory, NC (US); Jillcha F Wakjira, Hickory, NC (US); Mitchell Cloud, Hickory, NC (US); Darrell R. Childers, Hickory, NC (US); Michael E. Hughes, Hickory, NC (US)

(73) Assignee: US Conec Ltd., Hickory, NC (US)

( * ) Notice: Subject to any disclaimer, the term of this patent is extended or adjusted under 35 U.S.C. 154(b) by 0 days.

(21) Appl. No.: 18/430,906

(22) Filed: Feb. 2, 2024

(65) Prior Publication Data

US 2024/0168243 A1     May 23, 2024

Related U.S. Application Data

(60) Division of application No. 18/502,775, filed on Nov. 6, 2023, which is a continuation of application No. 18/349,919, filed on Jul. 10, 2023, now Pat. No. 11,808,994, which is a continuation of application No. 18/057,342, filed on Nov. 21, 2022, now Pat. No. 11,733,466, which is a continuation of application (Continued)

(51) Int. Cl.
    *G02B 6/38*      (2006.01)

(52) U.S. Cl.
    CPC ......... *G02B 6/3898* (2013.01); *G02B 6/3812* (2013.01); *G02B 6/3825* (2013.01); *G02B 6/3857* (2013.01); *G02B 6/3893* (2013.01)

(58) Field of Classification Search
CPC .. G02B 6/3898; G02B 6/3812; G02B 6/3825; G02B 6/3857; G02B 6/3893; G02B 6/3821; G02B 6/3879
See application file for complete search history.

(56) References Cited

U.S. PATENT DOCUMENTS 3,721,945 A * 3/1973 Hults ..................... H01R 13/20
                                                            439/846
4,150,790 A * 4/1979 Potter ....................... E01B 3/44
                                                                238/85

(Continued)

FOREIGN PATENT DOCUMENTS

WO        0242818 A1     5/2002
WO    2015191024 A1   12/2015

(Continued)

OTHER PUBLICATIONS

Extended European Search Report; dated Jul. 29, 2021; 8 pages.

(Continued)

*Primary Examiner* — Andrew Jordan
(74) *Attorney, Agent, or Firm* — Michael L Leetzow PLLC; Shubhrangshu Sengupta

(57) ABSTRACT

A new fiber optic connector provides a smaller form factor by including two ferrule assemblies in a housing. The housing accepts a push-pull mechanism that allows for insertion and removal from a carrier as well as an adapter. The push-pull mechanism may also include a flexure member to return the push-pull mechanism. Polarity of the fiber optic connector may also be selected by use of the push-pull mechanism.

20 Claims, 37 Drawing Sheets

Related U.S. Application Data

No. 17/328,574, filed on May 24, 2021, now Pat. No. 11,506,848, which is a continuation of application No. 16/462,897, filed as application No. PCT/US2018/066518 on Dec. 19, 2018, now Pat. No. 11,016,250.

(60) Provisional application No. 62/634,271, filed on Feb. 23, 2018, provisional application No. 62/607,555, filed on Dec. 19, 2017.

(56) References Cited

U.S. PATENT DOCUMENTS

| | | | | |
|---|---|---|---|---|
| 4,240,695 A * | 12/1980 | Evans | G02B 6/3854 | 385/62 |
| 4,327,964 A * | 5/1982 | Haesly | G02B 6/3897 | 385/136 |
| 4,478,473 A * | 10/1984 | Frear | H01R 13/622 | 439/312 |
| 4,611,887 A * | 9/1986 | Glover | G02B 6/3849 | 385/71 |
| 4,690,494 A * | 9/1987 | Hirose | G02B 6/3898 | 385/60 |
| 4,762,388 A * | 8/1988 | Tanaka | G02B 6/3893 | D13/133 |
| 4,762,389 A * | 8/1988 | Kaihara | G02B 6/3825 | 385/59 |
| 4,764,129 A * | 8/1988 | Jones | H01R 13/642 | 439/680 |
| 4,798,440 A * | 1/1989 | Hoffer | G02B 6/4246 | 385/88 |
| 4,840,451 A * | 6/1989 | Sampson | G02B 6/4292 | 385/88 |
| 4,872,736 A * | 10/1989 | Myers | G02B 6/3893 | 439/352 |
| 4,979,792 A * | 12/1990 | Weber | G02B 6/3849 | 385/139 |
| 5,011,025 A * | 4/1991 | Lacey | B07B 13/04 | 209/673 |
| 5,016,968 A * | 5/1991 | Hammond | G02B 6/3831 | 385/78 |
| 5,026,138 A * | 6/1991 | Boudreau | G02B 6/4202 | 385/91 |
| 5,031,981 A * | 7/1991 | Peterson | G02B 6/3897 | 81/176.15 |
| 5,041,025 A * | 8/1991 | Haitmanek | H01R 13/6456 | 439/354 |
| 5,073,045 A * | 12/1991 | Abendschein | G02B 6/4246 | 385/90 |
| D323,143 S * | 1/1992 | Ohkura | D13/133 | |
| 5,101,463 A * | 3/1992 | Cubukciyan | G02B 6/389 | 385/71 |
| 5,136,672 A * | 8/1992 | Mulholland | G02B 6/3888 | 385/53 |
| 5,146,813 A * | 9/1992 | Stanfill, Jr. | B25B 13/48 | 81/111 |
| 5,159,652 A * | 10/1992 | Grassin D'Alphonse | G02B 6/3869 | 385/56 |
| 5,212,752 A * | 5/1993 | Stephenson | G02B 6/3843 | 385/139 |
| 5,265,181 A * | 11/1993 | Chang | G02B 6/3878 | 385/139 |
| 5,289,554 A * | 2/1994 | Cubukciyan | G02B 6/3831 | 385/83 |
| 5,315,679 A * | 5/1994 | Baldwin | G02B 6/3869 | 385/76 |
| 5,317,663 A * | 5/1994 | Beard | G02B 6/3825 | 385/70 |
| 5,321,784 A * | 6/1994 | Cubukciyan | G02B 6/3869 | 385/87 |
| 5,335,301 A * | 8/1994 | Newman | G02B 6/3878 | 385/139 |
| 5,348,487 A * | 9/1994 | Marazzi | G02B 6/381 | 439/138 |
| 5,418,875 A * | 5/1995 | Nakano | G02B 6/3825 | 385/88 |
| 5,444,806 A * | 8/1995 | de Marchi | G02B 6/3825 | 385/75 |
| 5,481,634 A * | 1/1996 | Anderson | G02B 6/3893 | 385/60 |
| 5,506,922 A * | 4/1996 | Grois | G02B 6/3825 | 385/75 |
| 5,521,997 A * | 5/1996 | Rovenolt | G02B 6/3831 | 385/75 |
| 5,570,445 A * | 10/1996 | Chou | G02B 6/4296 | 606/11 |
| 5,579,425 A * | 11/1996 | Lampert | G02B 6/3869 | 385/59 |
| 5,588,079 A * | 12/1996 | Tanabe | G02B 6/3869 | 385/78 |
| 5,602,951 A * | 2/1997 | Shiota | G02B 6/3839 | 385/71 |
| 5,619,604 A * | 4/1997 | Shiflett | G02B 6/3869 | 385/55 |
| 5,684,903 A * | 11/1997 | Kyomasu | G02B 6/4292 | 385/94 |
| 5,687,268 A * | 11/1997 | Stephenson | G02B 6/3849 | 385/73 |
| 5,737,463 A * | 4/1998 | Weiss | G02B 6/3839 | 385/59 |
| 5,737,464 A * | 4/1998 | Underwood | G02B 6/3874 | 385/60 |
| 5,781,681 A * | 7/1998 | Manning | G02B 6/4478 | 385/136 |
| 5,845,036 A * | 12/1998 | De Marchi | G02B 6/3825 | 385/139 |
| 5,862,282 A * | 1/1999 | Matsuura | G02B 6/3825 | 385/86 |
| 5,879,173 A * | 3/1999 | Poplawski | G02B 6/4284 | 439/138 |
| 5,896,479 A * | 4/1999 | Vladic | G02B 6/3839 | 385/59 |
| 5,915,987 A * | 6/1999 | Reed | H01R 13/6275 | 439/258 |
| 5,930,426 A * | 7/1999 | Harting | G02B 6/3825 | 385/139 |
| 5,937,130 A * | 8/1999 | Amberg | G02B 6/44528 | 385/139 |
| 5,953,473 A * | 9/1999 | Shimotsu | G02B 6/3807 | 385/56 |
| 5,956,444 A * | 9/1999 | Duda | G02B 6/3825 | 385/140 |
| 5,971,626 A * | 10/1999 | Knodell | G02B 6/3825 | 385/60 |
| 6,019,521 A * | 2/2000 | Manning | G02B 6/3888 | 385/76 |
| 6,041,155 A * | 3/2000 | Anderson | G02B 6/3825 | 385/139 |
| 6,049,040 A * | 4/2000 | Biles | H02G 3/0487 | 174/101 |
| 6,059,461 A * | 5/2000 | Aoki | G02B 6/3879 | 385/59 |
| 6,095,862 A * | 8/2000 | Doye | H01R 13/6584 | 439/138 |
| 6,134,370 A * | 10/2000 | Childers | G02B 6/4478 | 385/86 |
| 6,178,283 B1 * | 1/2001 | Weigel | G02B 6/38875 | 385/139 |
| RE37,080 E * | 3/2001 | Stephenson | G02B 6/3831 | 385/139 |
| 6,206,577 B1 * | 3/2001 | Hall, III | G02B 6/3825 | 439/138 |
| 6,206,581 B1 * | 3/2001 | Driscoll | G02B 6/3869 | 385/139 |
| 6,227,717 B1 * | 5/2001 | Ott | G02B 6/3849 | 385/139 |

(56) References Cited

U.S. PATENT DOCUMENTS

| | | | | |
|---|---|---|---|---|
| 6,234,682 B1* | 5/2001 | Nagaoka | G02B 6/3878 | 385/59 |
| 6,238,104 B1* | 5/2001 | Yamakawa | G02B 6/3888 | 385/86 |
| 6,240,228 B1* | 5/2001 | Chen | G02B 6/3865 | 385/59 |
| 6,247,849 B1* | 6/2001 | Liu | G02B 6/3849 | 385/94 |
| 6,250,817 B1* | 6/2001 | Lampert | G02B 6/3879 | 385/76 |
| 6,267,606 B1* | 7/2001 | Poplawski | G02B 6/4292 | 361/752 |
| 6,276,840 B1* | 8/2001 | Weiss | G02B 6/3874 | 385/59 |
| 6,318,903 B1* | 11/2001 | Andrews | G02B 6/3825 | 385/77 |
| 6,352,373 B1* | 3/2002 | Yamaguchi | G02B 6/3869 | 385/60 |
| 6,364,537 B1* | 4/2002 | Maynard | G02B 6/3831 | 385/75 |
| 6,379,052 B1* | 4/2002 | de Jong | G02B 6/3806 | 385/59 |
| 6,422,759 B1* | 7/2002 | Kevern | G02B 6/3885 | 385/59 |
| 6,450,695 B1* | 9/2002 | Matsumoto | G02B 6/266 | 385/60 |
| 6,450,697 B1* | 9/2002 | Ngo | G02B 6/3817 | 385/72 |
| 6,461,054 B1* | 10/2002 | Iwase | G02B 6/3849 | 385/75 |
| 6,471,412 B1* | 10/2002 | Belenkiy | G02B 6/3825 | 385/139 |
| 6,485,194 B1* | 11/2002 | Shirakawa | G02B 6/3829 | 439/456 |
| 6,513,989 B1* | 2/2003 | Bleck | G02B 6/3897 | 385/60 |
| 6,527,450 B1* | 3/2003 | Miyachi | G02B 6/3888 | 385/56 |
| 6,530,696 B1* | 3/2003 | Ueda | G02B 6/3893 | 385/59 |
| 6,551,117 B2* | 4/2003 | Poplawski | H01R 13/6581 | 361/752 |
| 6,565,262 B2* | 5/2003 | Childers | G02B 6/3869 | 385/76 |
| 6,572,273 B1* | 6/2003 | Nguyen | G02B 6/3807 | 385/71 |
| 6,572,276 B1* | 6/2003 | Theis | G02B 6/387 | 385/78 |
| 6,579,014 B2* | 6/2003 | Melton | G02B 6/389 | 385/84 |
| 6,585,194 B1* | 7/2003 | Brushwood | B61L 5/10 | 246/220 |
| 6,634,796 B2* | 10/2003 | de Jong | G02B 6/3831 | 385/139 |
| 6,634,801 B1* | 10/2003 | Waldron | G02B 6/38875 | 385/86 |
| 6,648,520 B2* | 11/2003 | McDonald | G02B 6/3897 | 385/59 |
| 6,668,113 B2* | 12/2003 | Togami | G02B 6/4246 | 385/35 |
| 6,669,377 B2* | 12/2003 | Barnes | G02B 6/3865 | 385/71 |
| 6,682,228 B2* | 1/2004 | Rathnam | G02B 6/3869 | 385/59 |
| 6,685,362 B2* | 2/2004 | Burkholder | G02B 6/3849 | 439/607.34 |
| 6,695,486 B1* | 2/2004 | Falkenberg | G02B 6/3829 | 385/139 |
| 6,719,927 B2* | 4/2004 | Sakurai | G02B 6/3865 | 249/176 |
| 6,811,321 B1* | 11/2004 | Schmalzigaug | G02B 6/3849 | 385/59 |
| 6,817,272 B2* | 11/2004 | Holland | H01R 43/26 | 439/304 |
| 6,854,894 B1* | 2/2005 | Yunker | G02B 6/4255 | 385/53 |
| 6,869,227 B2* | 3/2005 | Del Grosso | G02B 6/3885 | 385/71 |
| 6,872,039 B2* | 3/2005 | Baus | F16B 19/109 | 411/347 |
| 6,935,789 B2* | 8/2005 | Gross, III | G02B 6/3847 | 385/59 |
| 6,985,665 B2* | 1/2006 | Baechtle | G02B 6/4472 | 385/136 |
| 7,036,993 B2* | 5/2006 | Luther | G02B 6/3885 | 385/64 |
| 7,052,186 B1* | 5/2006 | Bates | G02B 6/3879 | 385/139 |
| 7,077,576 B2* | 7/2006 | Luther | G02B 6/3821 | 385/86 |
| 7,090,407 B2* | 8/2006 | Melton | G02B 6/4429 | 385/62 |
| 7,090,509 B1* | 8/2006 | Gilliland | G02B 6/4277 | 439/76.1 |
| 7,091,421 B2* | 8/2006 | Kukita | G09F 3/20 | 439/491 |
| 7,111,990 B2* | 9/2006 | Melton | G02B 6/4433 | 385/103 |
| 7,113,679 B2* | 9/2006 | Melton | G02B 6/447 | 385/103 |
| D533,504 S * | 12/2006 | Lee | D13/133 | |
| D534,124 S * | 12/2006 | Taguchi | D13/133 | |
| 7,153,041 B2* | 12/2006 | Mine | G02B 6/4292 | 385/139 |
| 7,198,409 B2* | 4/2007 | Smith | G02B 6/381 | 385/53 |
| 7,207,724 B2* | 4/2007 | Gurreri | G02B 6/3881 | 385/58 |
| D543,146 S * | 5/2007 | Chen | D13/133 | |
| 7,258,493 B2* | 8/2007 | Milette | G02B 6/3831 | 439/680 |
| 7,264,402 B2* | 9/2007 | Theuerkorn | G02B 6/3821 | 385/71 |
| 7,281,859 B2* | 10/2007 | Mudd | G02B 6/3869 | 385/83 |
| 7,296,935 B1* | 11/2007 | Childers | G02B 6/3885 | 385/59 |
| D558,675 S * | 1/2008 | Chien | D13/133 | |
| 7,315,682 B1* | 1/2008 | En Lin | G02B 6/3849 | 385/58 |
| 7,325,976 B2* | 2/2008 | Gurreri | G02B 6/3831 | 439/680 |
| 7,325,980 B2* | 2/2008 | Pepe | G02B 6/3879 | 385/59 |
| 7,329,137 B2* | 2/2008 | Martin | H01R 13/501 | 439/344 |
| 7,354,291 B2* | 4/2008 | Caveney | H01R 13/6397 | 439/352 |
| 7,371,082 B2* | 5/2008 | Zimmel | G02B 6/3869 | 439/78 |
| 7,390,203 B2* | 6/2008 | Murano | G02B 6/3831 | 439/138 |
| D572,661 S * | 7/2008 | En Lin | D13/133 | |
| 7,399,123 B2* | 7/2008 | Barkus | G02B 6/38875 | 385/75 |
| 7,431,604 B2* | 10/2008 | Waters | H01R 13/582 | 439/344 |
| 7,463,803 B2* | 12/2008 | Cody | G02B 6/4475 | 385/103 |
| 7,465,180 B2* | 12/2008 | Kusuda | H01R 13/6272 | 439/352 |
| 7,473,124 B1* | 1/2009 | Briant | H01R 13/629 | 439/352 |
| 7,510,335 B1* | 3/2009 | Su | G02B 6/3869 | 385/60 |
| 7,534,128 B2* | 5/2009 | Caveney | H01R 13/6272 | 439/480 |

(56) References Cited

U.S. PATENT DOCUMENTS

| | | | | |
|---|---|---|---|---|
| 7,540,666 B2* | 6/2009 | Luther | G02B 6/3885 |
| | | | 385/59 |
| 7,588,373 B1* | 9/2009 | Sato | G02B 6/3893 |
| | | | 385/59 |
| 7,591,595 B2* | 9/2009 | Lu | G02B 6/3816 |
| | | | 385/60 |
| 7,594,766 B1* | 9/2009 | Sasser | G02B 6/4261 |
| | | | 385/139 |
| 7,695,199 B2* | 4/2010 | Teo | G02B 6/4292 |
| | | | 385/60 |
| 7,699,533 B2* | 4/2010 | Milette | G02B 6/3831 |
| | | | 385/75 |
| 7,712,970 B1* | 5/2010 | Lee | G02B 6/387 |
| | | | 385/59 |
| 7,824,113 B2* | 11/2010 | Wong | G02B 6/4246 |
| | | | 398/135 |
| 7,837,395 B2* | 11/2010 | Lin | G02B 6/3825 |
| | | | 385/59 |
| 7,905,665 B2* | 3/2011 | Moriarty | G02B 6/4292 |
| | | | 385/89 |
| D641,708 S* | 7/2011 | Yamauchi | D8/396 |
| 8,083,450 B1* | 12/2011 | Smith | F16B 37/0842 |
| | | | 411/173 |
| 8,152,385 B2 | 4/2012 | De et al. | |
| 8,186,890 B2* | 5/2012 | Lu | G02B 6/3879 |
| | | | 385/139 |
| 8,192,091 B2* | 6/2012 | Hsu | G02B 6/3825 |
| | | | 385/55 |
| 8,202,009 B2* | 6/2012 | Lin | G02B 6/3825 |
| | | | 385/71 |
| 8,251,733 B2* | 8/2012 | Wu | H01R 13/512 |
| | | | 439/352 |
| 8,267,595 B2* | 9/2012 | Lin | G02B 6/3825 |
| | | | 385/55 |
| 8,270,796 B2* | 9/2012 | Nhep | G02B 6/3897 |
| | | | 385/17 |
| 8,376,629 B2* | 2/2013 | Cline | G02B 6/3869 |
| | | | 385/76 |
| 8,414,196 B2* | 4/2013 | Lu | G02B 6/3887 |
| | | | 385/60 |
| 8,534,928 B2* | 9/2013 | Cooke | G02B 6/3885 |
| | | | 385/88 |
| 8,550,728 B2* | 10/2013 | Takahashi | G02B 6/2551 |
| | | | 219/544 |
| 8,556,645 B2* | 10/2013 | Crain | H01R 13/633 |
| | | | 438/258 |
| 8,559,781 B2* | 10/2013 | Childers | G02B 6/3893 |
| | | | 385/134 |
| 8,622,634 B2* | 1/2014 | Arnold | G02B 6/3885 |
| | | | 385/80 |
| 8,651,749 B2* | 2/2014 | Dainese J nior | G02B 6/3823 |
| | | | 385/74 |
| 8,676,022 B2* | 3/2014 | Jones | G02B 6/3849 |
| | | | 385/139 |
| 8,684,611 B2 | 4/2014 | Childers et al. | |
| 8,727,638 B2* | 5/2014 | Lee | G02B 6/3879 |
| | | | 385/139 |
| 8,757,894 B2* | 6/2014 | Katoh | G02B 6/38875 |
| | | | 385/78 |
| 8,869,661 B2* | 10/2014 | Opstad | B63C 11/52 |
| | | | 81/487 |
| 8,894,298 B2* | 11/2014 | Wakjira | G02B 6/38 |
| | | | 385/76 |
| 8,979,395 B2 | 3/2015 | Ott et al. | |
| 8,985,864 B2 | 3/2015 | Ott | |
| 8,985,867 B2 | 3/2015 | Ott et al. | |
| 9,052,474 B2 | 6/2015 | Jiang et al. | |
| 9,063,296 B2* | 6/2015 | Dong | G02B 6/3893 |
| 9,091,825 B2* | 7/2015 | Takahashi | G02B 6/3888 |
| 9,122,022 B2* | 9/2015 | Wakjira | G02B 6/38 |
| 9,207,410 B2 | 12/2015 | Lee et al. | |
| 9,250,402 B2* | 2/2016 | Ishii | G02B 6/4292 |
| 9,411,110 B2* | 8/2016 | Barnette, Jr. | G02B 6/3849 |
| 9,442,256 B2* | 9/2016 | Kuffel | G02B 6/3882 |
| 9,448,370 B2* | 9/2016 | Xue | G02B 6/3893 |
| 9,465,172 B2* | 10/2016 | Shih | G02B 6/3871 |
| 9,494,744 B2* | 11/2016 | de Jong | G02B 6/3885 |
| 9,507,103 B2 | 11/2016 | Wu et al. | |
| 9,523,824 B2 | 12/2016 | Ott et al. | |
| 9,548,557 B2* | 1/2017 | Liu | H01R 43/005 |
| 9,551,842 B2* | 1/2017 | Theuerkorn | G02B 6/3869 |
| 9,557,495 B2* | 1/2017 | Raven | G02B 6/3825 |
| 9,568,686 B2* | 2/2017 | Fewkes | G02B 6/3861 |
| 9,568,689 B2 | 2/2017 | Nguyen et al. | |
| 9,581,768 B1* | 2/2017 | Baca | C09J 171/08 |
| 9,599,778 B2* | 3/2017 | Wong | H01R 13/6335 |
| 9,606,303 B2* | 3/2017 | Wakjira | G02B 6/3879 |
| 9,625,657 B2 | 4/2017 | Ott et al. | |
| 9,638,868 B2 | 5/2017 | Ott et al. | |
| 9,638,872 B2* | 5/2017 | Kuffel | G02B 6/3831 |
| 9,678,283 B1* | 6/2017 | Chang | G02B 6/3885 |
| 9,684,130 B2 | 6/2017 | Veatch et al. | |
| 9,684,136 B2* | 6/2017 | Cline | G02B 6/3672 |
| 9,684,313 B2* | 6/2017 | Chajec | B01D 36/006 |
| 9,709,753 B1* | 7/2017 | Chang | G02B 6/3831 |
| 9,739,955 B2 | 8/2017 | Lee et al. | |
| 9,761,998 B2* | 9/2017 | De Dios Martin | H01R 13/6335 |
| 9,798,094 B2* | 10/2017 | Kuffel | G02B 6/3893 |
| 9,804,337 B2* | 10/2017 | Anderson | G02B 6/3893 |
| 9,823,424 B2* | 11/2017 | Krawczyk | G02B 6/3821 |
| 9,829,644 B2 | 11/2017 | Nguyen et al. | |
| 9,829,653 B1* | 11/2017 | Nishiguchi | G02B 6/3825 |
| 9,857,538 B2* | 1/2018 | Nguyen | G02B 6/3885 |
| 9,946,035 B2* | 4/2018 | Gustafson | G02B 6/387 |
| 9,989,711 B2* | 6/2018 | Ott | G02B 6/3821 |
| 10,031,296 B2* | 7/2018 | Good | G02B 6/3831 |
| 10,042,127 B2 | 8/2018 | Ott et al. | |
| 10,054,747 B2 | 8/2018 | Lee et al. | |
| 10,101,540 B2* | 10/2018 | Gregorski | G02B 6/3851 |
| 10,107,972 B1* | 10/2018 | Gniadek | G02B 6/3825 |
| 10,114,180 B2* | 10/2018 | Suzic | G02B 6/3893 |
| 10,146,010 B2 | 12/2018 | Ott et al. | |
| 10,146,011 B2* | 12/2018 | Nhep | G02B 6/3861 |
| 10,151,887 B2* | 12/2018 | de Jong | G02B 6/443 |
| 10,156,684 B2* | 12/2018 | Nguyen | G02B 6/3879 |
| 10,162,129 B2* | 12/2018 | Smith | G02B 6/38875 |
| 10,168,487 B2 | 1/2019 | Conrad et al. | |
| 10,185,099 B2 | 1/2019 | Chang et al. | |
| 10,185,100 B2 | 1/2019 | Takano et al. | |
| 10,191,230 B2 | 1/2019 | Wong et al. | |
| 10,215,932 B2* | 2/2019 | Childers | G02B 6/3898 |
| 10,228,516 B2 | 3/2019 | Veatch et al. | |
| 10,281,668 B2 | 5/2019 | Takano et al. | |
| 10,281,669 B2 | 5/2019 | Takano et al. | |
| 10,288,817 B2 | 5/2019 | Nguyen et al. | |
| 10,495,824 B2* | 12/2019 | Rosson | G02B 6/3869 |
| 10,520,682 B2 | 12/2019 | Ott | |
| 10,520,687 B2 | 12/2019 | Lee et al. | |
| 10,527,802 B2 | 1/2020 | Wong et al. | |
| 10,585,247 B2 | 3/2020 | Takano et al. | |
| 10,598,865 B2 | 3/2020 | Ott | |
| 10,641,968 B2 | 5/2020 | Takano et al. | |
| 10,677,996 B2* | 6/2020 | Aoshima | G02B 6/3825 |
| 10,678,000 B2* | 6/2020 | Takano | G02B 6/3893 |
| 10,705,300 B2* | 7/2020 | Takano | G02B 6/3887 |
| 10,712,512 B2* | 7/2020 | Ho | G02B 6/38875 |
| 10,768,377 B2 | 9/2020 | Conrad et al. | |
| 10,795,090 B2* | 10/2020 | Nelson | G02B 6/3834 |
| 10,901,155 B2* | 1/2021 | Lu | G02B 6/3893 |
| 10,948,661 B2* | 3/2021 | Kahle | G02B 6/3831 |
| 11,016,250 B2* | 5/2021 | Higley | G02B 6/3898 |
| 11,016,251 B2* | 5/2021 | Childers | G02B 6/3893 |
| 11,092,750 B2 | 8/2021 | Ott | |
| 11,092,755 B2 | 8/2021 | Ott | |
| 11,112,566 B2* | 9/2021 | Takano | G02B 6/3878 |
| 11,112,567 B2 | 9/2021 | Higley et al. | |
| 11,181,701 B2 | 11/2021 | Wong et al. | |
| 11,262,507 B2* | 3/2022 | Nelson | G02B 6/3834 |
| 11,340,406 B2* | 5/2022 | Gniadek | G02B 6/3825 |
| 11,347,009 B2* | 5/2022 | Ishikawa | G02B 6/387 |

(56) References Cited

U.S. PATENT DOCUMENTS

| | | | | |
|---|---|---|---|---|
| 11,415,758 B2* | 8/2022 | Wong | | G02B 6/3887 |
| 11,422,319 B2* | 8/2022 | Gniadek | | G02B 6/3885 |
| 11,460,645 B2* | 10/2022 | Moreau | | G02B 6/3826 |
| 11,506,848 B2* | 11/2022 | Higley | | G02B 6/3879 |
| 11,525,965 B2* | 12/2022 | Childers | | G02B 6/3898 |
| 11,555,968 B2 | 1/2023 | Ott | | |
| 11,567,267 B2* | 1/2023 | Nelson | | G02B 6/3833 |
| 11,579,372 B2* | 2/2023 | Taira | | G02B 6/3825 |
| 11,592,627 B2 | 2/2023 | Higley et al. | | |
| 11,614,589 B2 | 3/2023 | Ott | | |
| 11,635,575 B2 | 4/2023 | Chen et al. | | |
| 11,693,191 B2* | 7/2023 | Lu | | G02B 6/3885 |
| | | | | 385/81 |
| 11,733,466 B2 | 8/2023 | Higley et al. | | |
| 11,768,333 B2* | 9/2023 | Higley | | G02B 6/3825 |
| | | | | 385/139 |
| 11,808,994 B1* | 11/2023 | Higley | | G02B 6/3893 |
| 11,846,813 B2* | 12/2023 | Childers | | G02B 6/3825 |
| 11,892,684 B2* | 2/2024 | Taira | | G02B 6/24 |
| 11,906,794 B2* | 2/2024 | Higley | | G02B 6/3893 |
| 11,940,654 B2* | 3/2024 | Higley | | G02B 6/3831 |
| 2002/0168148 A1* | 11/2002 | Gilliland | | G02B 6/3878 |
| | | | | 385/59 |
| 2002/0172467 A1* | 11/2002 | Anderson | | G02B 6/3825 |
| | | | | 385/53 |
| 2002/0191919 A1* | 12/2002 | Nolan | | G02B 6/3807 |
| | | | | 385/60 |
| 2003/0053787 A1* | 3/2003 | Lee | | G02B 6/0006 |
| | | | | 385/136 |
| 2003/0059168 A1* | 3/2003 | Connelly | | G02B 6/3878 |
| | | | | 385/53 |
| 2003/0063862 A1* | 4/2003 | Fillion | | G02B 6/3825 |
| | | | | 385/76 |
| 2003/0157825 A1* | 8/2003 | Kane | | H01R 13/641 |
| | | | | 439/352 |
| 2003/0215171 A1* | 11/2003 | Lampert | | G02B 6/3812 |
| | | | | 385/11 |
| 2003/0215190 A1* | 11/2003 | Lampert | | G02B 6/3812 |
| | | | | 385/76 |
| 2004/0052473 A1* | 3/2004 | Seo | | G02B 6/3849 |
| | | | | 385/73 |
| 2004/0109646 A1* | 6/2004 | Anderson | | G02B 6/3885 |
| | | | | 385/71 |
| 2004/0136657 A1* | 7/2004 | Ngo | | G02B 6/38875 |
| | | | | 385/86 |
| 2004/0141693 A1* | 7/2004 | Szilagyi | | G02B 6/3849 |
| | | | | 385/55 |
| 2004/0161958 A1* | 8/2004 | Togami | | G02B 6/4246 |
| | | | | 439/160 |
| 2004/0234209 A1* | 11/2004 | Cox | | G02B 6/38875 |
| | | | | 385/86 |
| 2004/0247252 A1* | 12/2004 | Ehrenreich | | G02B 6/3893 |
| | | | | 385/58 |
| 2005/0036744 A1* | 2/2005 | Caveney | | G02B 6/3825 |
| | | | | 385/87 |
| 2005/0111796 A1* | 5/2005 | Matasek | | G02B 6/4277 |
| | | | | 385/55 |
| 2005/0141817 A1* | 6/2005 | Yazaki | | G02B 6/3825 |
| | | | | 385/78 |
| 2006/0013539 A1* | 1/2006 | Thaler | | G02B 6/3898 |
| | | | | 385/76 |
| 2006/0076061 A1* | 4/2006 | Bush | | E03D 5/02 |
| | | | | 137/489.5 |
| 2006/0089049 A1* | 4/2006 | Sedor | | G02B 6/3879 |
| | | | | 439/620.21 |
| 2006/0127025 A1* | 6/2006 | Haberman | | G02B 6/4478 |
| | | | | 385/134 |
| 2006/0153503 A1* | 7/2006 | Suzuki | | G02B 6/3849 |
| | | | | 385/53 |
| 2006/0160429 A1* | 7/2006 | Dawiedczyk | | H01R 12/727 |
| | | | | 439/676 |
| 2006/0193562 A1* | 8/2006 | Theuerkorn | | G02B 6/3888 |
| | | | | 385/53 |
| 2006/0269194 A1* | 11/2006 | Luther | | G02B 6/3863 |
| | | | | 385/85 |
| 2006/0274411 A1* | 12/2006 | Yamauchi | | G03B 21/56 |
| | | | | 359/443 |
| 2007/0025665 A1* | 2/2007 | Dean | | G02B 6/3869 |
| | | | | 385/59 |
| 2007/0028409 A1* | 2/2007 | Yamada | | A47L 13/38 |
| | | | | 15/229.3 |
| 2007/0079854 A1* | 4/2007 | You | | A45B 19/04 |
| | | | | 135/25.4 |
| 2007/0098329 A1* | 5/2007 | Shimoji | | G02B 6/3893 |
| | | | | 385/60 |
| 2007/0149028 A1* | 6/2007 | Yu | | G02B 6/4292 |
| | | | | 439/352 |
| 2007/0149062 A1* | 6/2007 | Long | | H01R 24/58 |
| | | | | 439/668 |
| 2007/0230874 A1* | 10/2007 | Lin | | G02B 6/3849 |
| | | | | 385/53 |
| 2007/0232115 A1* | 10/2007 | Burke | | H01R 13/6272 |
| | | | | 439/344 |
| 2007/0243749 A1* | 10/2007 | Wu | | H01R 13/6584 |
| | | | | 439/352 |
| 2008/0008430 A1* | 1/2008 | Kewitsch | | G02B 6/4478 |
| | | | | 385/113 |
| 2008/0044137 A1* | 2/2008 | Luther | | G02B 6/3869 |
| | | | | 385/70 |
| 2008/0056647 A1* | 3/2008 | Margolin | | G02B 6/4201 |
| | | | | 385/88 |
| 2008/0064334 A1* | 3/2008 | Hamadi | | H04W 88/06 |
| | | | | 455/41.3 |
| 2008/0069501 A1* | 3/2008 | Mudd | | G02B 6/3831 |
| | | | | 385/60 |
| 2008/0101757 A1* | 5/2008 | Lin | | G02B 6/3849 |
| | | | | 385/139 |
| 2008/0226237 A1* | 9/2008 | O'Riorden | | G02B 6/3879 |
| | | | | 385/86 |
| 2008/0267566 A1* | 10/2008 | En Lin | | G02B 6/3849 |
| | | | | 385/53 |
| 2009/0022457 A1* | 1/2009 | de Jong | | G02B 6/3846 |
| | | | | 385/96 |
| 2009/0028507 A1* | 1/2009 | Jones | | G02B 6/3825 |
| | | | | 385/56 |
| 2009/0046981 A1* | 2/2009 | Margolin | | G02B 6/3825 |
| | | | | 385/70 |
| 2009/0047818 A1* | 2/2009 | Irwin | | H01R 13/6397 |
| | | | | 439/304 |
| 2009/0092360 A1* | 4/2009 | Lin | | G02B 6/3846 |
| | | | | 385/81 |
| 2009/0176401 A1* | 7/2009 | Gu | | H01R 13/62933 |
| | | | | 361/728 |
| 2009/0196555 A1* | 8/2009 | Lin | | G02B 6/38875 |
| | | | | 385/86 |
| 2009/0214162 A1* | 8/2009 | O'Riorden | | G02B 6/3888 |
| | | | | 385/53 |
| 2009/0220197 A1* | 9/2009 | Gniadek | | G02B 6/3888 |
| | | | | 385/62 |
| 2009/0220200 A1* | 9/2009 | Sheau Tung Wong | | |
| | | | | G02B 6/3878 |
| | | | | 385/89 |
| 2009/0290839 A1* | 11/2009 | Lin | | G02B 6/3831 |
| | | | | 385/55 |
| 2009/0290938 A1* | 11/2009 | Asaoka | | B09C 1/08 |
| | | | | 405/128.45 |
| 2010/0008635 A1* | 1/2010 | Zimmel | | G02B 6/3825 |
| | | | | 385/136 |
| 2010/0034502 A1* | 2/2010 | Lu | | G02B 6/3894 |
| | | | | 385/139 |
| 2010/0054668 A1* | 3/2010 | Nelson | | G02B 6/3825 |
| | | | | 264/1.25 |
| 2010/0061069 A1* | 3/2010 | Cole | | G02B 6/4284 |
| | | | | 361/761 |
| 2010/0092136 A1* | 4/2010 | Nhep | | G02B 6/4472 |
| | | | | 385/136 |

(56) References Cited

U.S. PATENT DOCUMENTS

| | | | |
|---|---|---|---|
| 2010/0220961 A1* | 9/2010 | de Jong | G02B 6/38875 385/77 |
| 2010/0247041 A1* | 9/2010 | Szilagyi | G02B 6/38875 385/86 |
| 2010/0284656 A1* | 11/2010 | Morra | G02B 6/3829 385/78 |
| 2010/0322561 A1* | 12/2010 | Lin | G02B 6/3831 385/55 |
| 2011/0044588 A1* | 2/2011 | Larson | G02B 6/3888 385/81 |
| 2011/0058773 A1* | 3/2011 | Peterhans | G02B 6/3893 385/76 |
| 2011/0129186 A1* | 6/2011 | Lewallen | G02B 6/38875 385/59 |
| 2011/0131801 A1* | 6/2011 | Nelson | H01R 43/26 29/758 |
| 2011/0155810 A1* | 6/2011 | Taniguchi | H01Q 1/52 343/851 |
| 2011/0177710 A1* | 7/2011 | Tobey | H01R 13/6586 439/607.25 |
| 2011/0239220 A1* | 9/2011 | Gibson | G06F 1/3206 718/103 |
| 2012/0099822 A1* | 4/2012 | Kuffel | G02B 6/3882 385/78 |
| 2012/0155810 A1* | 6/2012 | Nakagawa | G02B 6/3878 385/78 |
| 2012/0189260 A1* | 7/2012 | Kowalczyk | G02B 6/44 385/135 |
| 2012/0213484 A1* | 8/2012 | Childers | G02B 6/3885 29/428 |
| 2012/0237177 A1* | 9/2012 | Minota | G02B 6/4284 385/134 |
| 2012/0269485 A1* | 10/2012 | Haley | G02B 6/38875 385/78 |
| 2012/0281951 A1* | 11/2012 | Takahashi | G02B 6/3846 156/60 |
| 2012/0301080 A1* | 11/2012 | Gniadek | G02B 6/3825 385/56 |
| 2012/0308183 A1* | 12/2012 | Irwin | G02B 6/3893 385/56 |
| 2012/0328248 A1* | 12/2012 | Larson | G02B 6/3846 385/81 |
| 2013/0019423 A1* | 1/2013 | Srutkowski | G02B 6/3807 15/207.2 |
| 2013/0071067 A1* | 3/2013 | Lin | G02B 6/3825 385/75 |
| 2013/0089995 A1* | 4/2013 | Gniadek | H01R 35/02 439/152 |
| 2013/0094816 A1* | 4/2013 | Lin | G02B 6/38875 29/874 |
| 2013/0101258 A1* | 4/2013 | Hikosaka | G02B 6/387 385/78 |
| 2013/0121653 A1* | 5/2013 | Shitama | G02B 6/3846 385/96 |
| 2013/0156379 A1* | 6/2013 | Ott | G02B 6/3863 385/76 |
| 2013/0170797 A1* | 7/2013 | Ott | G02B 6/3885 385/60 |
| 2013/0183001 A1* | 7/2013 | Ott | G02B 6/3862 385/72 |
| 2013/0183012 A1* | 7/2013 | Cabanne Lopez | G02B 6/4471 385/100 |
| 2013/0216185 A1* | 8/2013 | Klavuhn | G02B 6/3882 385/60 |
| 2013/0216186 A1* | 8/2013 | Ott | G02B 6/3888 385/78 |
| 2013/0259429 A1* | 10/2013 | Czosnowski | G02B 6/3879 385/78 |
| 2013/0308915 A1* | 11/2013 | Buff | G02B 6/4452 385/134 |
| 2013/0322825 A1* | 12/2013 | Cooke | G02B 6/3851 385/59 |
| 2014/0016901 A1* | 1/2014 | Lambourn | G02B 6/3817 385/75 |
| 2014/0023322 A1* | 1/2014 | Gniadek | G02B 6/38 385/56 |
| 2014/0050446 A1* | 2/2014 | Chang | G02B 6/3869 385/81 |
| 2014/0056562 A1* | 2/2014 | Limbert | G02B 6/3878 385/77 |
| 2014/0133808 A1* | 5/2014 | Hill | G02B 6/3874 385/84 |
| 2014/0133820 A1* | 5/2014 | Zimmel | G02B 6/29382 385/135 |
| 2014/0153878 A1* | 6/2014 | Mullaney | A61M 1/28 385/83 |
| 2014/0169727 A1* | 6/2014 | Veatch | G02B 6/3879 385/11 |
| 2014/0219621 A1* | 8/2014 | Barnette, Jr. | G02B 6/4472 385/135 |
| 2014/0226946 A1* | 8/2014 | Cooke | G02B 6/4455 385/135 |
| 2014/0241644 A1* | 8/2014 | Kang | G06T 5/70 382/260 |
| 2014/0241678 A1* | 8/2014 | Bringuier | G02B 6/0281 385/113 |
| 2014/0241688 A1* | 8/2014 | Isenhour | G02B 6/3897 29/428 |
| 2014/0334780 A1* | 11/2014 | Nguyen | G02B 6/3897 385/77 |
| 2014/0348477 A1* | 11/2014 | Chang | G02B 6/4446 385/135 |
| 2015/0003785 A1* | 1/2015 | Raven | G02B 6/3825 385/62 |
| 2015/0003788 A1* | 1/2015 | Chen | G02B 6/387 385/72 |
| 2015/0030289 A1* | 1/2015 | Jiang | G02B 6/44 385/76 |
| 2015/0111417 A1* | 4/2015 | Vanderwoud | H01R 13/6335 439/476.1 |
| 2015/0177463 A1* | 6/2015 | Lee | G02B 6/3879 385/76 |
| 2015/0191024 A1* | 7/2015 | Heath | B41J 2/2132 347/15 |
| 2015/0198766 A1* | 7/2015 | Takahashi | G02B 6/2558 29/525.13 |
| 2015/0212282 A1* | 7/2015 | Lin | G02B 6/3893 385/76 |
| 2015/0241644 A1* | 8/2015 | Lee | G02B 6/3831 385/76 |
| 2015/0253519 A1* | 9/2015 | Ott | G02B 6/3898 29/520 |
| 2015/0260922 A1* | 9/2015 | Ott | G02B 6/3858 385/72 |
| 2015/0260925 A1* | 9/2015 | Ott | G02B 6/3866 15/104.8 |
| 2015/0301294 A1* | 10/2015 | Chang | G02B 6/3887 385/87 |
| 2015/0331201 A1* | 11/2015 | Takano | G02B 6/3875 385/71 |
| 2015/0355417 A1* | 12/2015 | Takano | G02B 6/3897 385/60 |
| 2015/0362686 A1* | 12/2015 | Wang | G02B 6/387 385/89 |
| 2015/0370021 A1* | 12/2015 | Chan | G02B 6/4292 385/89 |
| 2015/0378113 A1* | 12/2015 | Good | G02B 6/3851 385/71 |
| 2016/0091671 A1* | 3/2016 | Nguyen | G02B 6/3893 385/81 |
| 2016/0131849 A1* | 5/2016 | Takano | G02B 6/3881 385/60 |
| 2016/0139343 A1* | 5/2016 | Dean, Jr. | G02B 6/3821 29/428 |
| 2016/0139355 A1* | 5/2016 | Petersen | G02B 6/4472 385/100 |
| 2016/0161680 A1* | 6/2016 | Nguyen | G02B 6/3817 385/59 |

(56) References Cited

U.S. PATENT DOCUMENTS

| | | | |
|---|---|---|---|
| 2016/0161681 A1* | 6/2016 | Banal, Jr. | G02B 6/4284 385/76 |
| 2016/0172852 A1* | 6/2016 | Tamura | H02J 1/06 307/151 |
| 2016/0178852 A1* | 6/2016 | Takano | G02B 6/3875 385/60 |
| 2016/0195682 A1* | 7/2016 | Takano | G02B 6/387 385/59 |
| 2016/0231512 A1* | 8/2016 | Seki | G02B 6/3893 |
| 2016/0238796 A1* | 8/2016 | Nguyen | G02B 6/3821 |
| 2016/0259135 A1* | 9/2016 | Gniadek | G02B 6/3885 |
| 2016/0266326 A1* | 9/2016 | Gniadek | G02B 6/3817 |
| 2016/0274313 A1* | 9/2016 | Bushnell | G02B 6/3882 |
| 2016/0291262 A1* | 10/2016 | Chang | G02B 6/3857 |
| 2016/0306125 A1* | 10/2016 | Wu | G02B 6/3879 |
| 2016/0320572 A1* | 11/2016 | Gniadek | G02B 6/3889 |
| 2016/0327757 A1* | 11/2016 | Lee | G02B 6/3869 |
| 2016/0349458 A1* | 12/2016 | Murray | G02B 6/3825 |
| 2016/0349464 A1* | 12/2016 | Chang | G02B 6/3888 |
| 2016/0370545 A1* | 12/2016 | Jiang | G02B 6/3893 |
| 2017/0003458 A1* | 1/2017 | Gniadek | G02B 6/3821 |
| 2017/0010422 A1* | 1/2017 | Childers | G02B 6/3882 |
| 2017/0102505 A1* | 4/2017 | Nguyen | G02B 6/3869 |
| 2017/0139430 A1* | 5/2017 | Gledhill, III | G01F 1/24 |
| 2017/0153396 A1* | 6/2017 | Nguyen | G02B 6/3898 |
| 2017/0160496 A1* | 6/2017 | de Jong | G02B 6/3825 |
| 2017/0176691 A1* | 6/2017 | Childers | G02B 6/3831 |
| 2017/0176694 A1* | 6/2017 | Childers | G02B 6/3882 |
| 2017/0205587 A1* | 7/2017 | Chang | G02B 6/3879 |
| 2017/0205588 A1* | 7/2017 | Lee | G02B 6/3878 |
| 2017/0205590 A1* | 7/2017 | Bailey | H01R 13/6335 |
| 2017/0205591 A1* | 7/2017 | Takano | G02B 6/3879 |
| 2017/0212313 A1* | 7/2017 | Elenabaas | G02B 6/3821 |
| 2017/0212316 A1* | 7/2017 | Takano | G02B 6/3825 |
| 2017/0254961 A1* | 9/2017 | Kamada | G02B 6/3821 |
| 2017/0254966 A1* | 9/2017 | Gniadek | G02B 6/3885 |
| 2017/0276275 A1* | 9/2017 | Beemer | G01N 30/60 |
| 2017/0276881 A1* | 9/2017 | Ott | B08B 1/143 |
| 2017/0276887 A1* | 9/2017 | Allen | G02B 6/3897 |
| 2017/0277059 A1* | 9/2017 | Miura | G03G 21/18 |
| 2017/0285268 A1* | 10/2017 | Veatch | G02B 6/2726 |
| 2017/0285275 A1* | 10/2017 | Hill | G02B 6/4447 |
| 2017/0285277 A1* | 10/2017 | Chang | G02B 6/3825 |
| 2017/0299818 A1* | 10/2017 | Chang | G02B 6/3874 |
| 2017/0299820 A1* | 10/2017 | Lee | G02B 6/3821 |
| 2017/0315308 A1* | 11/2017 | Kamada | G02B 6/3898 |
| 2017/0336571 A1* | 11/2017 | Ott | G02B 6/3858 |
| 2017/0343740 A1* | 11/2017 | Nguyen | G02B 6/4284 |
| 2018/0003910 A1* | 1/2018 | Menguy | G02B 6/3897 |
| 2018/0011254 A1* | 1/2018 | Takano | G02B 6/3871 |
| 2018/0011258 A1* | 1/2018 | Takano | G02B 6/3869 |
| 2018/0081124 A1* | 3/2018 | Nguyen | G02B 6/3821 |
| 2018/0120513 A1* | 5/2018 | Conrad | G02B 6/3841 |
| 2018/0128988 A1* | 5/2018 | Chang | G02B 6/3831 |
| 2018/0136410 A1* | 5/2018 | Takeuchi | G02B 6/385 |
| 2018/0136414 A1* | 5/2018 | Childers | G02B 6/3897 |
| 2018/0156988 A1* | 6/2018 | Gniadek | H01R 13/743 |
| 2018/0172923 A1* | 6/2018 | Bauco | G02B 6/262 |
| 2018/0217338 A1* | 8/2018 | Takano | G02B 6/403 |
| 2018/0217340 A1* | 8/2018 | Wong | G02B 6/3893 |
| 2018/0239093 A1* | 8/2018 | Chang | G02B 6/3826 |
| 2018/0252872 A1* | 9/2018 | Chen | G02B 6/3893 |
| 2018/0341069 A1* | 11/2018 | Takano | G02B 6/3888 |
| 2019/0018201 A1* | 1/2019 | Takano | G02B 6/387 |
| 2019/0018209 A1* | 1/2019 | Takano | G02B 6/4292 |
| 2019/0033533 A1* | 1/2019 | Ott | G02B 6/3862 |
| 2019/0064447 A1* | 2/2019 | Chang | G02B 6/4292 |
| 2019/0137694 A1* | 5/2019 | Murray | G02B 6/3831 |
| 2019/0137696 A1* | 5/2019 | Conrad | G02B 6/3841 |
| 2019/0137701 A1* | 5/2019 | Lee | G02B 6/3857 |
| 2019/0154924 A1* | 5/2019 | Chang | G02B 6/3825 |
| 2019/0162918 A1* | 5/2019 | Childers | G02B 6/3821 |
| 2019/0179084 A1* | 6/2019 | Ott | G02B 6/3893 |
| 2019/0179086 A1* | 6/2019 | Takano | G02B 6/403 |
| 2019/0179089 A1* | 6/2019 | Takano | G02B 6/3893 |
| 2019/0187387 A1* | 6/2019 | Wong | G02B 6/3821 |
| 2019/0204513 A1* | 7/2019 | Davidson | G02B 6/3825 |
| 2019/0235184 A1* | 8/2019 | Takano | G02B 6/3821 |
| 2019/0250344 A1* | 8/2019 | Takano | G02B 6/4292 |
| 2019/0278028 A1* | 9/2019 | Higley | G02B 6/3825 |
| 2019/0302383 A1* | 10/2019 | Takano | G02B 6/4292 |
| 2019/0346633 A1* | 11/2019 | Cloud | G02B 6/3888 |
| 2019/0391343 A1* | 12/2019 | Aoshima | G02B 6/3879 |
| 2020/0150357 A1* | 5/2020 | Higley | G02B 6/3888 |
| 2020/0183097 A1* | 6/2020 | Chang | G02B 6/3885 |
| 2020/0209489 A1* | 7/2020 | Takano | G02B 6/403 |
| 2020/0241215 A1* | 7/2020 | Ott | G02B 6/3825 |
| 2020/0264384 A1* | 8/2020 | Higley | G02B 6/3897 |
| 2020/0264387 A1* | 8/2020 | Kuffel | G02B 6/383 |
| 2020/0284995 A1* | 9/2020 | Good | G02B 6/3831 |
| 2020/0284998 A1* | 9/2020 | Higley | G02B 6/3898 |
| 2020/0285001 A1* | 9/2020 | Childers | G02B 6/3893 |
| 2020/0301077 A1* | 9/2020 | Leigh | G02B 6/3897 |
| 2020/0310042 A1* | 10/2020 | Davidson | G02B 6/3825 |
| 2020/0319410 A1* | 10/2020 | Ott | G02B 6/389 |
| 2020/0371299 A1* | 11/2020 | Gniadek | H01R 13/629 |
| 2021/0088732 A1* | 3/2021 | Gniadek | G02B 6/3893 |
| 2021/0149124 A1* | 5/2021 | Higley | G02B 6/3825 |
| 2021/0199901 A1* | 7/2021 | Wong | G02B 6/3879 |
| 2021/0215887 A1* | 7/2021 | Cloud | G02B 6/3869 |
| 2021/0255404 A1* | 8/2021 | Bragg | G02B 6/3871 |
| 2021/0278609 A1* | 9/2021 | Childers | G02B 6/3893 |
| 2021/0286138 A1* | 9/2021 | Higley | G02B 6/3831 |
| 2021/0341685 A1* | 11/2021 | Chen | G02B 6/3885 |
| 2021/0373252 A1* | 12/2021 | Ott | G02B 6/3869 |
| 2021/0382236 A1* | 12/2021 | Ott | G02B 6/3888 |
| 2021/0382248 A1* | 12/2021 | Newbury | G02B 6/406 |
| 2021/0405302 A1* | 12/2021 | Higley | G02B 6/38875 |
| 2022/0011525 A1* | 1/2022 | Higley | G02B 6/3863 |
| 2022/0229241 A1* | 7/2022 | Davidson | G02B 6/3893 |
| 2022/0283384 A1* | 9/2022 | Rosson | G02B 6/3878 |
| 2022/0291457 A1* | 9/2022 | Higley | G02B 6/3821 |
| 2023/0080980 A1* | 3/2023 | Higley | G02B 6/3825 385/78 |
| 2023/0096618 A1* | 3/2023 | Childers | G02B 6/3831 385/134 |
| 2023/0161116 A1* | 5/2023 | Higley | G02B 6/3857 385/87 |
| 2023/0176298 A1* | 6/2023 | Ishikawa | G02B 6/387 |
| 2023/0213709 A1* | 7/2023 | Higley | G02B 6/3888 385/78 |
| 2023/0228951 A1* | 7/2023 | Ott | G02B 6/3893 385/72 |
| 2023/0280541 A1* | 9/2023 | Rosson | G02B 6/3825 385/77 |
| 2023/0288650 A1* | 9/2023 | Childers | G02B 6/3898 |
| 2023/0350136 A1* | 11/2023 | Higley | G02B 6/403 |
| 2023/0358972 A1* | 11/2023 | Higley | G02B 6/3893 |
| 2023/0358973 A1* | 11/2023 | Higley | G02B 6/3825 |
| 2023/0358974 A1* | 11/2023 | Higley | G02B 6/3857 |
| 2024/0168243 A1* | 5/2024 | Higley | G02B 6/3893 |

FOREIGN PATENT DOCUMENTS

| | | |
|---|---|---|
| WO | 2017139430 A1 | 8/2017 |
| WO | 2019195652 A1 | 10/2019 |
| WO | 2020160254 A1 | 8/2020 |

OTHER PUBLICATIONS

FOCIS 10 Fiber Optic Connector Intermateability Standard—Type LC, Mar. 6, 2002.

International Search Report and Written Opinion PCT/US2018/066523 Dated Mar. 5, 2019; 8 pages.

Office Action in Chinese patent App. No. 202800118295 dated Oct. 8, 2022.

* cited by examiner

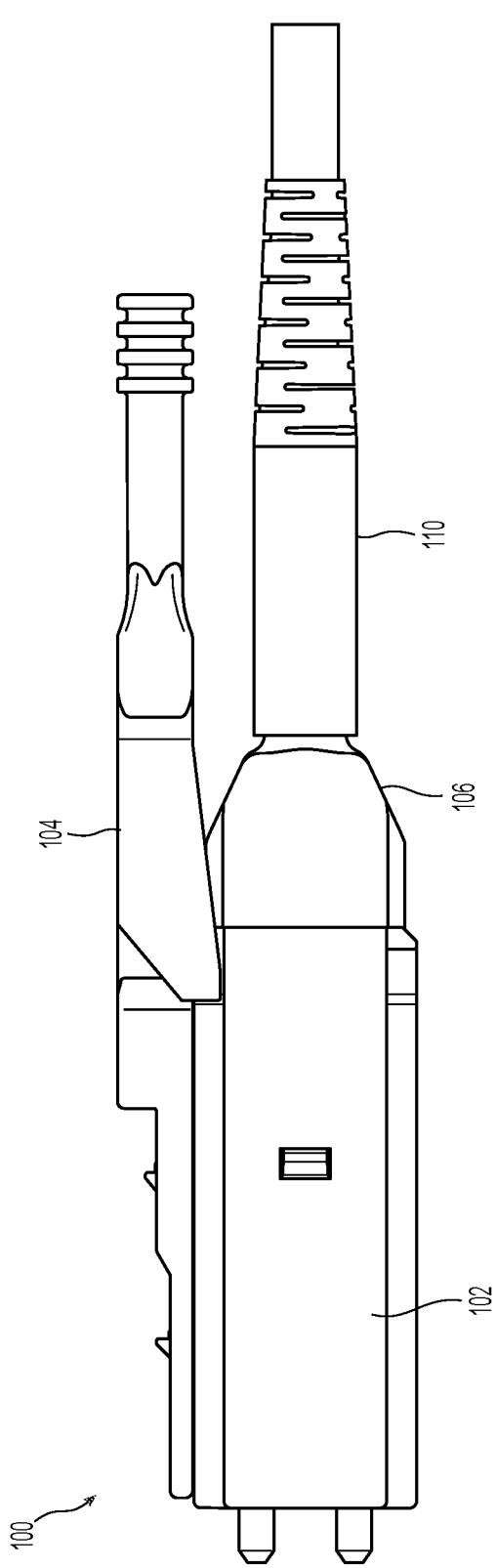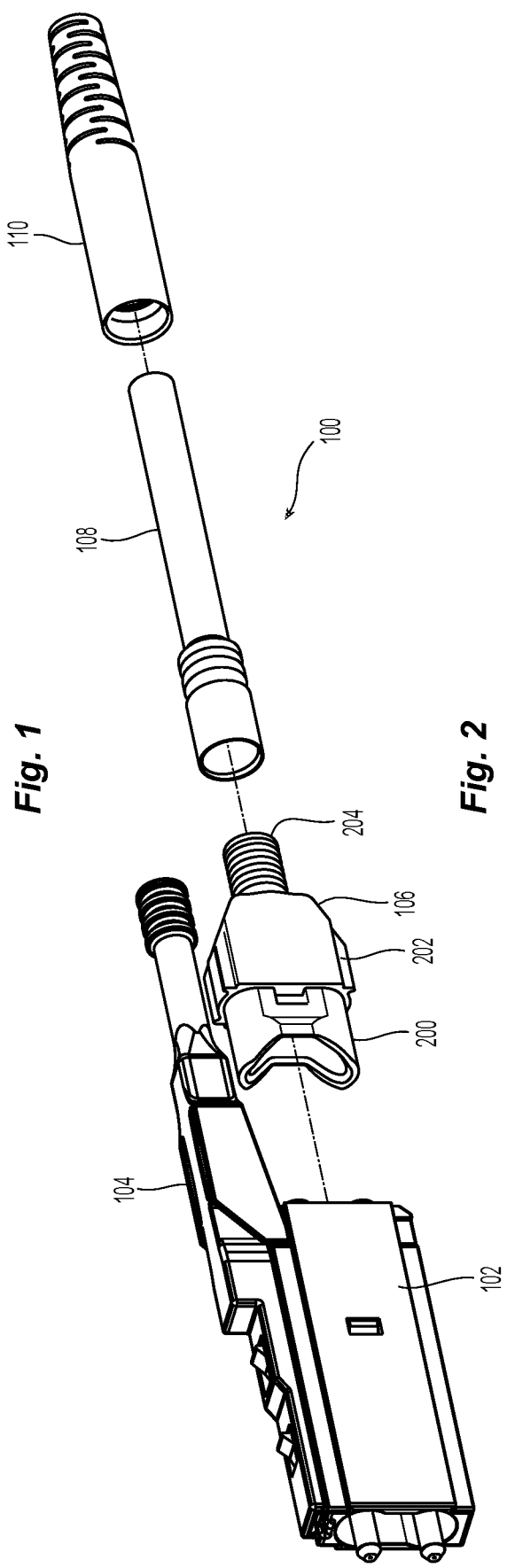
Fig. 1
Fig. 2

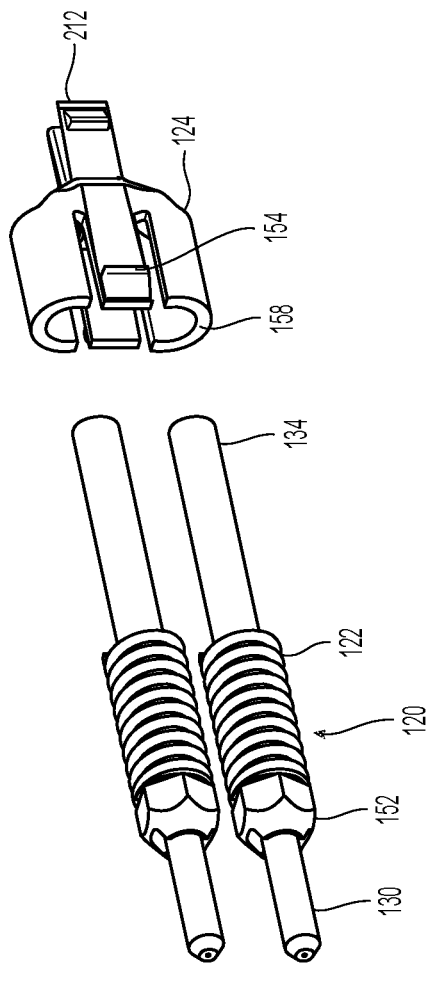
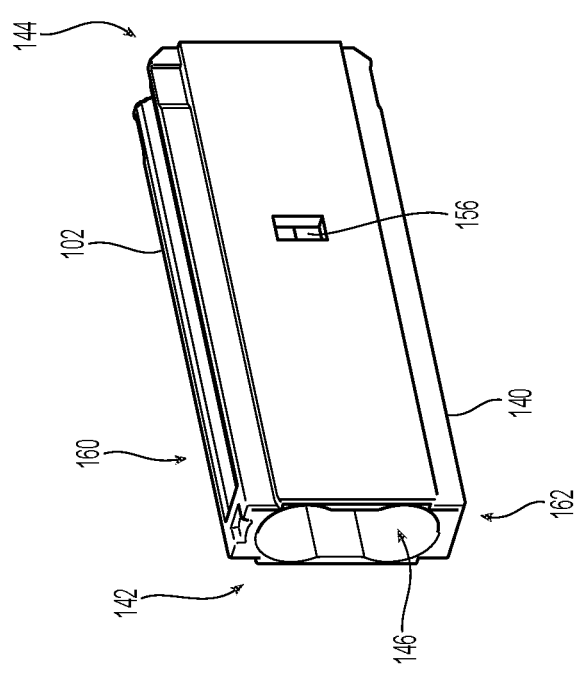
Fig. 3
Fig. 3A

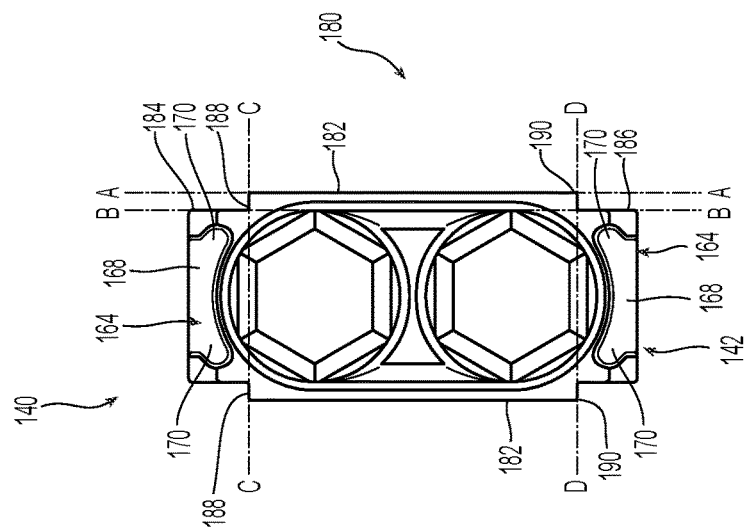
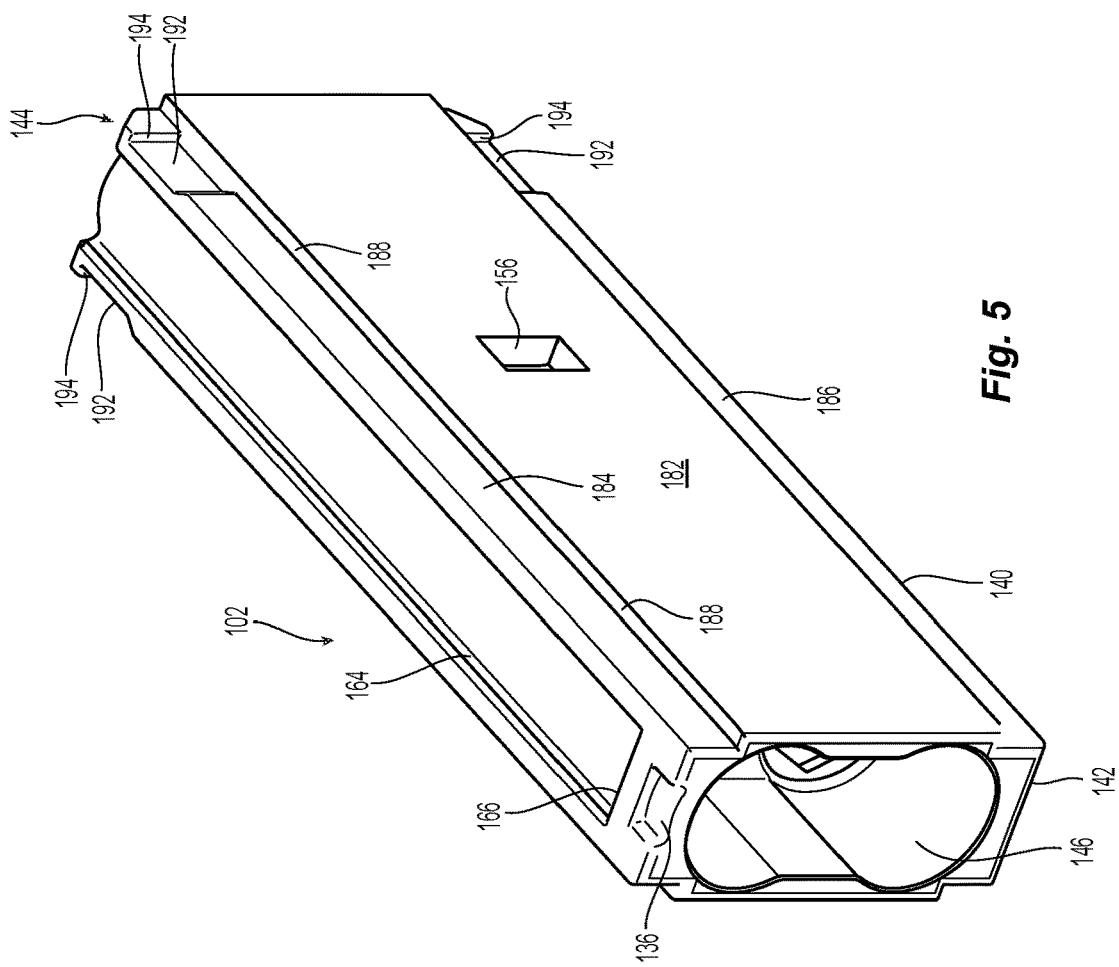

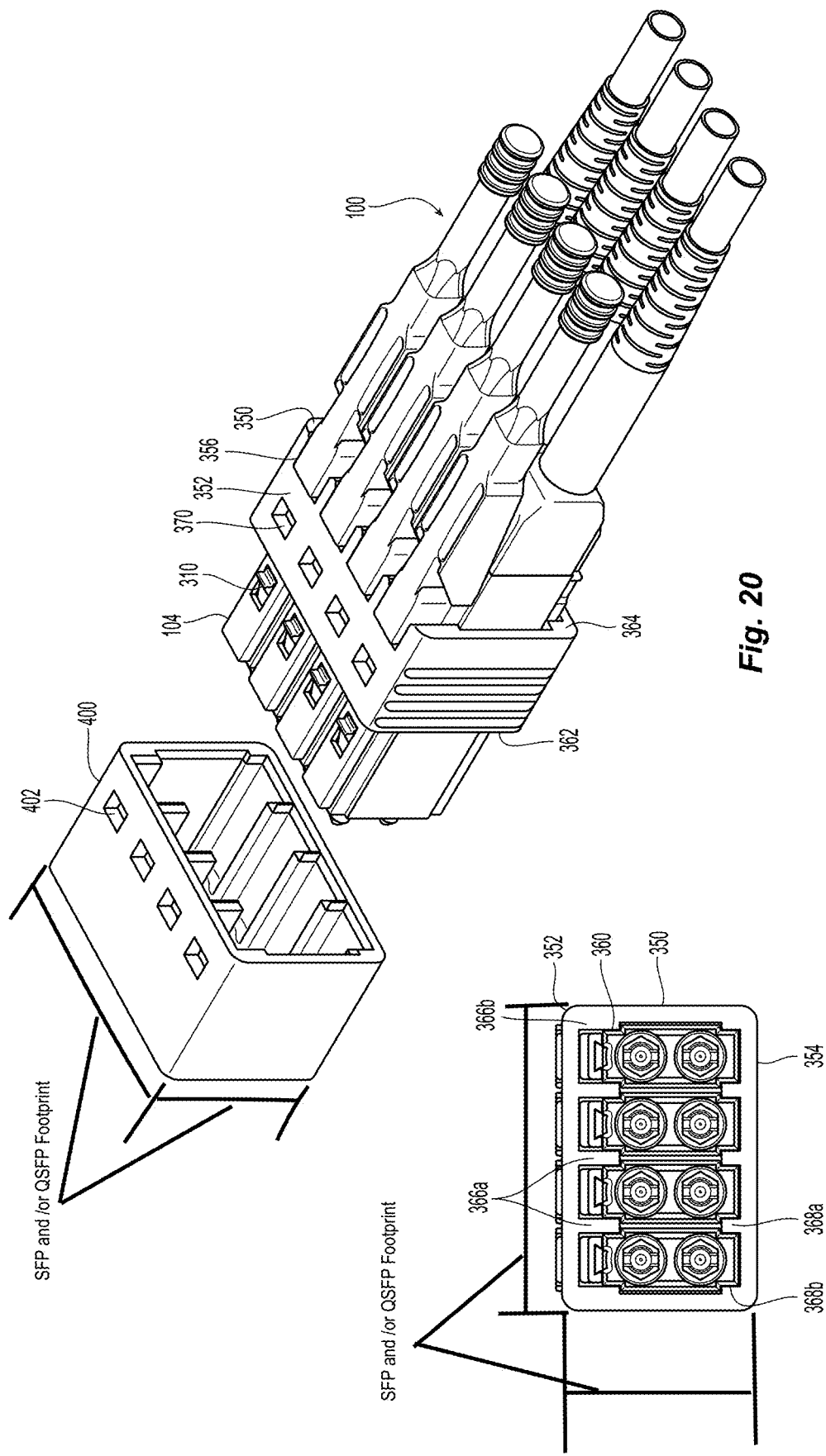

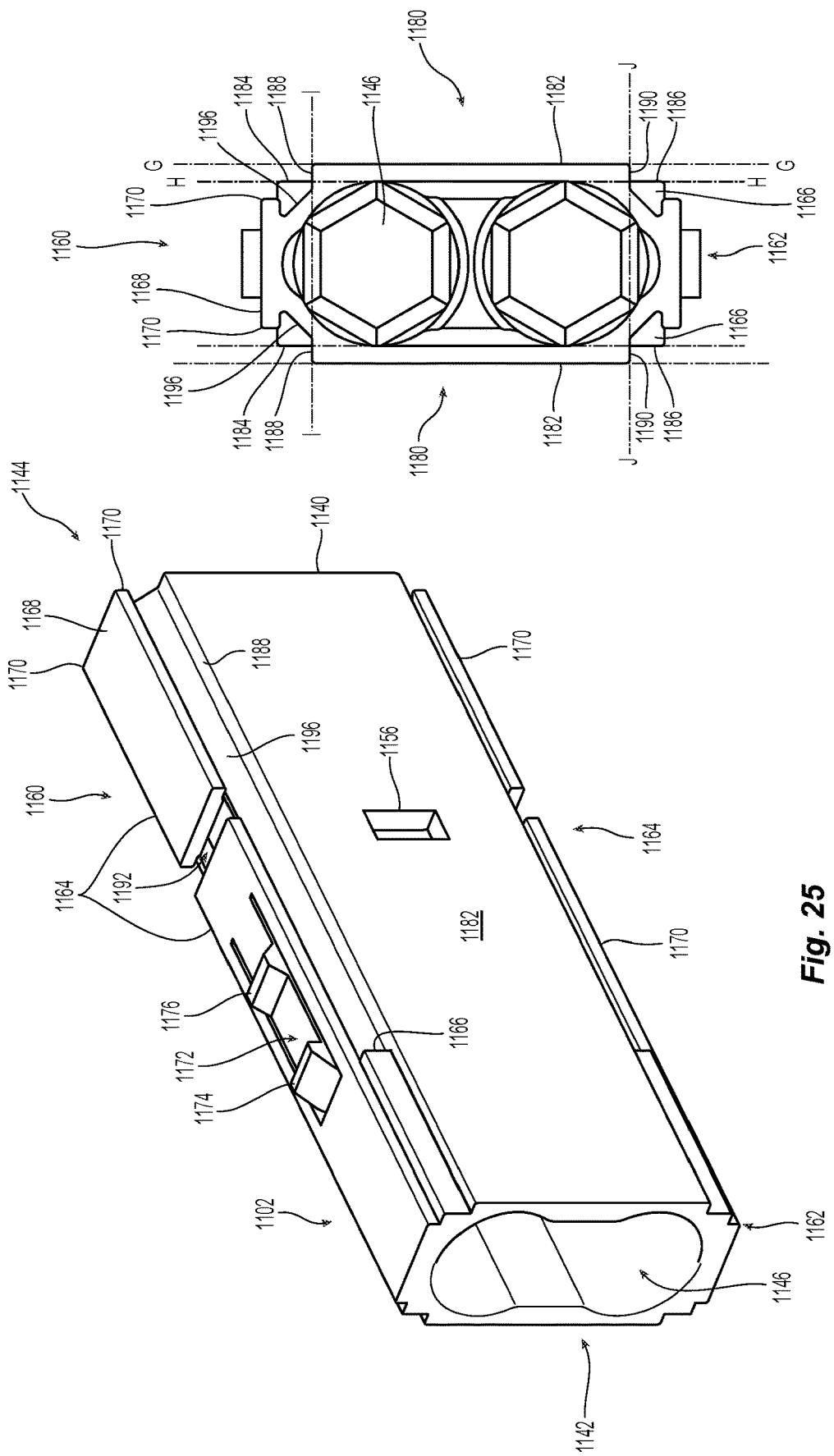

ADAPTER FOR SMALL FORM FACTOR DUPLEX FIBER OPTIC CONNECTORS

This application claims priority to U.S. Provisional Patent Application Ser. No. 62/607,555, filed on Dec. 19, 2017 and Provisional Patent Application Ser. No. 62/634,271, filed on Feb. 23, 2018, and under 35 U.S.C. § 120 to U.S. Pat. No. 11,016,250, issued on Mar. 25, 2021, and to U.S. Pat. No. 11,506,848, issued on Nov. 22, 2022; and to U.S. patent application Ser. No. 18/057,342, filed on Nov. 21, 2022; and to U.S. Pat. No. 11,808,994, issued on Nov. 7, 2023, and to U.S. patent Applicant Ser. No. 18/502,775, filed on Nov. 6, 2023, the contents of all of which are incorporated by reference.

BACKGROUND OF THE INVENTION

Field of the Invention

In the small form-factor pluggable (SFP and QSFP) industry, there are a number of different ferrules and designs that are used. In some applications, an MT ferrule is used, while in others it is the LC form that is used. The LC connector uses a single optical fiber and fiber optic ferrule per housing. In higher density applications, the LC connector may not be used because the space that each of the LC connectors use. Thus, it would beneficial to reduce the footprint of the LC connector by reducing the pitch between the fiber optic ferrules.

Applicant has a new design for a fiber optic connector using the LC fiber optic ferrule to reduce the overall footprint of the fiber optic connector. In addition, an insertion/removal tool has been included to allow for the reduced footprint, allowing a user to more easily insert and remove the new fiber optic connectors. The fiber optic connector and the insertion/removal tool may also provide a way to ensure the correct polarity of the fiber optic connector and to even change the polarity in the field.

Finally, the insertion/removal tool may include a way for it to be self-returning after a user inserts/removes the fiber optic connector.

SUMMARY OF THE INVENTION

The present invention is directed to a fiber optic connector that includes a housing having a main body extending between a front end and a rear end and having an opening extending therebetween, two ferrule assemblies disposed within the opening of the housing, each of the ferrule assemblies including a fiber optic ferrule, a ferrule holder and a lead-in tube, the fiber optic ferrule being inserted into a front end of a ferrule holder and extending away from the front end of the ferrule holder, and the lead-in tube attached the ferrule holder and extending rearwardly and away from the fiber optic ferrule, two springs, each spring engaging a rearward facing surface of a respective ferrule holder and extending towards the rear end of the housing, and a spring push engaging a rear portion of each of the two springs to bias the ferrule assemblies toward the front end of the housing, the spring push engaging a portion of the housing in the opening to retain the spring push within the opening, wherein each of the lead-in tubes extend through at least a portion of a respective spring and beyond a rear end of the spring push.

In some embodiments, the fiber optic connector includes a crimp body having a transition portion to receive an optical fiber extending from each of the lead-in tubes between the front end and a singular opening at a rear end, the rear end having an outer surface to receive a crimp band therearound.

In some embodiments, the housing has a rail receiving portion configured to receive a latch component.

In some embodiments, the latch component is a push-pull mechanism.

In another aspect, the invention is directed to a method of assembling a fiber optic connector that includes the steps of inserting into a housing having a main body, the main body extending between a front end and a rear end and having an opening extending therebetween two ferrule assemblies, each of the ferrule assemblies comprising a fiber optic ferrule, a ferrule holder and a lead-in tube, the fiber optic ferrule being inserted into a front end of a ferrule holder and extending away from the front end of the ferrule holder, and the lead-in tube attached the ferrule holder and extending rearwardly and away from the fiber optic ferrule, inserting on to each of the ferrule assemblies a spring engaging a rearward facing surface of the ferrule holder and extending towards the rear end of the housing, inserting into the housing a spring push to engage a rear portion of each of the springs to bias the ferrule assemblies toward the front end of the housing, the spring push engaging a portion of the housing in the opening to retain the spring push within the opening, inserting an adhesive into each of the lead-in tubes to secure an optical fiber within each of the ferrule assembly, and allowing the adhesive to cure with an optical fiber within each of the ferrule assemblies.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description of the present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

BRIEF DESCRIPTION OF THE DRAWINGS

FIG. 1 is a side elevational view of one embodiment of a fiber optic connector with a push-pull mechanism, crimp body, and boot according to the present invention;

FIG. 2 is an exploded perspective view of the fiber optic connector in FIG. 1;

FIG. 3 is a perspective view of a portion of the fiber optic connector in FIG. 1, which includes the housing with two ferrule assemblies and a spring push;

FIG. 3A is an exploded perspective view of the ferrule assembly and spring in FIG. 3;

FIG. 5 is a perspective view of the housing of the fiber optic connector in FIG. 1 and FIG. 3;

FIG. 6 is a rear elevational view of the housing in FIG. 5;

FIG. 19 is a front view of the plurality of fiber optic connectors and push-pull mechanisms mounted in the carrier in FIG. 18;

FIG. 20 is a rear perspective view of the plurality of fiber optic connectors and push-pull mechanisms mounted in the carrier in FIG. 18 in preparation to be inserted into one embodiment of a fiber optic connector adapter according to the present invention;

FIG. 25 is a perspective view of the housing of the fiber optic connector in FIG. 23;

FIG. 26 is a rear elevational view of the housing in FIG. 25;

DETAILED DESCRIPTION OF THE PREFERRED EMBODIMENTS

Figure 4:
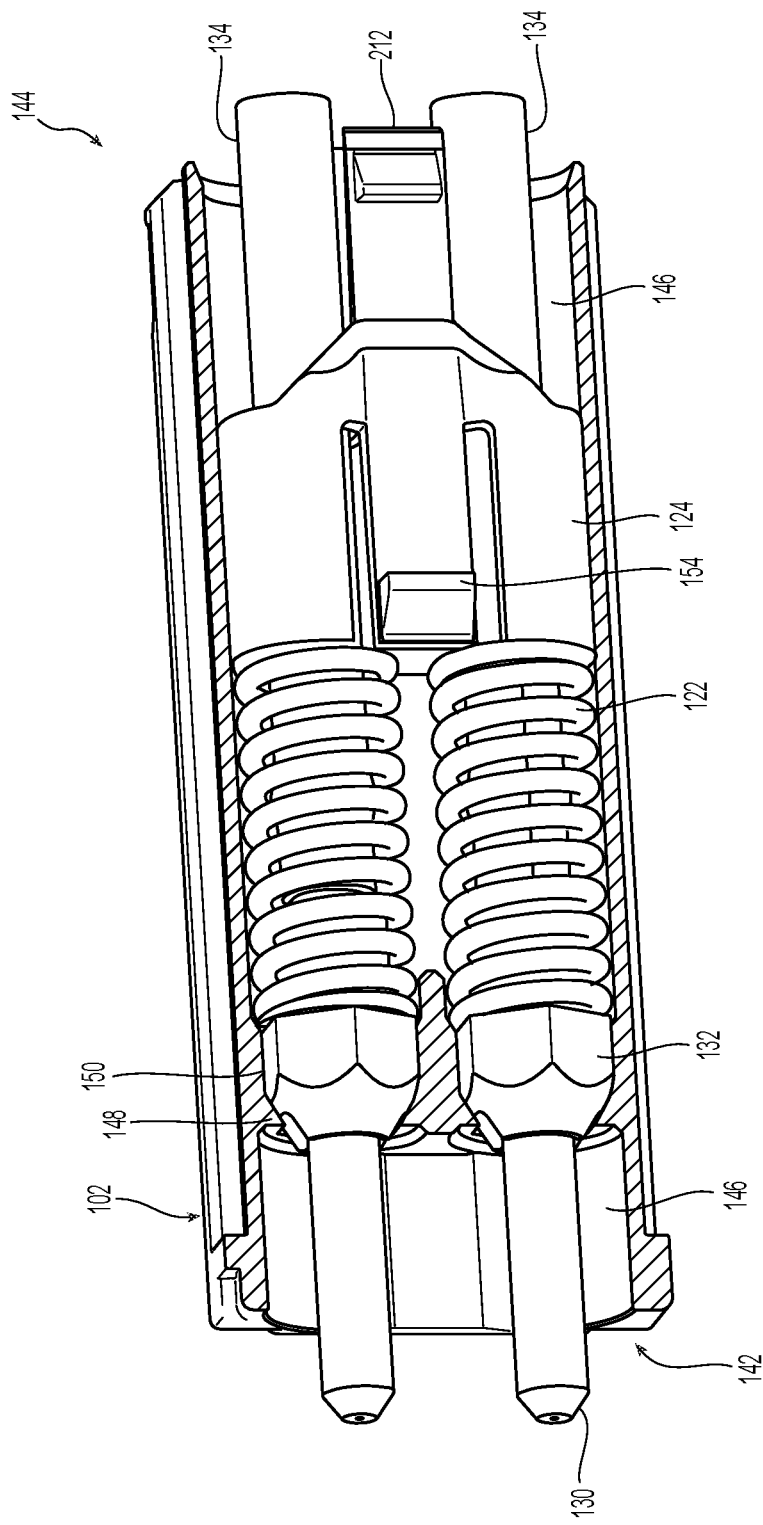
FIG. 4 is a partial cross section of the housing with two assembled ferrule assemblies and the spring push in FIG. 3.
Figure 7:
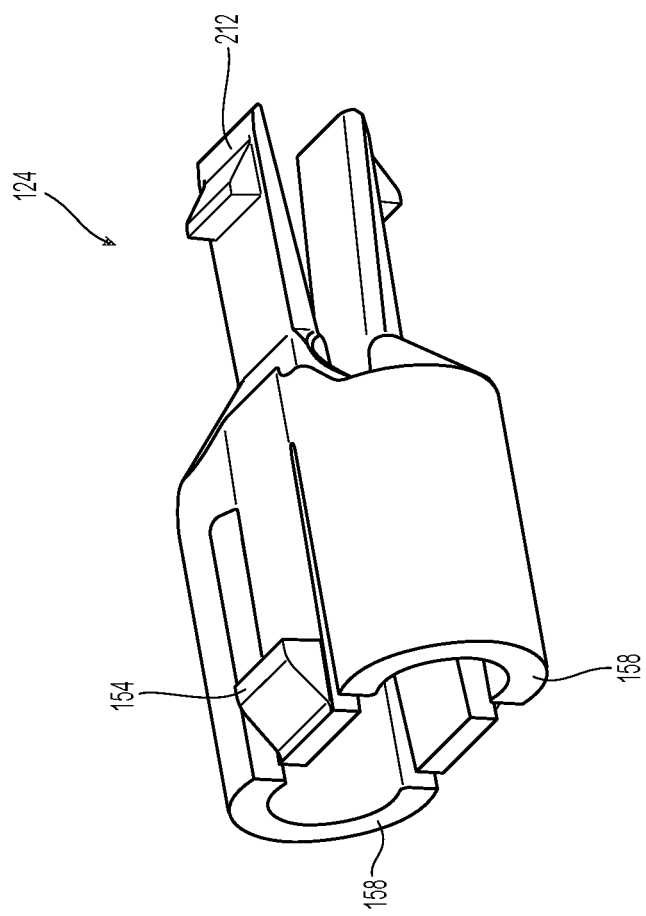
FIG. 7 is a perspective view of spring push in FIG. 3.

Reference will now be made in detail to the present preferred embodiment(s) of the invention, examples of which are illustrated in the accompanying drawings. Whenever possible, the same reference numerals will be used throughout the drawings to refer to the same or like parts.

Applicant notes that the term "front" or "forward" means that direction where the fiber optic connector would meet with another fiber optic connector or device, while the term "rear" or "rearward" is used to mean the direction from which the optical fibers enter into the fiber-optic ferrule or fiber optic connector. Thus, "front" is that part of the housing 102 on the left side of FIG. 1 and "forward" is out and to the left. "Rear" is that part of the housing 102 that is on the right side of the page and "rearward" is toward the right.

One embodiment of a fiber optic connector 100, which is a duplex fiber optic connector, according to the present invention is illustrated in FIGS. 1-22. The fiber optic connector 100, in FIGS. 1 and 2, may include a housing 102, a latch component (push-pull mechanism) 104, a crimp body 106, a crimp ring and heat shrink tube 108, and a strain relief boot 110. As discussed in more detail below, the housing 102 and its components, the latch component 104, and the crimp body 106 are the focus of this application. The crimp ring and heat shrink tube 108 and a strain relief boot 110 are generally known components.

Turning to FIGS. 3 and 3A, inside the housing 102 are two ferrule assemblies 120, two springs 122, and a spring push 124. The two ferrule assemblies 120 each include a fiber optic ferrule 130 (generally a 1.25 mm LC fiber optic ferrule), a ferrule holder 132, and a lead-in tube 134. The spring 122 is added later. The ferrule assemblies 120 are preferably preassembled and are inserted into the housing 102 without needing any further processing.

The housing 102 has a main body 140 extending between a front end 142 and a rear end 144 along a longitudinal axis therebetween, and has an opening 146 extending therebetween. The opening 146 of the housing 102 may also have structures 148 that orient and retain the ferrule assemblies 120 in the housing 102. In this case, there are flat surfaces 150 that engage corresponding flat surfaces 152 on the ferrule holder 132, to keep the ferrule assemblies 120 from rotating within the housing 102.

Once the ferrule assemblies 120 are disposed within the housing 102, the springs 122 are placed around the lead-in tube 134 and against a back end 138 of the ferrule holder 132. The spring push 124 is then inserted into the opening 146 of the housing 102. The spring push 124 has a pair of latches 154 that engage corresponding openings 156 in the opposite sides of the main body 140 of the housing 102 to retain the spring push 124 in the opening 146. The spring push 124 has a forward facing surface 158 to engage the rear ends of the springs 122. The forward facing surface 158 generally corresponds to the two springs 122 to ensure that that the spring push 124 stays engaged with the springs 122. This configuration biases the ferrule assemblies 120 toward the front end 142 of the housing 102. While not shown, two optical fibers enter into the ferrule assemblies 120 through the spring push 124 and into the lead-in tubes 134.

The lead-in tubes 134 are connected to and extend from the ferrule holder 132. Preferably, the lead-in tubes 134 are secured to the ferrule holder 132, e.g. by adhesives, press-fit. The lead-in tubes 134 also extend beyond the rear end of the ferrule holder 132. See FIG. 4. This allows for injection of epoxy or other adhesives into the ferrule assemblies 120 through the lead-in tubes 134 to secure the optical fibers therein. With the lead-in tubes 134 extending so far rearwardly, there is no concern that the epoxy or adhesives will interfere with the springs 134, the spring push 124, or other structures in the fiber optic connector 100. Typically, the adhesive is cured with the lead-in tubes 134 exposed in prior to adding any additional components.

The housing 102 may also have an indicia 136 of the polarity of the fiber optic connector 100. See FIG. 5. Depending on the application, one of the ferrule assemblies 120 may be a receiving or a transmitting side with the other of the ferrule assemblies 120 being the other. It is important for the user or technician to know which of the ferrule assemblies 120 is which. The indicia 136, an indentation in this case, makes the orientation or the polarity of the fiber optic connector 100 clearly visible. Other types of indicia may be used and still fall within the scope of the present invention.

The outside of the housing 102 has many features that are integral to its use. See FIGS. 5 and 6. First are the top surface 160 and the bottom surface 162. The top and bottom surfaces 160,162 are preferably the same, with the exception of the indicia 136, as one of the two surfaces 160,162 would not have it. Extending from the rear end 144 towards the front 142 of the housing 140 on both the top surface 160 and the bottom surface 162 is a rail receiving portion 164. As will be discussed in more detail below, the rail receiving portion 164 will stop just before the front end 142 as it will therefore create a stop surface 166. The latch component (push-pull mechanism) 104 will make use of the stop surface 166 to insert the fiber optic connector 100 into various structures.

The rail receiving portion 164 has a central portion 168 and then two lobe sections 170, one lobe on each side of the central portion 168. As best seen in FIG. 6, the rail receiving portion 164 looks like part of a profile of a dog bone. This configuration matches that of the bottom surface of the latch component (push-pull mechanism) 104 to form a sliding dove-tail configuration. Other configurations are possible, such as, for example, the second version illustrated below—a cap with undercuts (essentially an umbrella or a T-shape configuration). See FIG. 26. FIG. 6 also shows a rectangular cross section orthogonal to the longitudinal axis for the fiber optic connector 100.

The next feature of the housing 102 and main body 140 are the two side surfaces 180. The two side surfaces 180 are those opposite to one another and separated by the top surface 160 and the bottom surface 162. Referring to FIG. 6 in particular, each of the sides 180 are divided into three portions. The first portion is a longitudinal central portion 182 extending in a first plane A. The second portion is a longitudinal top portion 184 extending in a second plane B, the first plane A is parallel to and offset from the second plane B. The third portion is a longitudinal bottom portion 186 extending in the second plane B. The longitudinal top portion 184 preferably is divided from the longitudinal central portion 182 by a shoulder 188. The shoulder 188 preferably has a surface that is in plane C and is perpendicular to both planes A and B. Similarly, the longitudinal bottom portion 186 preferably is divided from the longitudinal central portion 182 by a shoulder 190. The shoulder 190 preferably has a surface that is in plane D and is perpendicular to both planes A and B.

The two longitudinal top portions 184 and the two longitudinal bottom portions 186 function to align the fiber optic connector 100 in a horizontal direction in various structures, e.g., a carrier and an adapter. On the other hand, it is the shoulders 188,190 that align the fiber optic connector 100 in a vertical direction. These will be discussed in more detail below. See also FIGS. 19 and 20.

Referring to FIG. 5, there are also two indentations 192 in the longitudinal top portion 184 on both sides of the main body and adjacent the rear end 144. The indentations 192 form a forward facing surfaces 194 that are used by two housing latches in the latch component (push-pull mechanism) 104. As described more later, the latch component (push-pull mechanism) 104 engages the forward facing surfaces 194 when removing the fiber optic connector 100.

Figure 9:
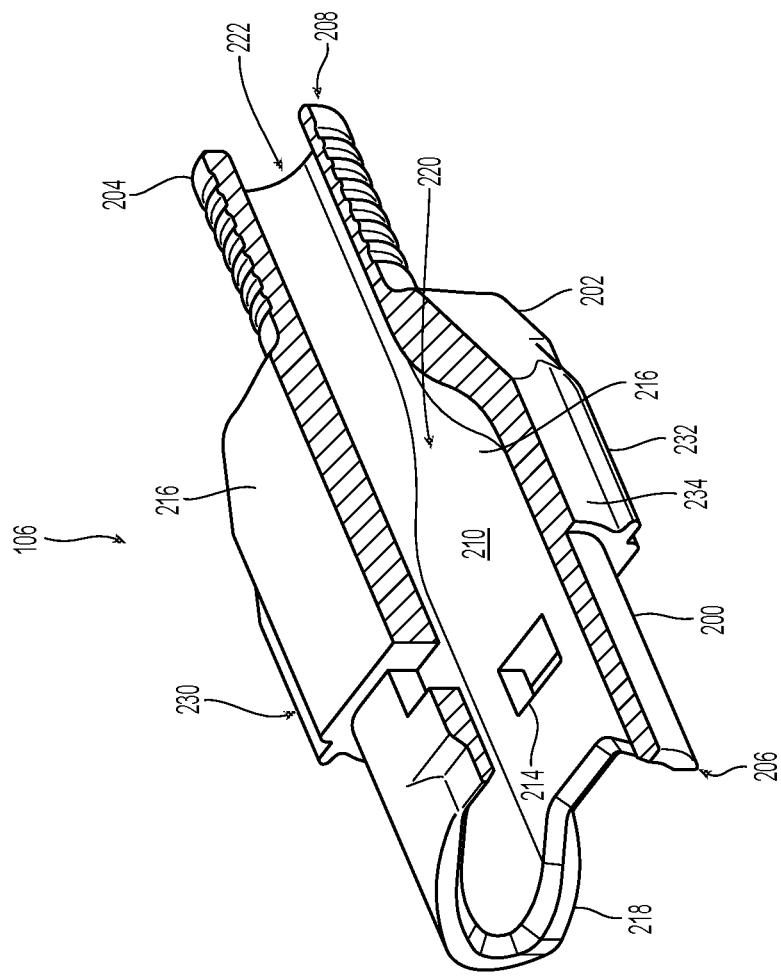
FIG. 9 is a partial cut away perspective view of the crimp body in FIG. 8.
Figure 8:
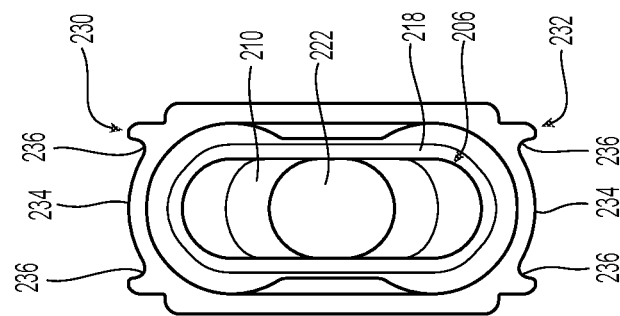
FIG. 8 is a front elevational view of the crimp body in FIG. 1.

Returning to the crimp body 106, it is illustrated in FIG. 1 and also in FIGS. 8 and 9. The crimp body 106 has a front portion 200 that is designed to interact and connect with the spring push 124 and also is disposed within the opening 146 of the housing 102 when installed. The crimp body 106 has a rear portion 202 that extends behind the housing 102 and provides an outer surface 204 to receive a crimp band (e.g., crimp ring and heat shrink tube 108) therearound. Extending from a front end 206 to the rear end 208 is an opening 210. The opening 210 at the front portion 200 receives at least a portion of each of the lead-in tubes 134. The spring push 124 has two tabs 212 on opposites sides thereof and extend in a rear ward direction in the opening 210 to engage an opening 214 in side walls 216 of the crimp body 106. The front end 206 also has a forward facing surface 218 that complements the rear of the spring push and, together with the tabs 212 keeps the crimp body 106 securely fixed to fiber optic connector 100. Although the crimp body 106 is illustrated as being attached to the spring push 124, alternatively the crimp body 106 could be attached to the housing 102.

The opening 210 in the crimp body 106 rearwardly of the lead-in tubes provides a transition portion 220 for the optical fibers that are secured in the fiber optic ferrules 130. Since the crimp body 106 has a singular opening 222 at the rear end thereof, the optical fibers need to be able to exit that singular opening 222 in a smooth fashion so they are not bent beyond their bend radius, thereby damaging or breaking the optical fibers. The transition portion 220 provides for this function.

The crimp body 106 also has a top surface 230 and the bottom surface 232. The top surface 230 and the bottom surface 232 may be configured with a central portion 234 that is similar to the central portion 168 of the rail receiving portion 164 above. However, the crimp body 106 has two outer trough portions 236 that are open to the space above the crimp body 106. The central portion 234 and the two outer trough portions 236 function as an alignment feature of the rail receiving portion 164. As discussed more below, the latch component (push-pull mechanism) 104 can be better aligned with the rail receiving portion 164 by using the central portion 234 and the two outer trough portions 236 on the crimp body 106.

While the crimp body 106 is illustrated as a single, unitary body (i.e., molded at one time with one material), it could also be molded as two pieces and then later the two pieces secured to one another.

The latch component (push-pull mechanism) 104 is illustrated in more detail in FIGS. 10-17. The latch component (push-pull mechanism) 104 has a main body 250 and a latch body 252 that attaches to the main body 250. See FIGS. 10 and 11-13. The main body 250 has a front portion 254, a middle portion 256, and a rear portion 258. Generally, the front portion 254 is where the latch body 252 attaches to the main body 250 and provides for the latching of the fiber optic connector 100 to the adapter and carrier. The middle portion 256 provides for latching of latch component (push-pull mechanism) 104 to the housing 102. The rear portion 258 has a grasping portion 260 to allow a user to push and pull the latch component (push-pull mechanism) 104 to engage and disengage the fiber optic connector 100 and the latch component (push-pull mechanism) 104 from the adapter and/or carrier.

Figure 10A:
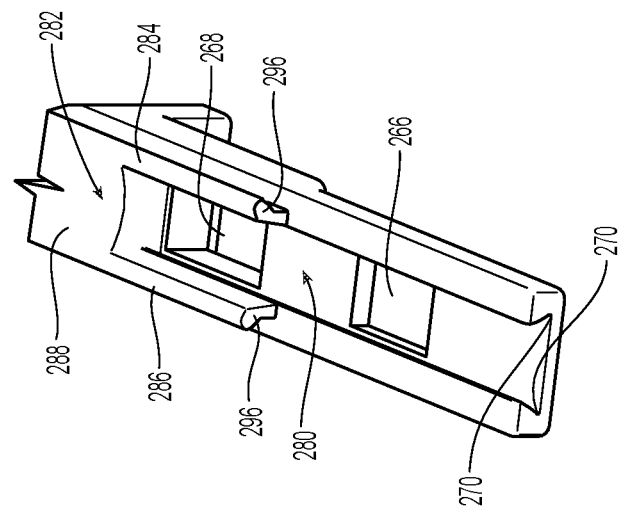
FIG. 10A is a perspective view of the underside of the push-pull mechanism of FIG. 10.
Figure 10:
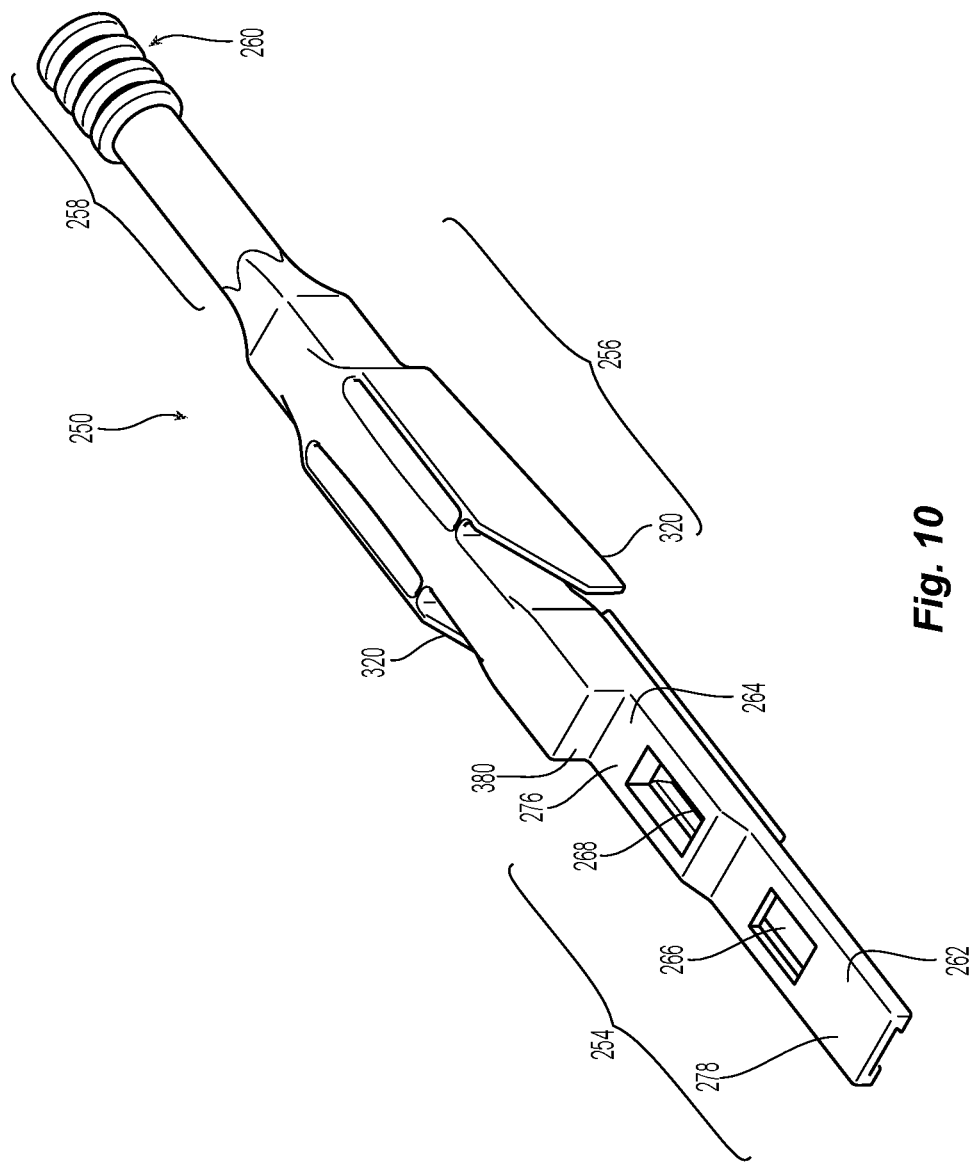
FIG. 10 is a perspective view of the push-pull mechanism of FIG. 1.
Figure 13:
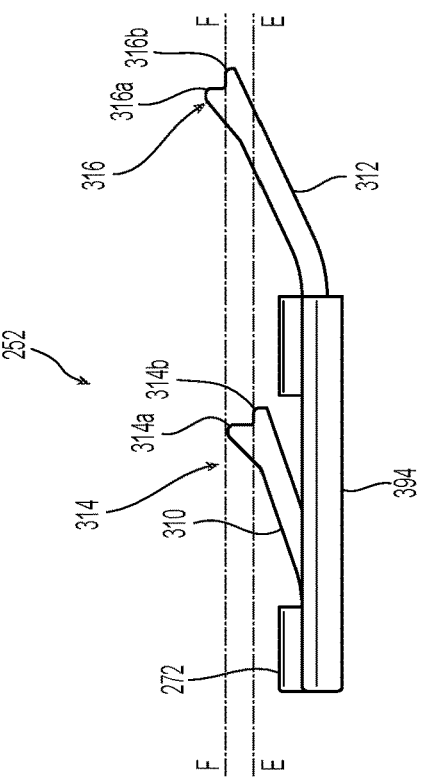
FIG. 13 is a side elevational view of the latch body in FIG. 11.
Figure 12:
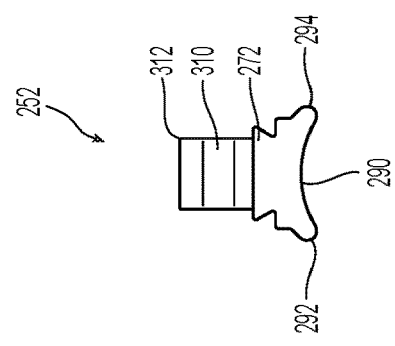
FIG. 12 is a front elevational view of the latch body in FIG. 11.
Figure 11:
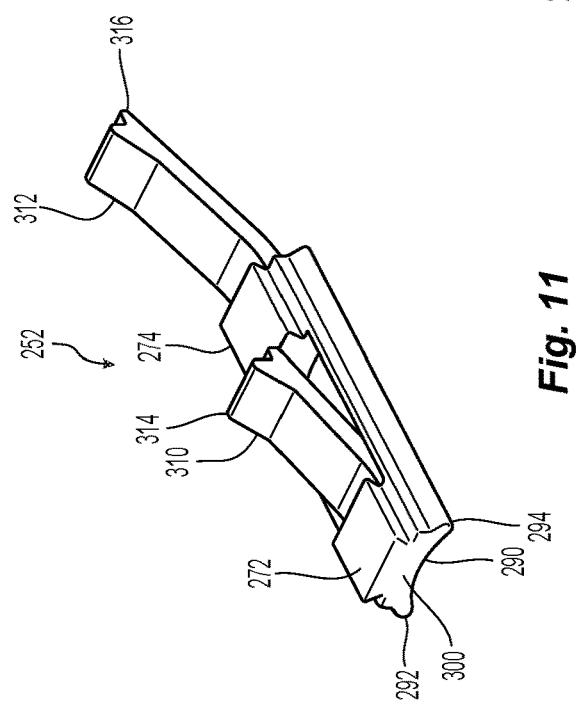
FIG. 11 is a perspective view of a latch body used with the push-pull mechanism in FIG. 10.
Figure 14:
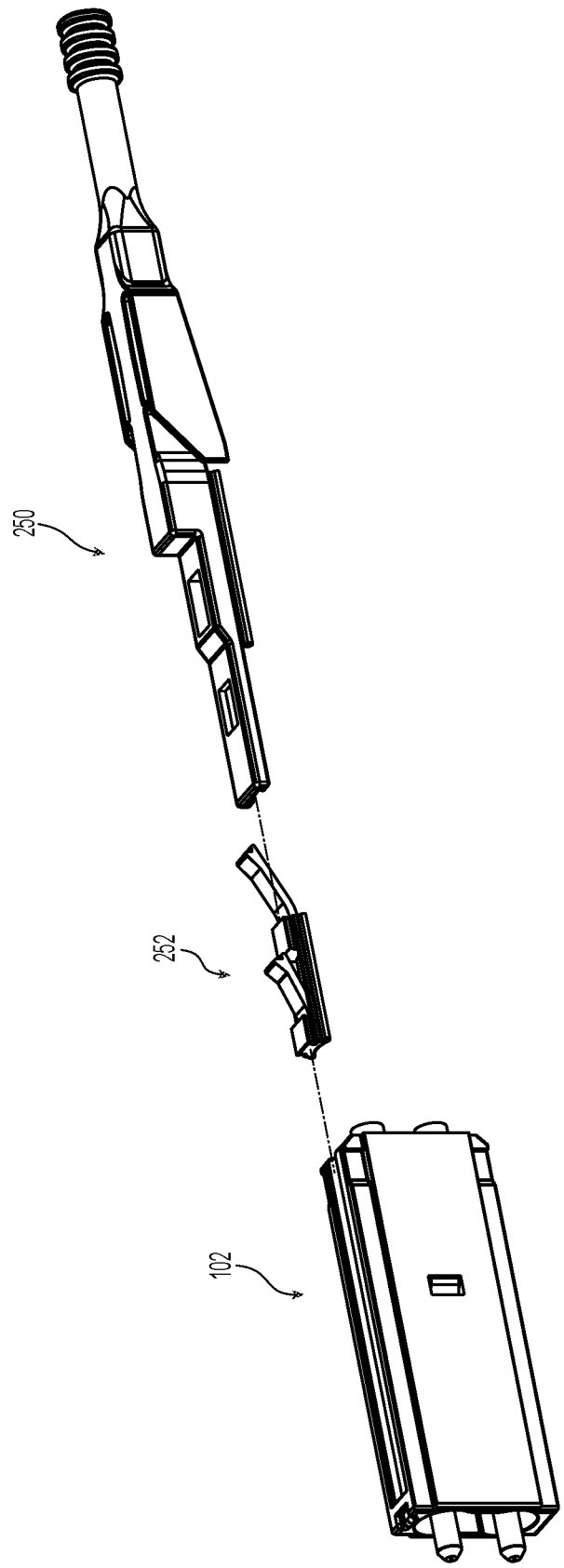
FIG. 14 is a perspective view of the push-pull mechanism and latch body illustrating how the latch body attaches to the push-pull mechanism.
Figure 15:
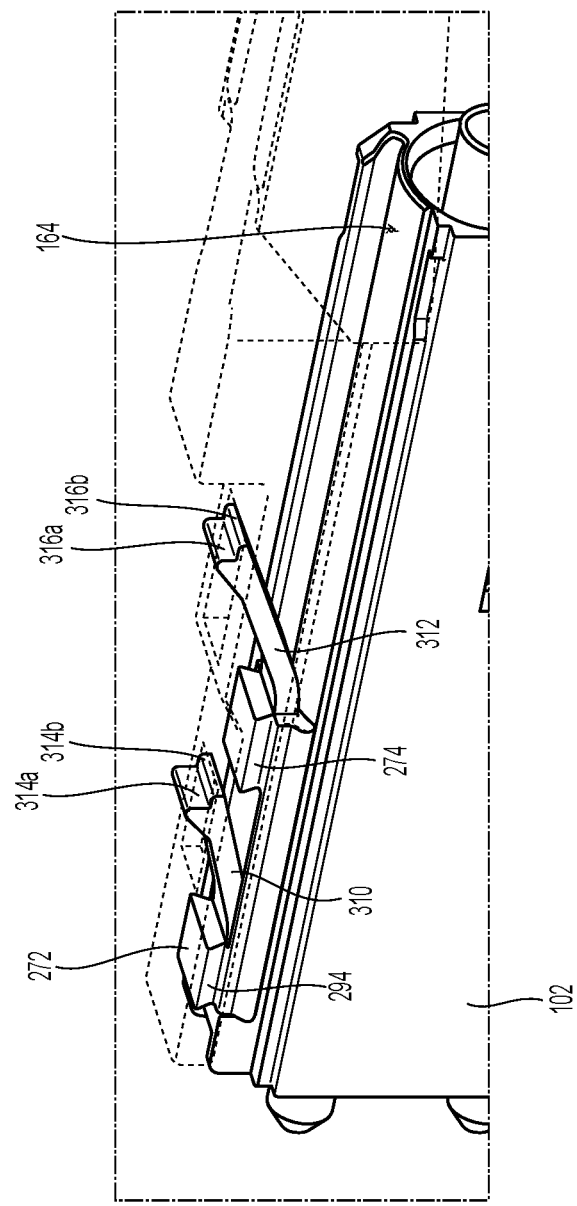
FIG. 15 is a partial, perspective view of the push-pull mechanism and latch body in FIG. 14.
Figure 16:
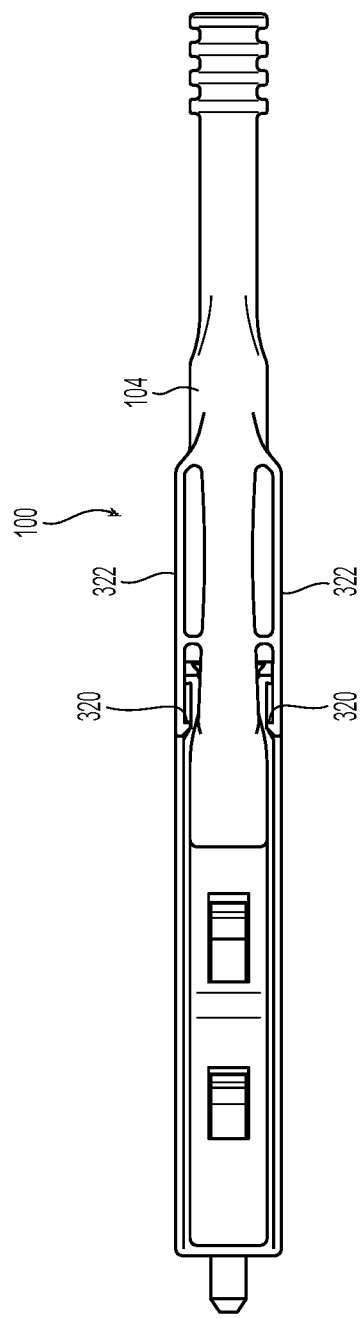
FIG. 16 is a top view of the push-pull mechanism in FIG. 14 attached to the fiber optic connector in FIG. 1.
Figure 17:
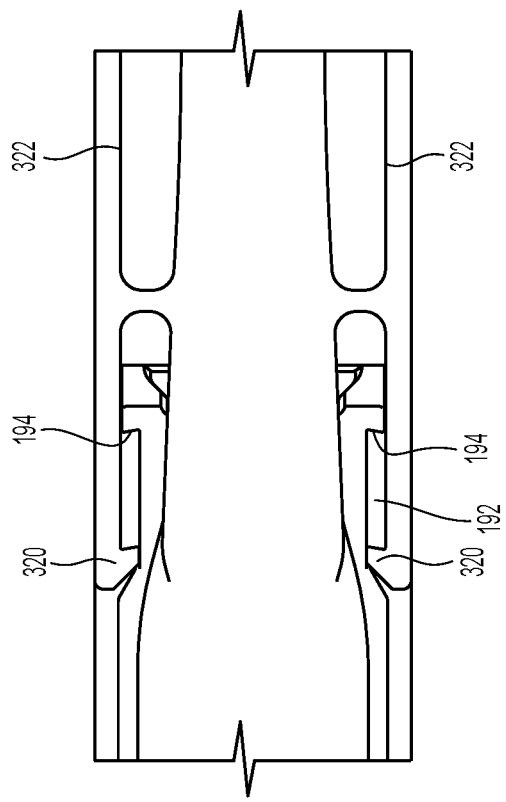
FIG. 17 is an enlarged view of the connection of the push-pull mechanism and housing in FIG. 16.
Figure 18:
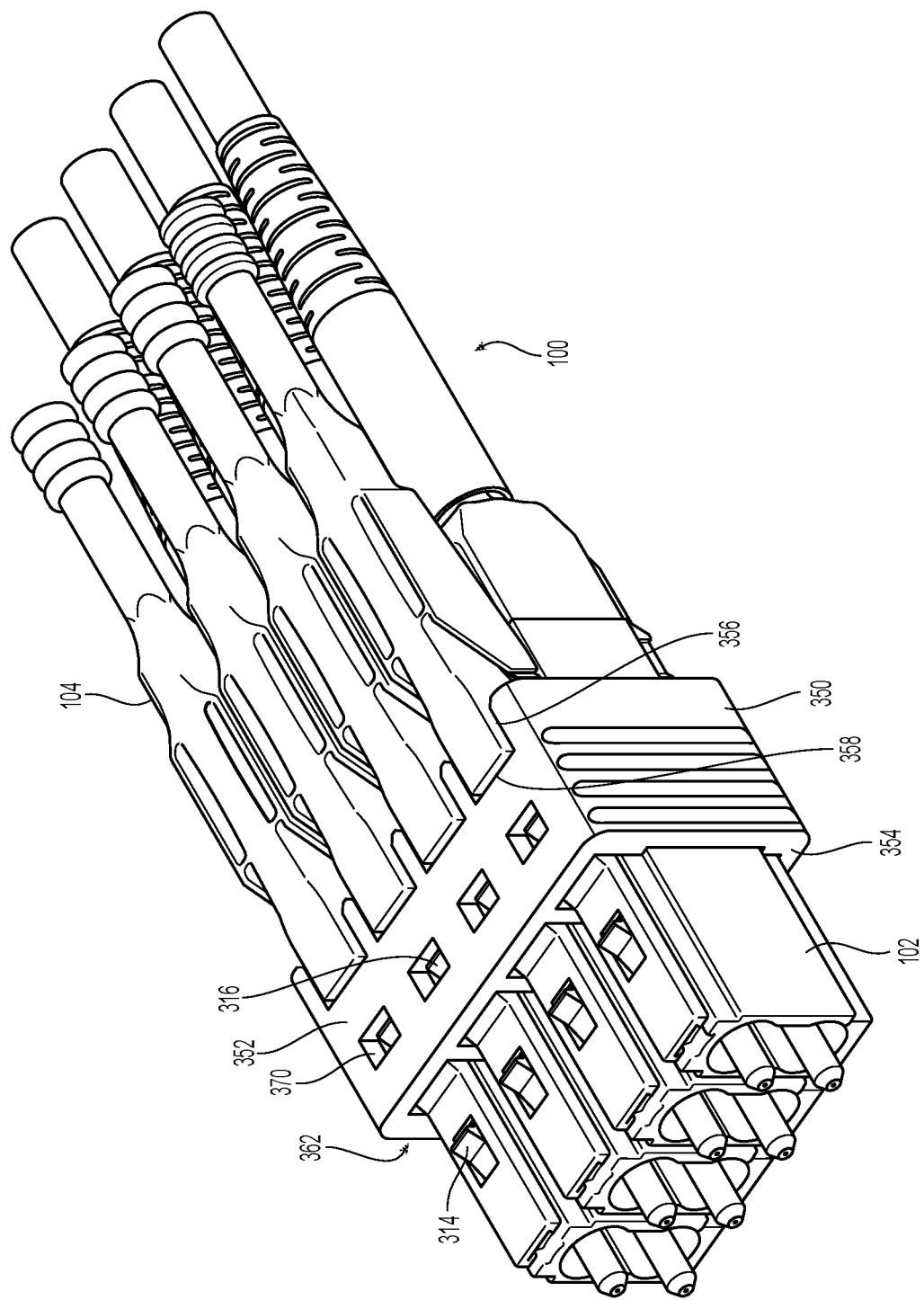
FIG. 18 is a front perspective view of a plurality of fiber optic connectors and push-pull mechanisms mounted in a carrier according to one embodiment of the present invention.

The front portion 254 is divided into a first front portion 262 and a second front portion 264. The first front portion 262 and the second front portion 264 both have a window 266, 268, respectively to receive a latch from the latch body 252 therethrough. An underside of the first portion 262 has a groove 270 on either side to receive attachment members 272, 274 from the latch body 252 (see FIGS. 10A and 11) to secure the latch body 252 to the main body 250. The attachment members 272, 274 (and thus the latch body 252) are able to slide within the grooves 270 to allow for the latching and unlatching the fiber optic connector 100. The grooves 270 should extend the length of the first portion 254.

The second front portion 264 has an upper surface 276 that is higher than an upper surface 278 of the first front portion 262. This allows for the latching of a carrier and an adapter with the same device, as noted in more detail below. On the bottom side 280 of the second front portion 264 is a rail portion 282 that includes two extensions 284, 286 that are joined by a central portion 288, all having a complementary configuration of the rail receiving portion 164 of the housing 102. See FIG. 10A. The latch body 252 also has the same rail portion configuration (central portion 290 and two extensions 292, 294) on the bottom thereof. This allows the main body 250 and the latch body 252 to be slidingly attached to the rail receiving portion 164 of housing 102. When the latch body 252 is inserted into the first front portion 262, a front surface 296 of the rail portion 282 provides a pushing surface by which the main body 250 can push the latch body 252 in the rail receiving portion 164 of the housing 102. See also FIG. 21. The front surface 300 of the latch body 252 also provides a pushing surface to be used against the stop surface 166 of the housing 102. This allows for the user to exert a force on the latch component (push-pull mechanism) 104 which is transferred through the main body 250 to the latch body 252 and to the housing 102 to insert the fiber optic connector 100 into a carrier and/or adapter.

Returning to FIGS. 11-13, the latch body 252 has two latches, an adapter latch 310 and a carrier latch 312. The latch body may only have one of the latches, depending upon its uses and the needs of the user. The adapter latch 310 extends from a forward portion of the latch body 252 and protrudes through window 266 of the main body 250. The carrier latch 312 also extends from the latch body 252, from a rear portion thereof, and protrudes through the window 268 of the main body 250. As is recognized from FIG. 13, the adapter latch 310 does not rise as high as the carrier latch 312 (plane E versus plane F) so that when the fiber optic connector 100 is inserted into or removed from a carrier, the adapter latch 310 will not engage the carrier.

Figure 21:
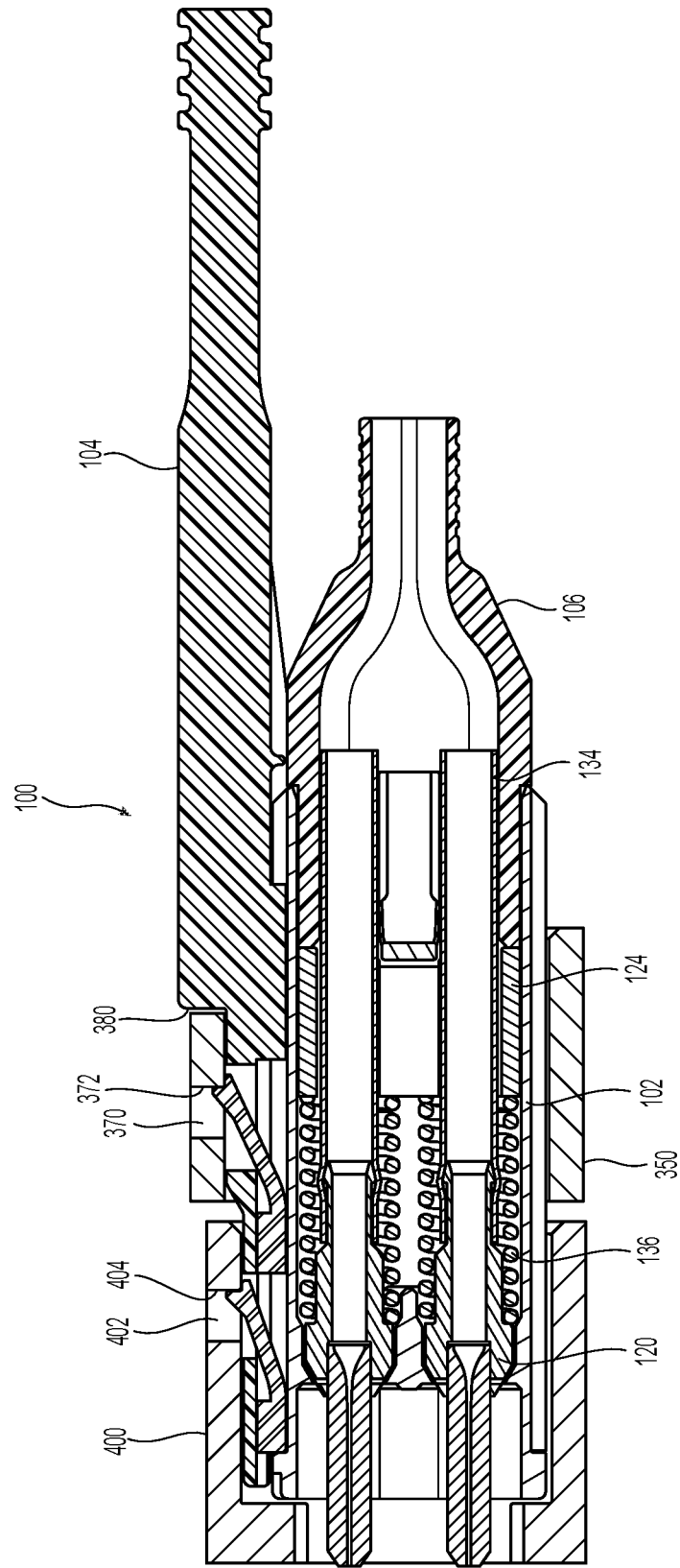
FIG. 21 is a cross section of the assembly of the push-pull mechanism and latch body and the fiber optic connector, all mounted in the carrier and inserted into the adapter.
Figure 22:
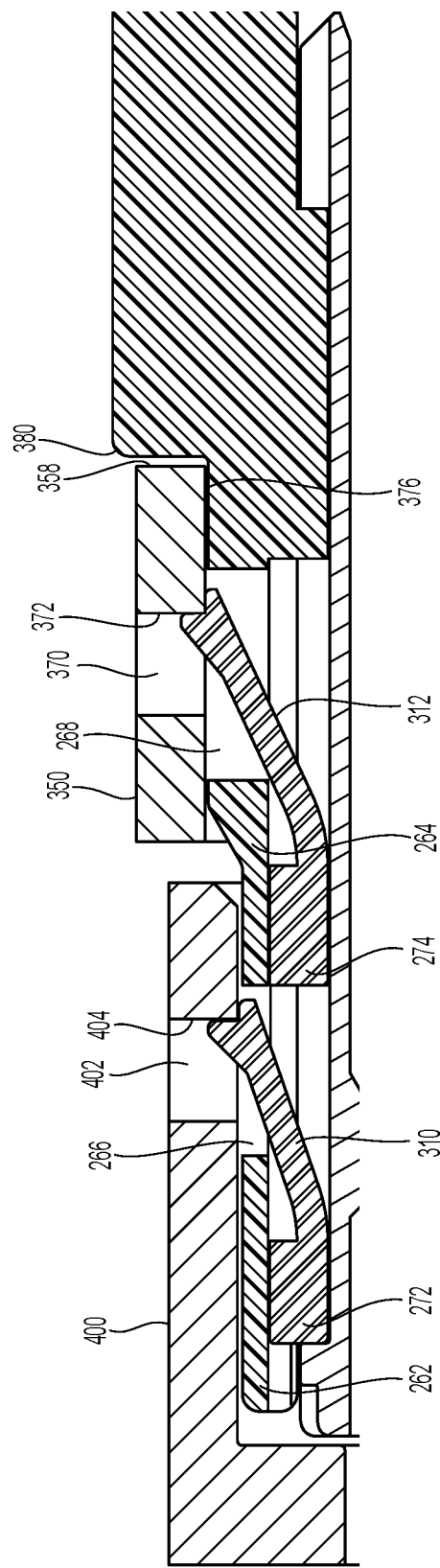
FIG. 22 is a cross section of a smaller portion of the assembly shown in FIG. 21 illustrating push-pull mechanism and latch body mounted in the carrier and the fiber optic connector adapter.

Each of the latches, adapter latch 310 and a carrier latch 312, each have a proximal end 314, 316, to engage an adapter and a carrier, respectively. The proximal ends 314, 316 will engage an opening in an adapter or a carrier. See, e.g., FIG. 21. FIG. 21 also shows two ferrule sleeves oriented in each channel in a vertically stacked arrangement such that the two ferrule sleeves are spaced apart from each other along the height of the adapter 400 in a direction between the top and the bottom of the main body of the adapter 400. The fiber optic ferrules 130 are received in the respective ferrule sleeves.

The latch component (push-pull mechanism) 104 is removably connected to the rail receiving portion 164 of the housing 102 as described above. However, the connections so far described do not prevent the latch component (push-pull mechanism) 104 from being removed toward the rear of the housing 102 when, for example, the grasping portion 260 is pulled rearwardly. However, in the middle portion 256, there are two latches 320 that extend from the latch component (push-pull mechanism) 104 inward and will move along rear portions of the longitudinal top portions 184 on each side of the housing 102. See FIGS. 1, 18, and 20. In particular, the housing 102 has indentations 192 for the latches 320 and will engage the forward facing surfaces 194 when the latch component (push-pull mechanism) 104 is pulled rearwardly. This will allow for the user to remove the fiber optic connector 100 from a carrier and/or adapter as will now be described. It should be noted that the latches 320 are cantilevered latches and thus pushing on area 322 (see FIGS. 16 and 17) will cause the latches to move away from the housing 102, and will release the housing 102 from the latch component (push-pull mechanism) 104.

Turning to FIGS. 1, 14, 15, and 18, the latch component (push-pull mechanism) 104 is connected to the fiber optic connector 100. The fiber optic connector 100 can be inserted into a carrier 350 (FIG. 18) and/or an adapter 400 (FIG. 20) in a small form-factor pluggable SFP and/or a quad small form-factor pluggable (QSFP) footprint. Thus the adapter is for a small form factor duplex fiber optic connector. As such, the adapter has a generally rectangular perimeter having a width and a height, and at least two channels (e.g., four channels) to receive the two duplex fiber-optic connectors (e.g., two of fiber optic connectors 100) side-by-side, as shown in FIG. 20. The main body of the adapter 400 is without internal walls along the width of the main body. The carrier 350 provides the user with a convenient way to insert into and remove 4 fiber optic connectors 100 (could also have more or fewer connectors, but usually in groups of two) from an adapter (or other telecommunications structure) rather than one at a time. It provides a cost savings time wise and also assists in preventing the stubbing of or breaking fiber optic connectors.

The carrier 350 has a few features that enable the use of the carrier 350 to correctly orient the fiber optic connectors 100 (polarity) and also to align the fiber optic connectors 100 to one another for insertion into the adapter. The carrier 350 has a top 352 and a bottom 354 and the top 352 has a cut out 356 for each of the fiber optic connectors 100, or the latch component (push-pull mechanism) 104. If the fiber optic connector 100 is inserted into the carrier 350 incorrectly (wrong polarity) then the fiber optic connector 100 will not seat in the carrier 350 correctly. The cut out 356 also has a rearward facing surface 358 that is used to remove all of the fiber optic connectors 100 from an adapter as discussed in more detail below.

The carrier 350 has an opening 360 extending between the front end 362 and the rear end 364. Inside the opening 360 are projections to accurately orient the fiber optic connectors 100 in the carrier 350. Extending from the top 352 into the opening 360 are the top extensions 366a. Along the corner of the top and the sides of the carrier 350 are partial top extensions 366b, which perform the same function as top extensions 366a. Similarly, there are bottom extensions 368a and partial bottom extensions 368b. As best seen in FIG. 19, the top extensions 366a are longer and extend down into the opening 360 farther than the bottom extensions 368a extend upward into the opening 360. The distance between corresponding top and bottom extensions 366a, 368a provide the vertical alignment of the fiber optic connector 100 within the carrier 350. Referring back to FIG. 6, the shoulders 188 and 190 and, more particularly, the distance between them and their vertical location along the sides 180 of the housing 102 orients the fiber optic connectors 100 vertically within the carrier 350. As can be gleamed from FIG. 19, if one of the fiber optic connectors 100 is oriented incorrectly, the longitudinal top portions 184 and the two longitudinal bottom portions 186 will be in the incorrect location and the latch component (push-pull mechanism) 104 will hit the carrier and prevent the fiber optic connector 100 from being fully inserted.

The horizontal alignment of the fiber optic connectors 100 is also controlled by the top extensions 366a and the bottom extensions 370. However, it is the longitudinal top portions 184 and the two longitudinal bottom portions 186 (the distance therebetween) engaging the top extensions 366a and the bottom extensions 370 that controls. FIG. 19 also shows that there is very limited space between the fiber optic connectors 100 and allows for a higher density of fiber optic connectors 100.

Once the fiber optic connectors 100 with the latch component (push-pull mechanism) 104 are correctly inserted into the carrier 350, a latch stop 380 on the latch component (push-pull mechanism) 104 will engage the rearward facing surface 358 of the carrier 350. The carrier 350 is captured between the latch stop 380 and rearward facing surface 316a of carrier latch 312. This will expose enough of the latch component (push-pull mechanism) 104 and, in particular, the first front portion 262. At the same time, the top 352 of the carrier 350 has windows 370 to receive the carrier latch 312 from each latch body 252, and in particular the proximal end 316. See FIGS. 21 and 22. However, as the fiber optic connector 100 passes into the and through carrier 350, the adapter latch 310 is too short to engage the carrier 350.

With the carrier latch 312 now in the window 370 and engaging surface 372 created by the window 370, the carrier 350 or the latch component (push-pull mechanism) 104 can be used to insert the fiber optic connectors 100 into the adapter 400. As clear from FIGS. 21 and 22, if the carrier 350 is used to insert the ganged fiber optic connectors 100 (in the carrier 350 in FIG. 20), then the carrier 350 will push on the carrier latch 312, which is on the latch body 252 and has front surface 300 of the latch body 252, which then pushes against the stop surface 166 of the housing 102 to secure the ganged fiber optic connectors 100. Thus, all of the fiber optic connectors 100 will be pushed simultaneously into the adapter. On the other hand, one could also used the latch component (push-pull mechanism) 104 to insert them as well.

As the ganged fiber optic connectors 100 are inserted into the adapter 400, each of the adapter latches 310 will pop up into a respective window 402. The window 402 forms at least one cutout on the top or the bottom of the main body. With the adapter latch 310 now in the window 402 and engaging surface 404 created by the window 402, the ganged fiber optic connectors 100 are secured within the adapter 400. The engaging surface 404 is a forward facing surface within each of the at least two channels, respectively, for latching the at least two duplex fiber-optic connectors 100. Thus, there are at least two forward facing surfaces. The adapter 400 has the same projections to accurately orient the fiber optic connectors 100 in the adapter 400. That is, the adapter 400 also has a top alignment feature on the top and a bottom alignment feature on the bottom (between the internal downward and upward projections in FIG. 20) for each channel to orient the fiber optic connectors 100 thereinto or out thereof. Thus, applicant will not repeat the same structures here.

The fiber optic connectors 100 can be removed from the adapter 400 one at a time or all at the same time with the carrier 350. To remove one fiber optic connector 100 from the adapter 400 (if only in the adapter) or the adapter 400 and the carrier 350, one only need to pull on the grasping portion 260 of the latch component (push-pull mechanism) 104. As the latch component (push-pull mechanism) 104 is pulled backward, it moves rearward relative to the latch body 252 (because the adapter latch 310 and the carrier latch 312 are against the engaging surfaces 372, 404, respectively) and the portions forward of the windows 266, 268, will move over the adapter latch 310 and a carrier latch 312, pushing them down and out of the windows 370, 402. Continued pulling on the grasping portion 260 of the latch component (push-pull mechanism) 104 causes the latches 320 to engage the forward facing surfaces 194 of the housing 102 and the whole fiber optic connector can be removed.

If the ganged fiber optic connectors 100 are to be removed together and only from the adapter 400, then the user will pull on the carrier 350 (while the adapter 400 remains fixed relative thereto). The carrier 350 and, in particular, the rearward facing surface 358 will engage latch stop 380 on the latch component (push-pull mechanism) 104 of each of the fiber optic connectors 100. As noted above, the portions forward of the windows 266, 268, will move over the adapter latch 310 (and carrier latch 312, but the carrier 350 will retain the fiber optic connectors 100), pushing them down and out of the windows 370, 402. Continued pulling on the carrier causes the latches 320 to engage the forward facing surfaces 194 of the housing 102 and all of the ganged fiber optic connectors 100 can be removed from the adapter 400. The fiber optic connector 100 can be inserted into and removed the same adapter 400 without a carrier 350 present. A partially populated carrier in the adapter can how a single fiber optic connectors removed for install, while the carrier will stay connected to the fiber optic connectors that remain in the adapter. When the last fiber-optic connector is removed is from the adapter, it will bring the carrier with it.

Figure 23:
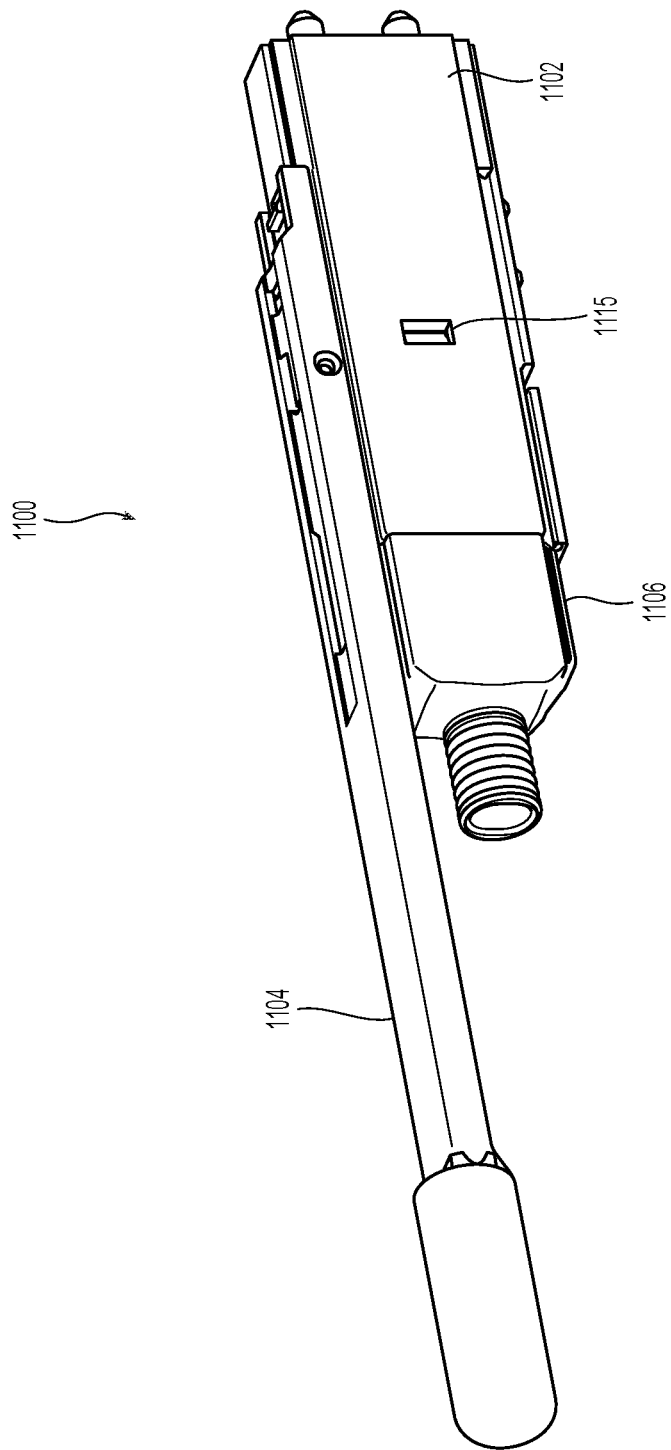
FIG. 23 is an elevational view of a second embodiment of a fiber optic connector with a push-pull mechanism, crimp body, and boot according to the present invention.

A second embodiment of a fiber optic connector 1100 according to the present invention is illustrated in FIGS. 23-36. The fiber optic connector 1100, in FIG. 23, may include a housing 1102, a latch component (push-pull mechanism) 1104, and a crimp body 1106. As discussed in more detail below, the housing 1102 and its components, the latch component 1104, and the crimp body 1106 are the focus here. It is also preferred that there by a crimp ring and heat shrink tube and a strain relief boot as with the prior embodiment, but since the crimp ring and heat shrink tube and a strain relief boot are generally known components, they are omitted here for clarity.

Figure 24:
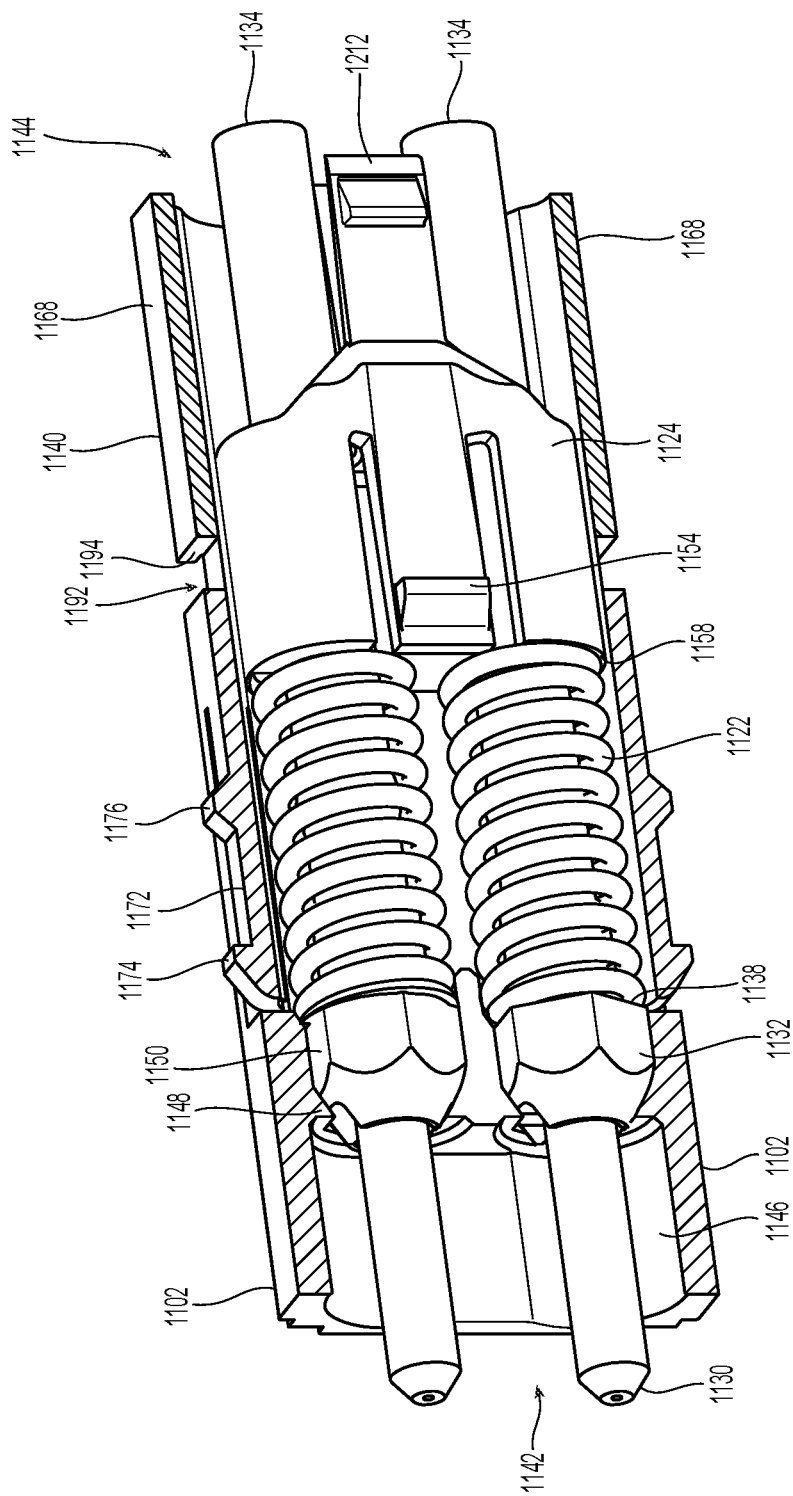
FIG. 24 is a partial cross sectional view of the housing with the two ferrule assemblies and a spring push of the fiber optic connector in FIG. 23.
Figure 27:
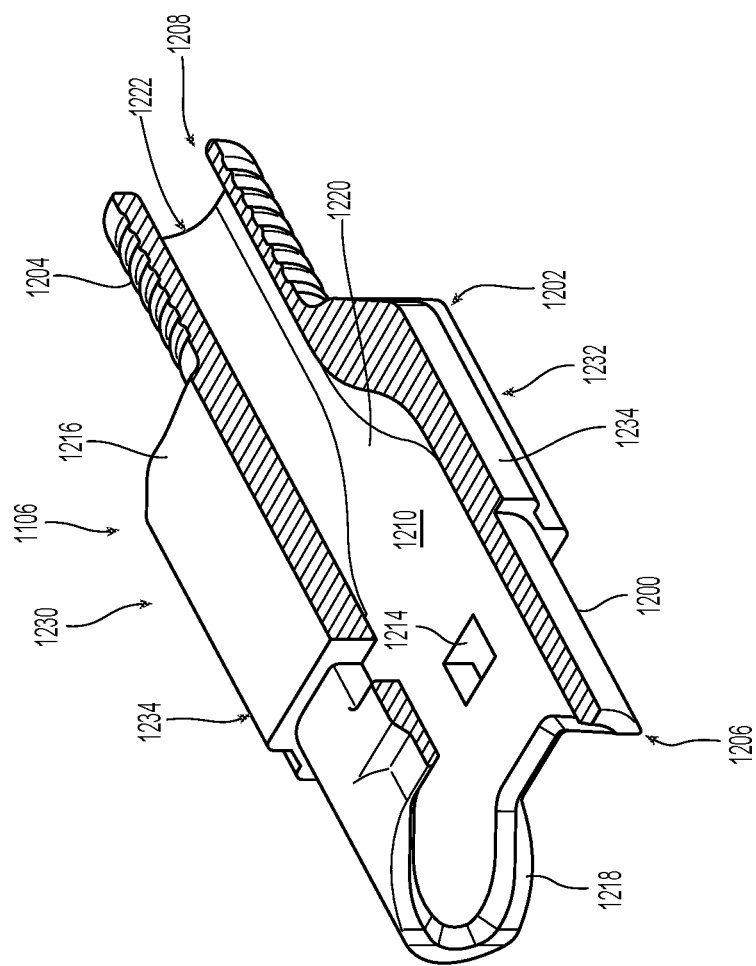
FIG. 27 is partial cross section of a second embodiment of a crimp body according to the present invention and shown in FIG. 23.

Turning to FIG. 24, inside the housing 1102 are two ferrule assemblies 1120 (which may be the same as ferrule assemblies 120), two springs 1122, and a spring push 1124. The two ferrule assemblies 1120 each include a fiber optic ferrule 1130 (generally a 1.25 mm LC fiber optic ferrule), a ferrule holder 1132, and a lead-in tube 1134. The spring 1122 is added later. The ferrule assemblies 1120 are preferably preassembled and are inserted into the housing 1102 without needing any further processing.

The housing 1102 has a main body 1140 extending between a front end 1142 and a rear end 1144, and has an opening 1146 extending therebetween. The opening 1146 of the housing 1102 may also have structures 1148 that orient and retain the ferrule assemblies 1120 in the housing 1102. In this case, there are flat surfaces 1150 that engage corresponding flat surfaces 1152 on the ferrule holder 1132, to keep the ferrule assemblies 1120 from rotating within the housing 1102.

Once the ferrule assemblies 1120 are disposed within the housing 1102, the springs 1122 are placed around the lead-in tube 1134 and against a back end 1138 of the ferrule holder 1132. The spring push 1124 is then inserted into the opening 1146 of the housing 1102. The spring push 1124 has a pair of latches 1154 that engage corresponding openings 1156 in the opposite sides of the main body 1140 of the housing 1102 to retain the spring push 1124 in the opening 1146. The spring push 1124 has a forward facing surface 1158 to engage the rear ends of the springs 1122. The forward facing surface 1158 generally corresponds to the two springs 1122 to ensure that that the spring push 1124 stays engaged with the springs 1122. This configuration biases the ferrule assemblies 1120 toward the front end 1142 of the housing 1102. While not shown, two optical fibers enter into the ferrule assemblies 1120 through the spring push 1124 and into the lead-in tubes 1124.

The lead-in tubes 1134 are connected to and extend from the ferrule holder 1132. Preferably, the lead-in tubes 1134 are secured to the ferrule holder 1132, e.g. by adhesives, press-fit. The lead-in tubes 1134 also extend beyond the rear end of the ferrule holder 132 and the springs 1122 and the spring push 1124. See FIG. 24. This allows for injection of epoxy or other adhesives into the ferrule assemblies 1120 through the lead-in tubes 1134 to secure the optical fibers therein. With the lead-in tubes 1134 extending so far rearwardly, there is no concern that the epoxy or adhesives will interfere with the springs 1122, the spring push 1124, or other structures in the fiber optic connector 1100.

The housing 1102 may also have an indicia of the polarity of the fiber optic connector 1100 as with the prior embodiment. Similarly, an indentation or other mark may be present on the housing 1102.

The outside of the housing 1102 has many features that are integral to its use. See FIGS. 25 and 26. First are the top surface 1160 and the bottom surface 1162. The top and bottom surfaces 1160,1162 are preferably the same, but may have some differences and still fall within the scope of the present invention. Extending from the rear end 1144 towards the front 1142 of the housing 11020 on both the top surface 1160 and the bottom surface 1162 is a rail receiving portion 1164. As will be discussed in more detail below, the rail receiving portion 1164 will stop before the front end 1142 as it will therefore create a stop surface 1166. The latch component (push-pull mechanism) 1104 will make use of the stop surface 1166 to insert the fiber optic connector 1100 into various structures.

The rail receiving portion 1164 has a central portion 1168 and two lobe sections 1170, one lobe on each side of the central portion 1168. As best seen in FIG. 26, the rail receiving portion 1164 has a T-shape configuration. This configuration matches that of the bottom surface of the latch component (push-pull mechanism) 1104 to form a sliding configuration. Other configurations are possible, as noted above.

The next feature of the housing 1102 and main body 1140 are the two side surfaces 1180. The two side surfaces 1180 are those opposite to one another and separated by the top surface 1160 and the bottom surface 1162. Referring to FIG. 26 in particular, each of the sides 1180 are divided into at least three portions. The first portion is a longitudinal central portion 1182 extending in a first plane G. The second portion is a longitudinal top portion 1184 extending in a second plane H, the first plane G is parallel to and offset from the second plane H. The third portion is a longitudinal bottom portion 1186 extending in the second plane H. The longitudinal top portion 1184 preferably is divided from the longitudinal central portion 1182 by a shoulder 1188. The shoulder 1188 preferably has a surface that is in plane I and is perpendicular to both planes G and H. Similarly, the longitudinal bottom portion 1186 preferably is divided from the longitudinal central portion 1182 by a shoulder 1190. The shoulder 1190 preferably has a surface that is in plane J and is perpendicular to both planes G and H. There is also an inclined wall 1196 between the bottom of the central portion 1168 and the shoulder 1188. A portion of the latch component (push-pull mechanism) 1104 uses this inclined wall 1196 as a reference surface while moving along the housing 1102. See FIG. 26. The inclined wall 1196 ends at the stop surface 1166, where the latch component (push-pull mechanism) 1104 engages the stop surface 1166 to move the fiber optic connector 1100 as discussed below.

The two longitudinal top portions 1184 and the two longitudinal bottom portions 1186 function to align the fiber optic connector 1100 in a horizontal direction in various structures, e.g., a carrier and an adapter. On the other hand, it is the shoulders 1188,1190 that align the fiber optic connector 1100 in a vertical direction as was discussed in detail above. As such, this discussion is not included here.

Also on the top surface 1160 and the bottom surface 1162 is a latch 1172 with an engagement surface 1174 and a release ramp 1176. The latch 1172 is a cantilevered latch that works with the latch component (push-pull mechanism)

1104 to engage and disengage from an adapter. Finally, on the top surface 1160 and the bottom surface 1162 is an opening 1192 in the rail receiving portion 1164 for an extension from the latch component (push-pull mechanism) 1104. As described in more detail below, the extension from the latch component (push-pull mechanism) 1104 engages a forward facing surface 1194 to remove the fiber optic connector 1100 from the adapter and or carrier. See FIG. 24.

The crimp body 1106 has a front portion 1200 that is designed to interact and connect with the spring push 1124 and also is disposed within the opening 1146 of the housing 1102 when installed, which is usually after the epoxy used to secure the optical fibers in the ferrules 1130 has cured. The crimp body 1106 has a rear portion 1202 that extends behind the housing 1102 and provides an outer surface 1204 to receive a crimp band (e.g., crimp ring and heat shrink tube) therearound. Extending from a front end 1206 to the rear end 1208 is an opening 1210. The opening 1210 at the front portion 1200 receives at least a portion of each of the lead-in tubes 1134. The spring push 1124 has two tabs 1212 (FIG. 24) on opposites sides thereof and extend in a rearward direction in the opening 1210 to engage an opening 1214 in side walls 1216 of the crimp body 1106. The front end 1206 also has a forward facing surface 1218 that complements the rear of the spring push 1124 and, together with the tabs 1212, keeps the crimp body 1106 securely fixed to fiber optic connector 1100.

The opening 1210 in the crimp body 1106 rearwardly of the lead-in tubes provides a transition portion 1220 for the optical fibers that are secured in the fiber optic ferrules 1130. Since the crimp body 1106 has a singular opening 1222 at the rear end thereof, the optical fibers need to be able to exit that singular opening 1222 in a smooth fashion so they are not bent beyond their bend radius, thereby damaging or breaking the optical fibers. The transition portion 1220 provides for this function.

The crimp body 1106 also has a top surface 1230 and the bottom surface 1232. The top surface 1230 and the bottom surface 1232 may be configured with an area 1234 that complements the central portion 1168 and two lobe sections 1170 of the rail receiving portion 1164 above. The area 1234 functions as an alignment feature of the rail receiving portion 1164. As discussed more below, the latch component (push-pull mechanism) 1104 can be better aligned with the rail receiving portion 1164 by using the area 1234 on the crimp body 1106.

While the crimp body 1106 is illustrated as a single, unitary body (i.e., molded at one time with one material), it could also be molded as two pieces and then later the two pieces secured to one another.

Figure 28:
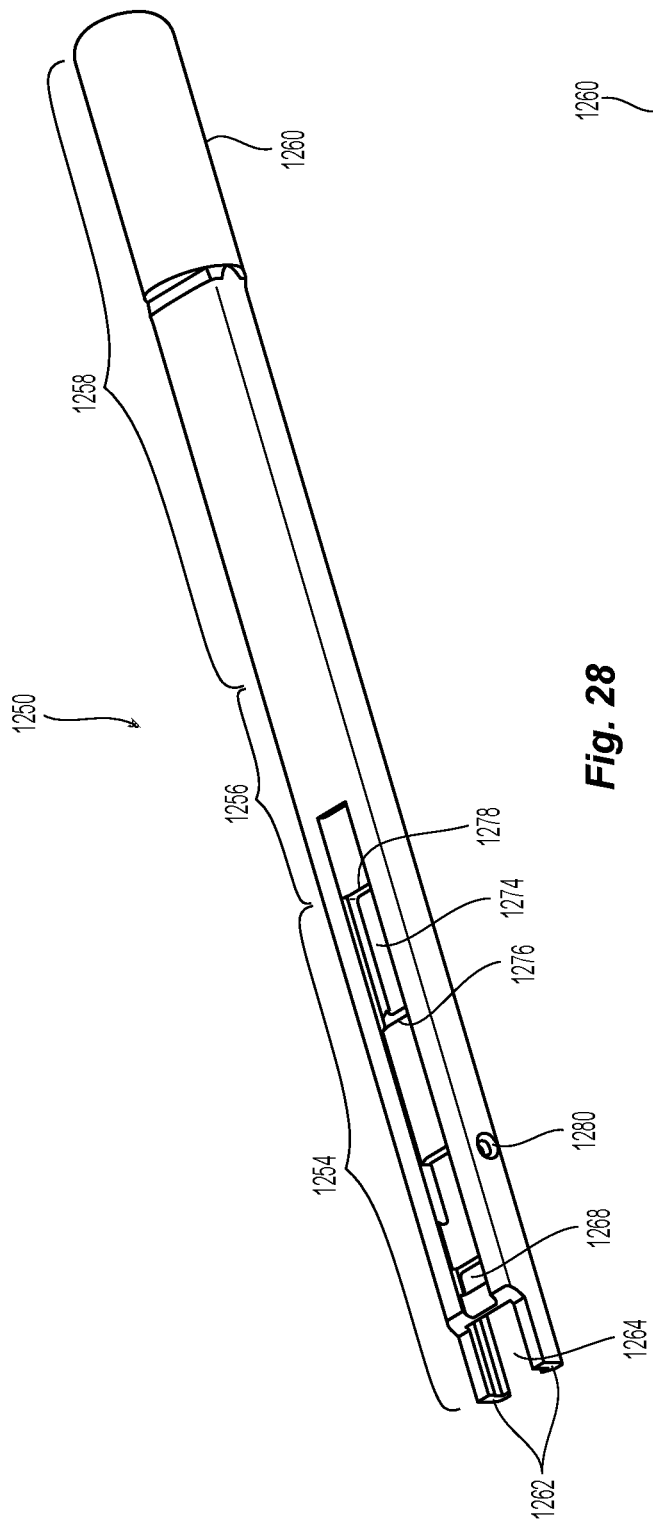
FIG. 28 is a perspective view of the second embodiment of a push-pull mechanism according to the present invention and shown in FIG. 23.
Figure 29:
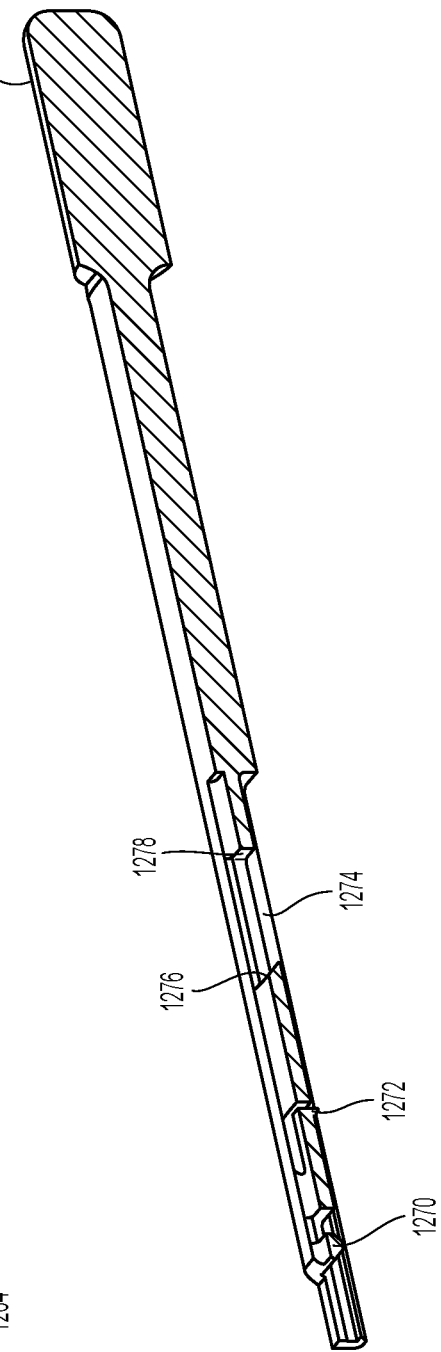
FIG. 29 is a cross section view of the push-pull mechanism in FIG. 27.

The latch component (push-pull mechanism) 1104 is illustrated in more detail in FIGS. 28-29. The latch component (push-pull mechanism) 1104 has a main body 1250, with a front portion 1254, a middle portion 1256, and a rear portion 1258. Generally, the front portion 1254 is where the latch component 1104 engages the fiber optic connector 1100 and controls connections to an adapter and carrier. The middle portion 1256 generally provides for latching of latch component (push-pull mechanism) 1104 to a carrier. The rear portion 1258 has a grasping portion 1260 to allow a user to push and pull the latch component (push-pull mechanism) 1104 to engage and disengage the fiber optic connector 1100 (push-pull mechanism) 1104 from the adapter and/or carrier.

When the latch component (push-pull mechanism) 1104 is installed on the housing 1102, the front portion 1254 has two rails 1262 to engage the stop surface 1166 to push the fiber optic connector 1100. Pushing on the latch component (push-pull mechanism) 1104 causes the force to be transferred to the rails 1262. There is a space 1264 between the rails 1262 to allow for the engagement surface 1174 of the latch 1172 to pass therebetween. The front portion 1254 then, moving rearwardly, has an opening 1268. The opening 1268 receives the release ramp 1176. A front portion of the opening 1268 has a chamfered surface 1270 to engage the chamfered surface of the release ramp 1176. See also FIGS. 28 and 29. Behind the opening 1268 is a downward extension 1272 to fit within the opening 1192 in the rail receiving portion 1164 and to engage the forward facing surface 1194 when removing the fiber optic connector 1100 as discussed below. See also FIG. 24.

The next feature of the latch component (push-pull mechanism) 1104 is in the middle portion 1256 and is an opening 1274 that receives a part of a carrier for a number of fiber optic connectors 1100. As noted above, sometimes it is beneficial for a number of fiber optic connectors 1100 to be linked to one another. This opening 1274 along with another embodiment of a carrier 1350 allows for the insertion/removal of the fiber optic connectors 1100 from an adapter 1400. The opening 1274 is partially formed by a chamfered front surface 1276 and a generally flat rear surface 1278.

The rear portion 1258 of the latch component (push-pull mechanism) 1104 has a grasping portion 1260. Finally, a release 1280 is disposed on the side of the latch component (push-pull mechanism) 1104. The release 1280 is an opening that provides access to the downward extension 1272 that fits within the opening 1192. As noted above, the downward extension 1272 keeps the latch component (push-pull mechanism) 1104 positioned with the housing 1102. To disengage the latch component (push-pull mechanism) 1104 from the housing 1102, a pin or other small tool can be inserted into the release 1280 and deflect downward extension 1272 upward and out of the opening 1192. The latch component (push-pull mechanism) 1104 can now be moved rearwardly from the housing 1102.

Figure 30:
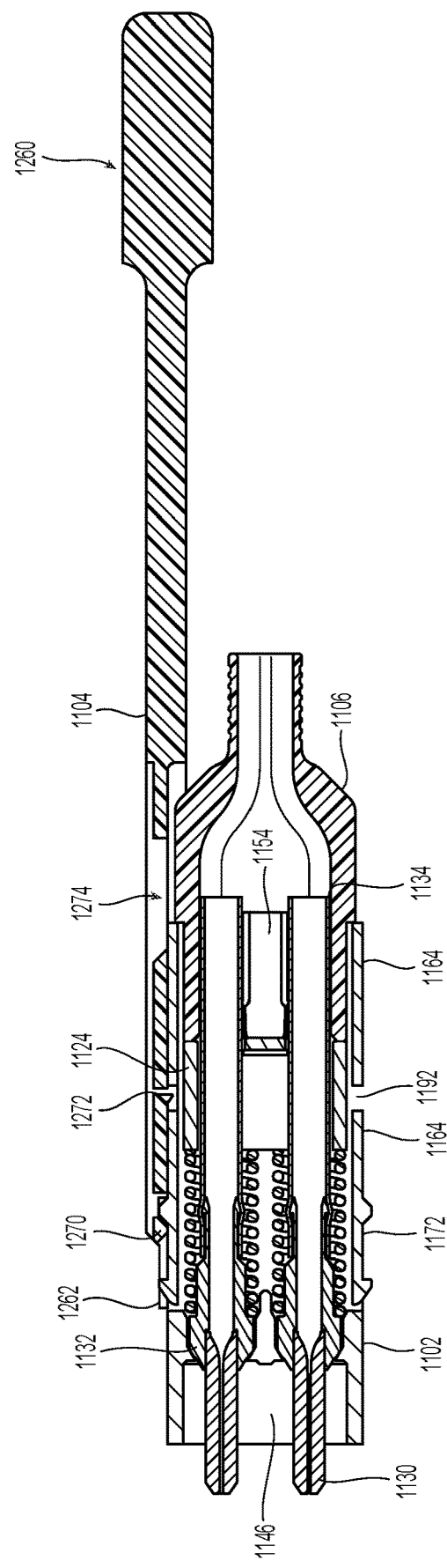
FIG. 30 is cross section of the fiber optic connector with a push-pull mechanism and crimp body of FIG. 23.
Figure 31:
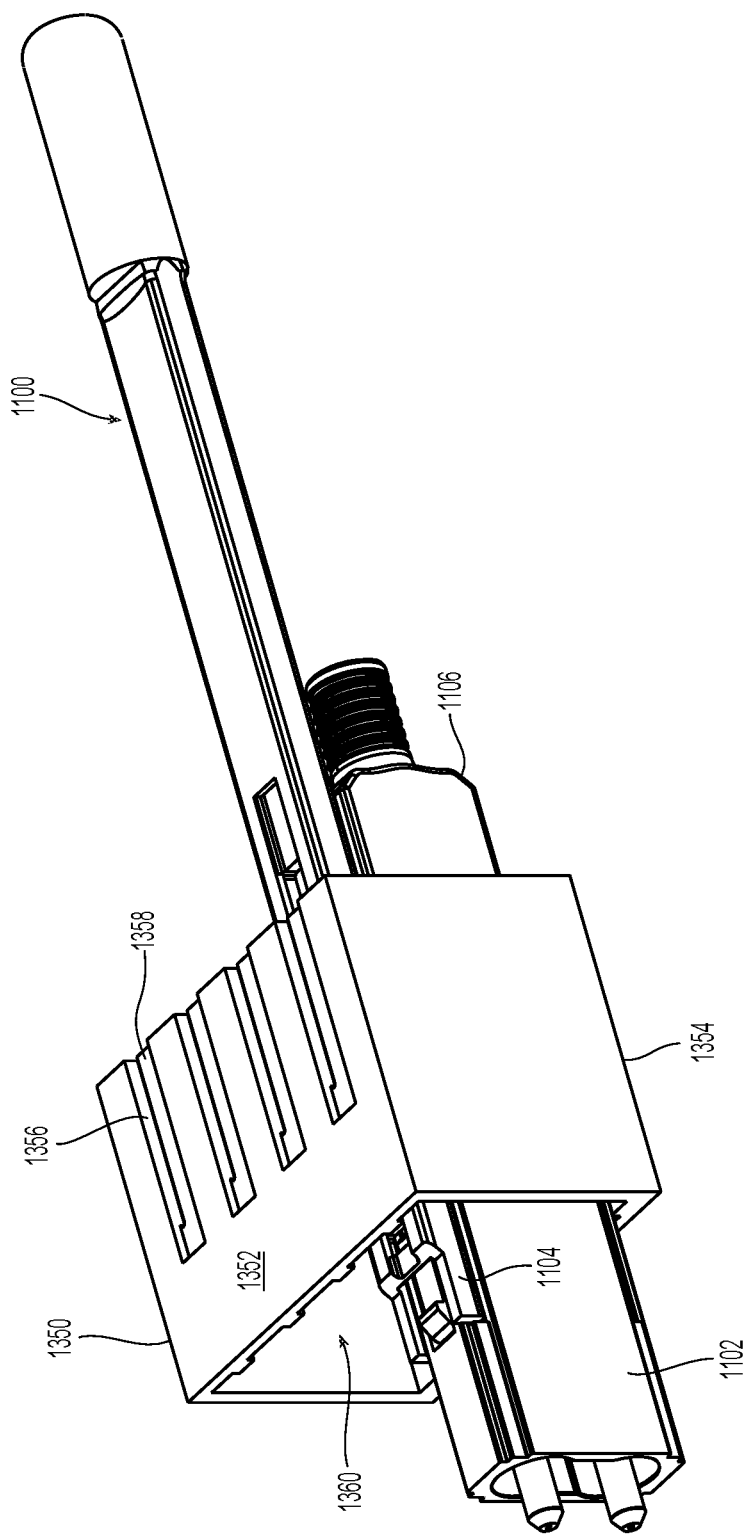
FIG. 31 is a perspective view of a fiber optic connector and push-pull mechanisms of FIG. 23 mounted in a carrier.
Figure 32:
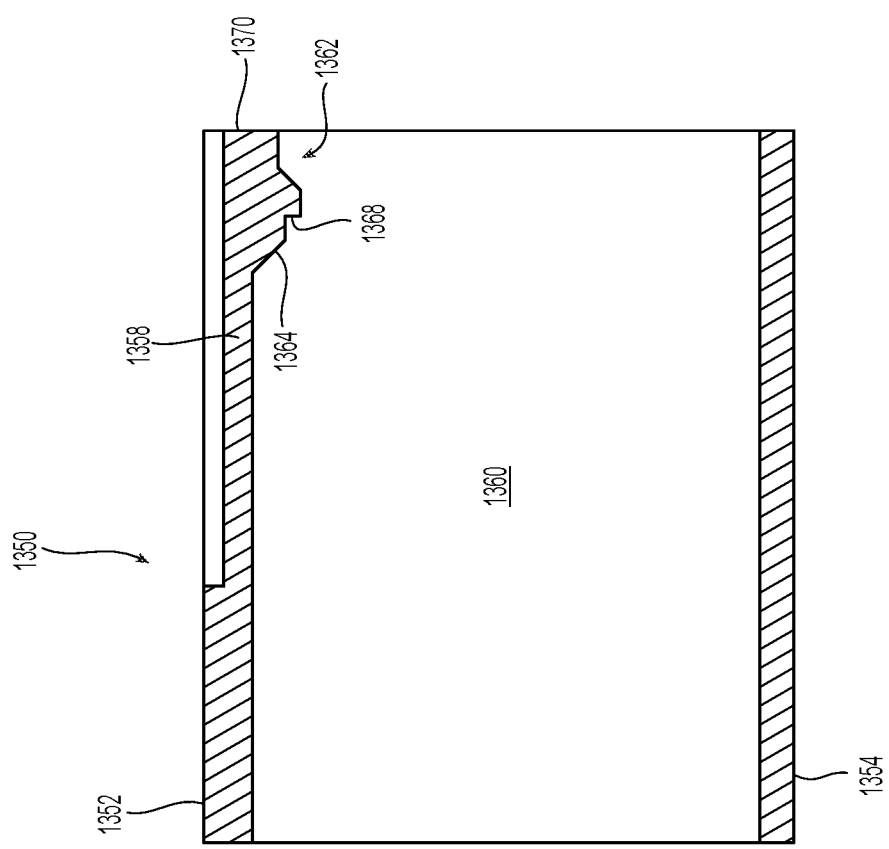
FIG. 32 is a cross section view of the carrier of FIG. 30 without the fiber optic connector.

FIG. 30 illustrates the fiber optic connector 1100 fully assembled and ready to be used. The major components of the fiber optic connector 1100 are labeled and the latch component (push-pull mechanism) 1104 in position to insert the fiber optic connector 1100 into a carrier 1350 and/or an adapter 1400. As can be seen, the latch component (push-pull mechanism) 1104 is fully engaged and the two rails 1262 have engaged the stop surface 1166.

Figure 33:
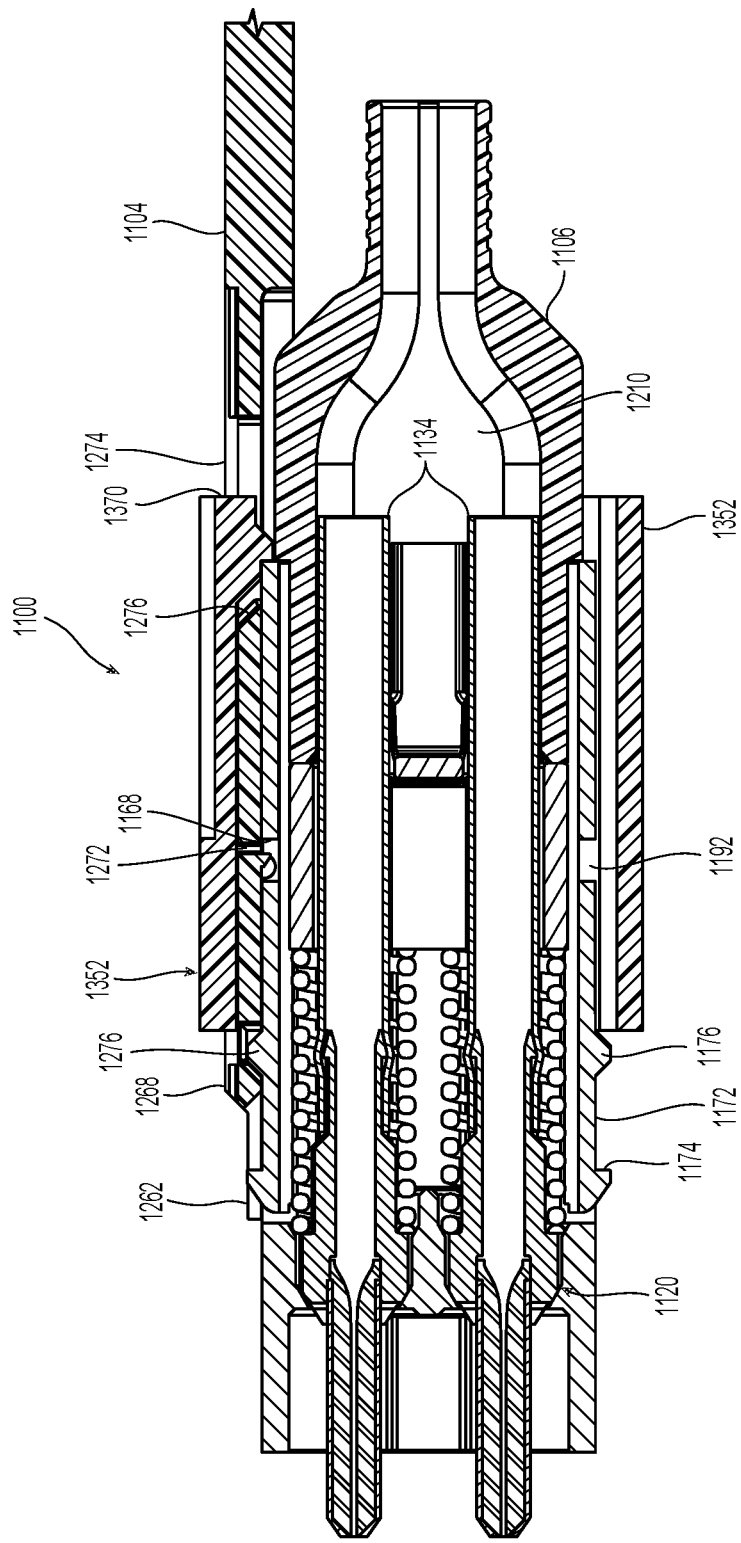
FIG. 33 is a cross section view of the fiber optic connector with a push-pull mechanism and crimp body of FIG. 23 in an embodiment of a carrier.
Figure 34:
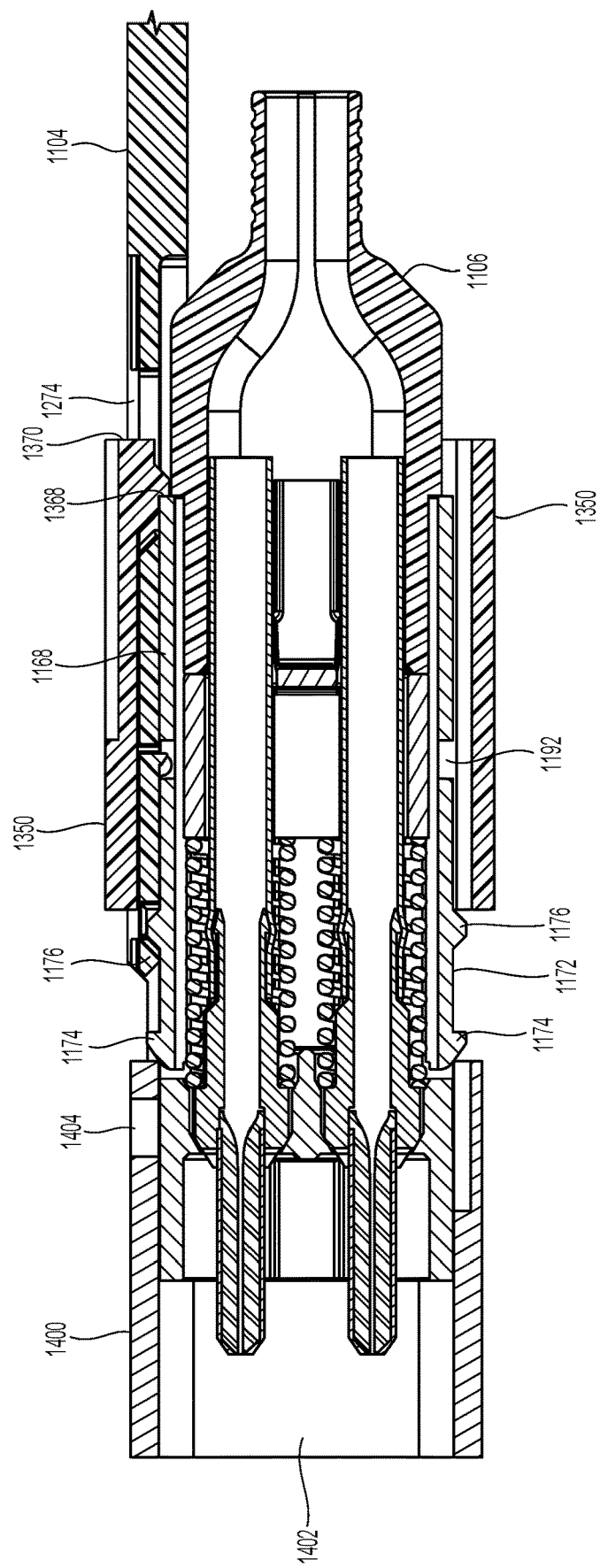
FIG. 34 is a cross section view of fiber optic connector with a push-pull mechanism and crimp body in a carrier being inserted into an adapter.

Turning to FIGS. 30, 31, 33, and 36, the fiber optic connector can be inserted into a carrier 1350 (FIGS. 30 and 31) and/or an adapter 1400 (FIG. 34). The carrier 1350 provides the user with a convenient way to insert into and remove 4 fiber optic connectors 1100 (could also have more or fewer connectors, but usually in groups of two) from an adapter (or other telecommunications structure) rather than one at a time. It provides a cost savings time wise and also assists in preventing the stubbing of or breaking fiber optic connectors.

The carrier 1350 has a few features that enable the use of the carrier 1350 to correctly orient the fiber optic connectors 1100 (polarity) and also to align the fiber optic connectors to one another for insertion into the adapter. The carrier 1350 has a top 1352 and a bottom 1354 and the top 1352 has a cut out 1356 for each of the fiber optic connectors 1100, or the latch component (push-pull mechanism) 1104. Each of the cut outs 1356 has a cantilevered latch 1358 that protrudes into an opening 1360 of the carrier 1350. If the fiber optic connector 1100 is inserted into the carrier 1350 incorrectly (wrong polarity) then the fiber optic connector 1100 will not seat in the carrier 1350 correctly. The combination of the latch 1358 and the bottom 1354 prevent the fiber optic connectors 1100 from being inserted incorrectly. The cantilevered latches 1358 have a projection 1362 that extends into the opening 1360 (FIG. 32) and, when a fiber optic connector is inserted, rests in the opening 1274. The first surface 1364 of projection 1362 is chamfered and is to engage the chamfered front surface 1276 of the latch component (push-pull mechanism) 1104 during removal of the fiber optic connector 1100. The forward facing surface 1368 used to engage a rear surface of the housing 1102 when the carrier 1350 is used to insert the fiber optic connectors 1100 into the adapter 1400. Finally, the rear facing surface 1370 used to engage the generally flat rear surface 1278 of opening 1274 when the carrier 1350 is used to remove the fiber optic connectors 1100 from the adapter 1400.

Installation of the fiber optic connector 1100 into the carrier 1350 is illustrated in FIG. 33. Using the latch component (push-pull mechanism) 1104, the fiber optic connector 1100 is inserted into the carrier 1350 because the two rails 1262 to engage the stop surface 1166 thereby pushing the fiber-optic connector 1100 through the carrier 1350. The release ramp 1176 is disclosed in the opening 1268 of the front portion 1254. Similarly, the projection 1362 on the latch 1358 is disposed in the opening 1274 of the latch component (push-pull mechanism) 1104. This method is repeated for each of the fiber optic connectors 1100 that are to be inserted into the carrier 1350.

The fiber optic connectors 1100 can be inserted into the adapter 1400 is illustrated in FIG. 34. As with the prior embodiment, fiber optic connectors 1100 can be inserted into the adapter 1400 one at a time, or in multiples using the carrier 1350. Once the fiber of the connectors are aligned with the adapter 1400, a user can grasp the carrier 1350 to push fiber optic connectors 1100 into the opening 1402 of the adapter 1400. The forward facing surface 1368 on the projection 1362 engages the rear surface the housing 1102 and, more particularly, the rear surface of the central portion 1168 of the rail receiving portion 1164. That causes the latch 1172 with an engagement surface 1174 to deflect downward as it enters into the adapter 1400, and once it reaches the window 1404, latch 1172 will return and position itself in the window 1404.

Figure 35:
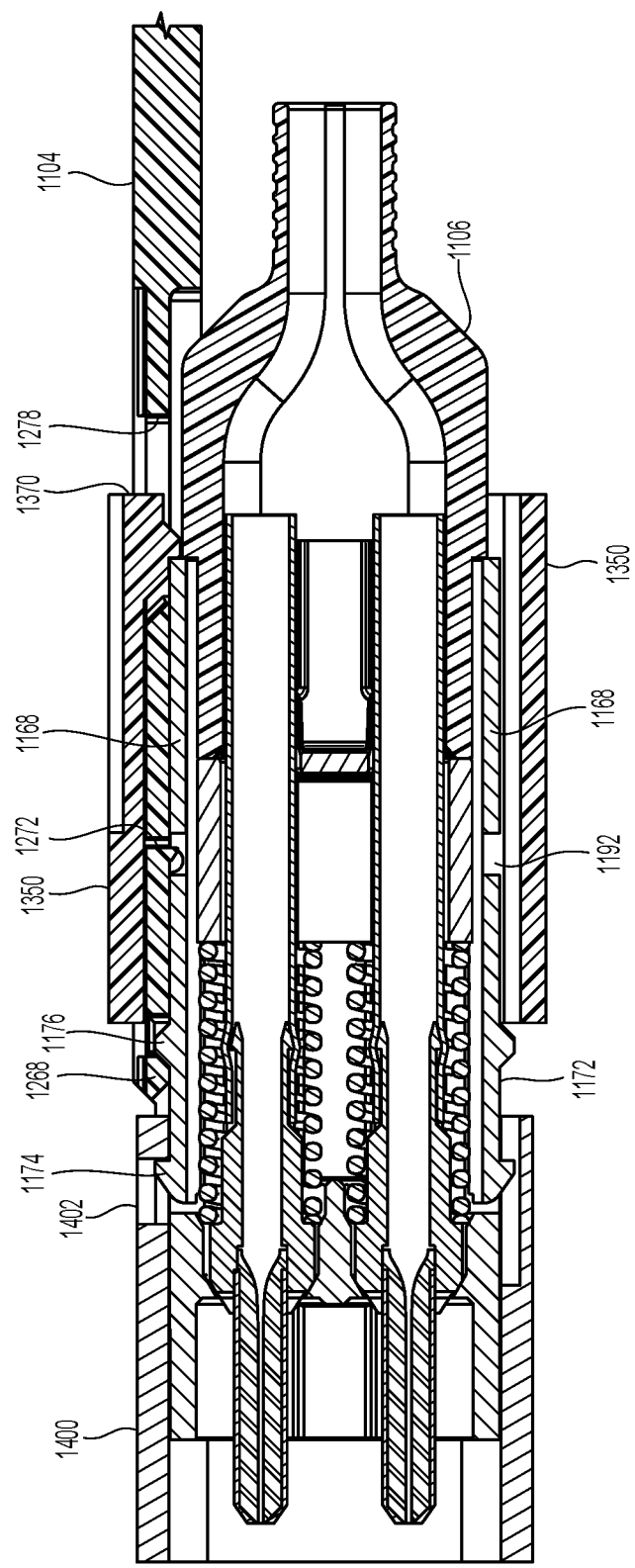
FIG. 35 a cross section view of fiber optic connector with a push-pull mechanism and crimp body in a carrier being removed from the adapter.

The removal of the fiber optic connectors 1100 be explained with reference to FIG. 35. Fiber optic connectors 1100 can be removed from the adapter 1400 by using the carrier 1354 or the latch component (push-pull mechanism) 1104. If the user is going to use the latch component (push-pull mechanism) 1104, the user will pull on the grasping portion 1260. This will cause the chamfered surface 1270 to engage the release ramp 1176. This will cause the latch 1172 to be biased downward freeing the engagement surface 1174 from the adapter window 1402. Further pulling on the latch component (push-pull mechanism) 1104 will pull the fiber optic connector 1100 from the adapter 1400 as the rearward facing surface 1272 engages surface 1194 in the opening 1192.

If the carrier 1350 is to be used, the carrier 1350 is moved rearwardly relative to the latch component (push-pull mechanism) 1104. The rear facing surface 1370 of the carrier 1350 engages the generally flat rear surface 1278 of opening 1274, causing the chamfered surface 1270 to engage the release ramp 1176. This releases all of the fiber optic connectors 1100 from the adapter 1400.

Figure 36:
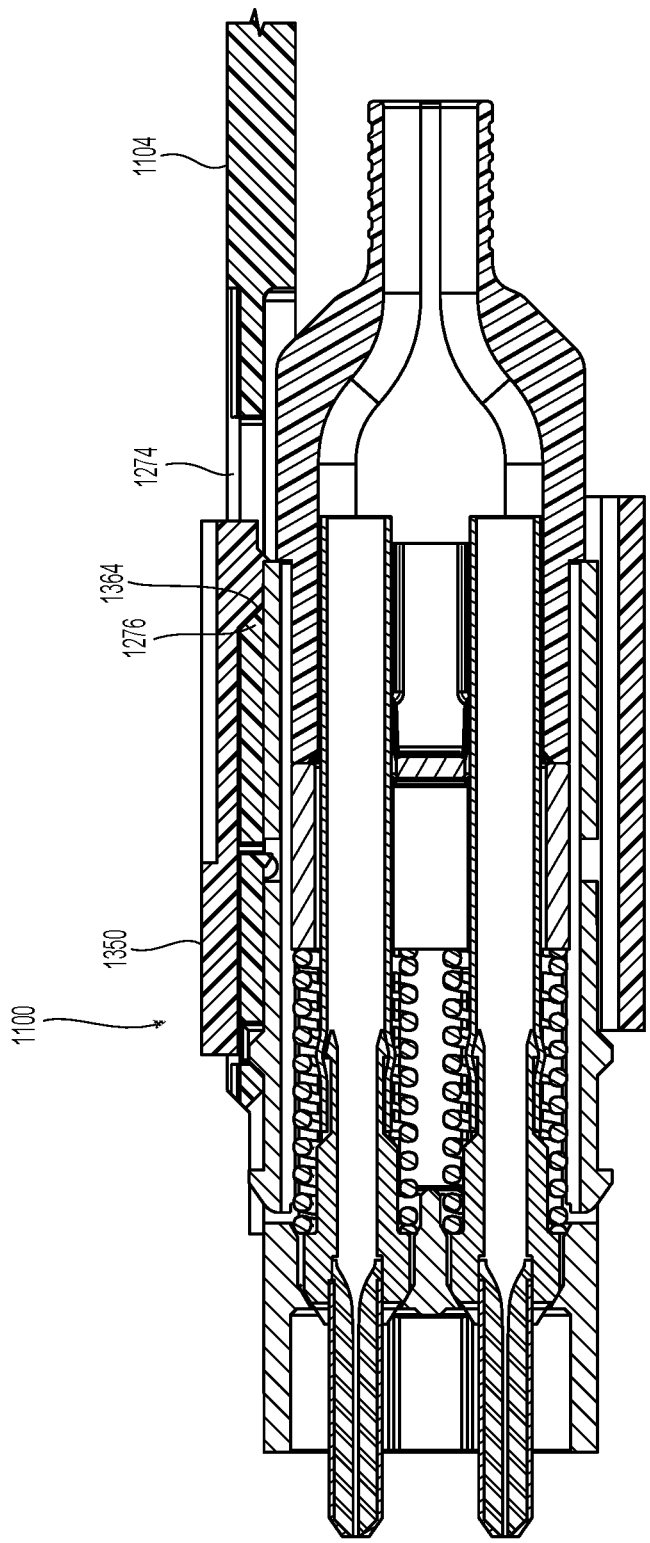
FIG. 36 is a cross section view of fiber optic connector with a push-pull mechanism and crimp body being removed from a carrier.

Finally, with reference to FIG. 36, the fiber optic connector 1100 can be removed from the carrier 1350. While holding the carrier 1350 steady, the user can pull on the latch component (push-pull mechanism) 1104, which causes the chamfered service 1276 in the opening 1274 to engage the first surface 1364 of projection 1362 of the carrier 1350. This will cause the cantilevered latch 1358 to deflect upward and out-of-the-way so that the latch component (push-pull mechanism) 1104 can be removed from the fiber optic connector.

Figure 37:
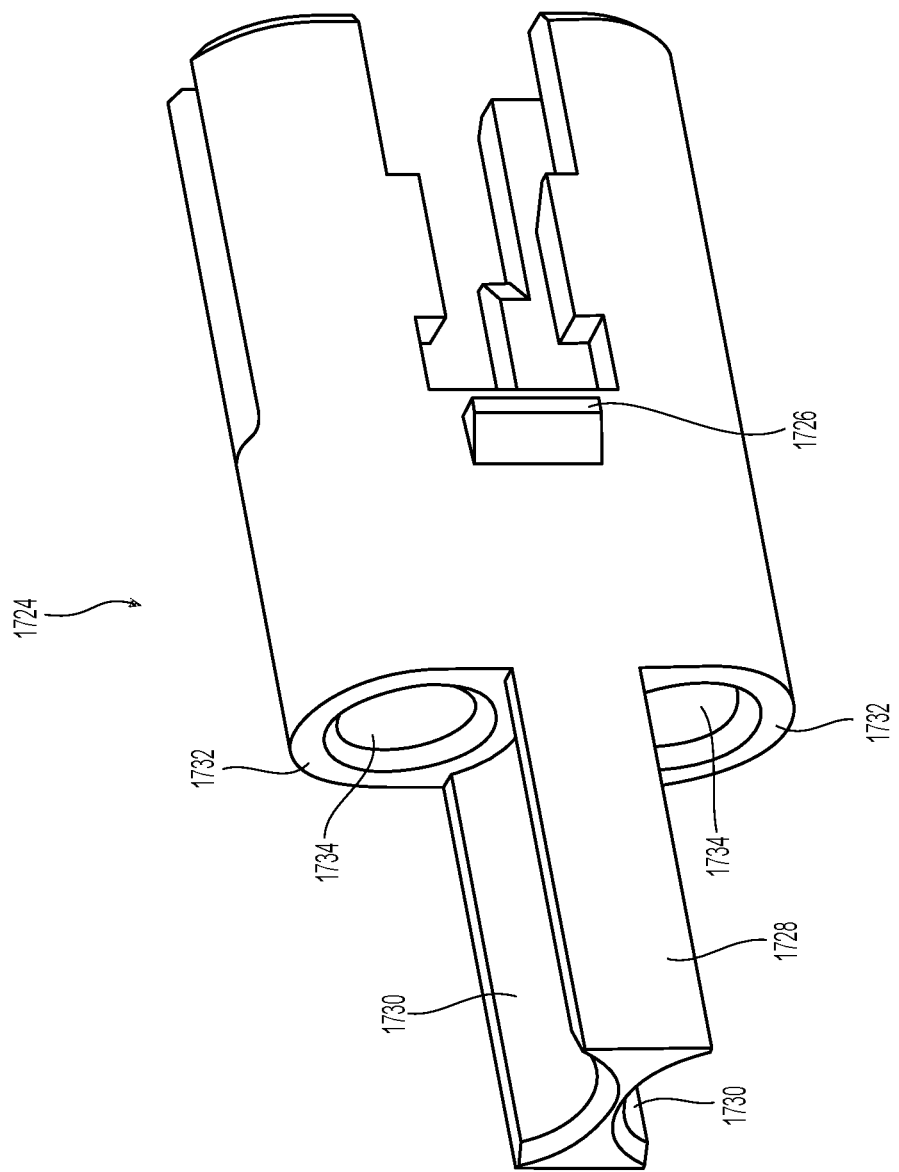
FIG. 37 is a perspective view of a second embodiment of a spring push according to the present invention.

An alternative spring push 1724 is illustrated in FIG. 37. The spring push 1724 has a pair of detents 1726 that frictionally engage an inside surface of the housing. This would eliminate the need for any openings in the housing as there are no latches to be secured. The spring push 1724 includes an extension 1728 with opposing sides 1730 that are semi-circular and provide more support to the springs 122. The extension 1728 terminates at two circular surfaces 1732 that engages the end of the springs 122. There are openings 1734 in the middle of the circular surfaces 1732 to receive lead-in tubes, that extend out the back of the spring push 1724. The back end of the spring push 1724 may also have a different connection system for a crimp band.

Figure 38:
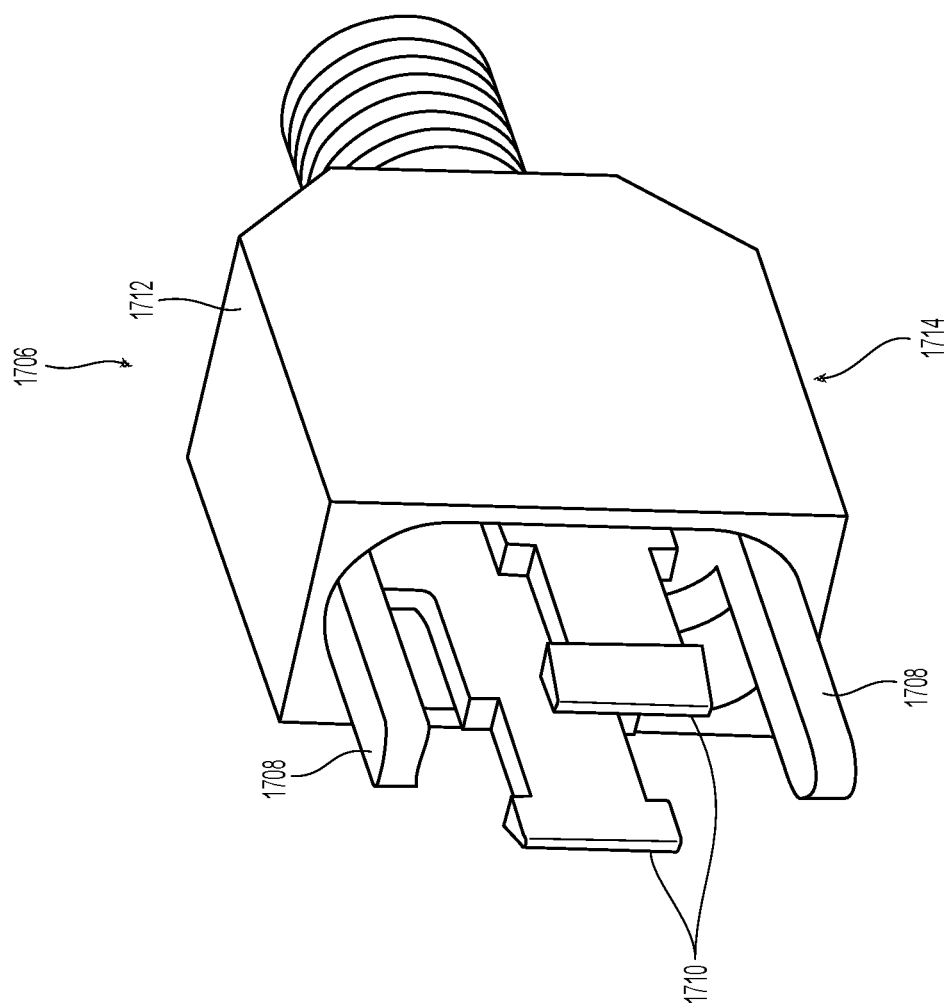
FIG. 38 is a perspective view of a second embodiment of a crimp body according to the present invention.

An alternative crimp body 1706 is illustrated in FIG. 38. The crimp body 1706 has two projections 1708 and two t-shaped extensions 1710 directed toward the front thereof. The crimp body 1706 provides the same function as the crimp bands in the two prior embodiments. While not shown, the top and bottom surfaces 1712 and 1714 may be configured to assist with the alignment of a push-pull mechanism. The crimp body 1706 also provides an internal space that allows for a smooth transition of the optical fibers through the openings 1734 and the lead-in tubes of any associated fiber optic connector.

A third embodiment of a fiber optic connector 2100 according to the present invention is illustrated in FIGS. 39-49. The fiber optic connector 2100 is similar to the other embodiments in that the majority of the parts of the fiber optic connector 2100 are the same, except that the latch component (push-pull mechanism) 2104 is a self-returning latch component (push-pull mechanism) 2104. That is, that if the user pulls rearwardly on the latch component (push-pull mechanism) 2104, then the latch component (push-pull mechanism) 2104 will return to its original position (a forward position) without having to be returned manually. In the prior embodiments, if the latch component (push-pull mechanism) 104, 1104 were to be pulled (to remove the fiber optic connectors from the adapter/carrier, then the latch component (push-pull mechanism) would remain in a rearward position. The present embodiment is biased such that the latch component (push-pull mechanism) 2104 will automatically return to the forward position.

Given the similarities between this embodiment of a fiber optic connector and those discussed above, particularly the first embodiment, only a discussion about the new components will be included. Thus, the discussion will be about the latch component (push-pull mechanism) 2104 and small changes to the housing 2102.

The latch component (push-pull mechanism) 2104 is illustrated in more detail in FIGS. 40-48. The latch component (push-pull mechanism) 2104 has a main body 2210 and a latch body 2212 that attaches to the main body 2210. See FIGS. 40-43. The main body 2210 has a front portion 2214, a middle portion 2216, and a rear portion 2218. Generally, the front portion 2214 is where the latch body 2212 attaches to the main body 2210 and provides for the latching of the fiber optic connector 2100 to an adapter and carrier as discussed above. The middle portion 2216 provides an area for the flexure member 2220 and to engage the latch component (push-pull mechanism) 2104. The rear portion 2218 has a grasping portion 2222 to allow a user to push and pull the latch component (push-pull mechanism) 2104 to engage and disengage the fiber optic connector 2100 from the adapter and/or carrier.

The front portion 2214 is divided into a first front portion 2230 and a second front portion 2232. The first front portion 2230 has two windows 2234 and 2236 and the second front portion 2232 has a window 2238. The second window 2236 of the first front portion 2230 and window 2238 are to receive a latch from the latch body 2212 therethrough. The first window 2234 (and the third window 2238 as well) is to receive a latch pad on the latch body 2212. An underside of the first portion 2214 has a groove 2240 on either side to receive an extended portion of the latch pads 2242,2244 from the latch body 2212 (see FIGS. 43 and 47) to secure the latch body 2212 to the main body 2210. The extended portion of the latch pads 2242,2244 (and thus the latch body 2212) are able to slide within the grooves 2240 to allow for the latching and unlatching the fiber optic connector 2100. The grooves 2240 should extend the length of the first portion 2214.

The second front portion 2232 has an upper surface 2246 that is higher than an upper surface 2248 of the first front portion 2214. This allows for the latching of a carrier and an adapter with the same device, as described above for the other embodiments. On the bottom side 2250 of the second front portion 2232 are two extensions 2252, 2254 that are a complementary configuration of a rail receiving portion of the housing 2102. See FIG. 41. The latch body 2212 also has the same rail portion configuration of two extensions 2256, 2258 on the bottom thereof. This allows the main body 2210 and the latch body 2212 to be slidingly attached to the rail receiving portion of the housing 2102. When the latch body 2212 is inserted into the first front portion 2230, a front surface 2260 of the two extensions 2252, 2254 provides a pushing surface by which the main body 2210 can push the latch body 2212 in the rail receiving portion. See also FIG. 44. The front surface 2262 of the two extensions 2256, 2258 also provides a pushing surface to be used against the stop surface 2264 of the housing 2102. See FIGS. 45 and 48. This allows for the user to exert a force on the latch component (push-pull mechanism) 2104 which is transferred through the main body 2210 to the latch body 2212 and to the housing 2102 to insert the fiber optic connector 2100 into a carrier and/or adapter.

The middle portion 2216 also has a window 2270 to receive a portion of the flexure member 2220, which extends from the latch body 2212. The middle portion 2216 also has on the bottom side 2250 a cavity or space 2272 to receive any other portions of the flexure member 2220 that may be needed.

Figure 42:
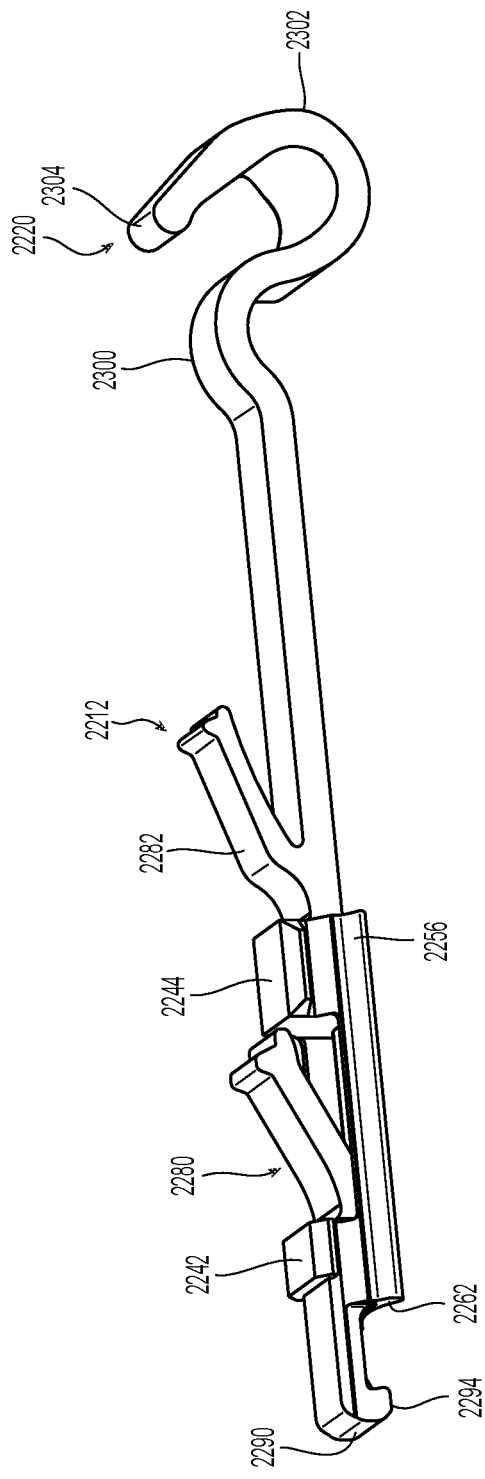
FIG. 42 is a right perspective view of the latch body with a flexure mechanism of FIG. 39.
Figure 43:
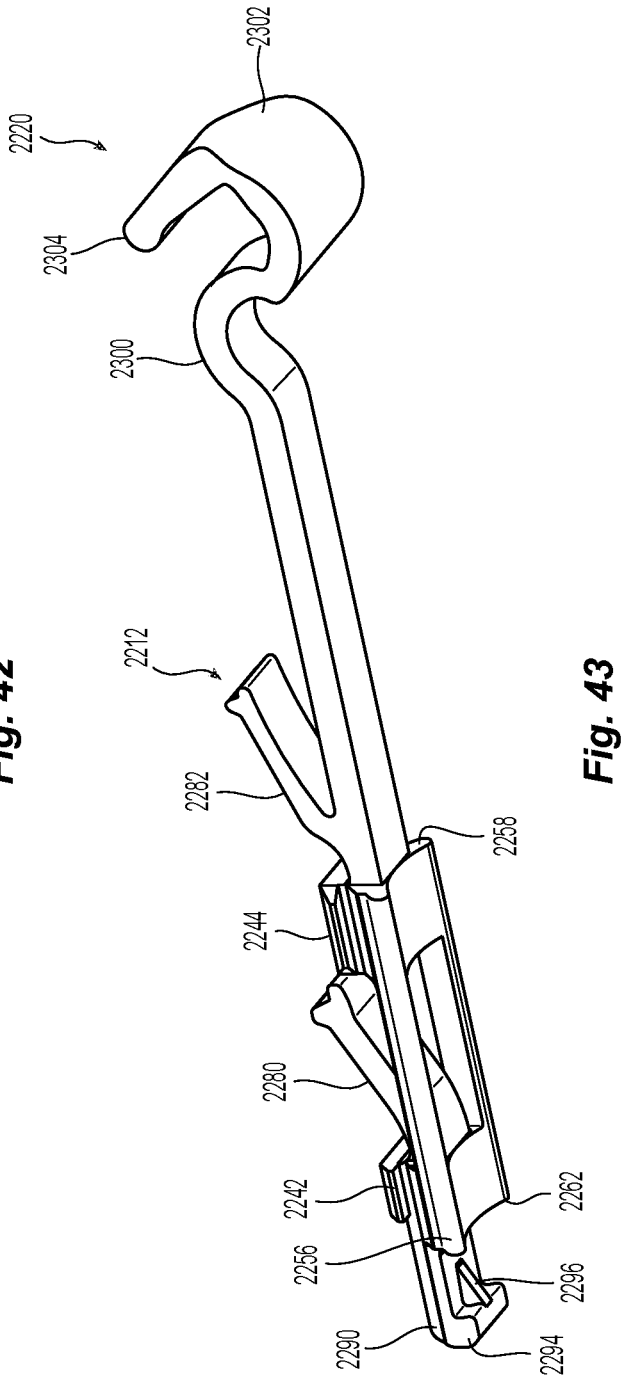
FIG. 43 is a right bottom perspective view of the latch body and flexure mechanism of FIG. 39
Figure 44:
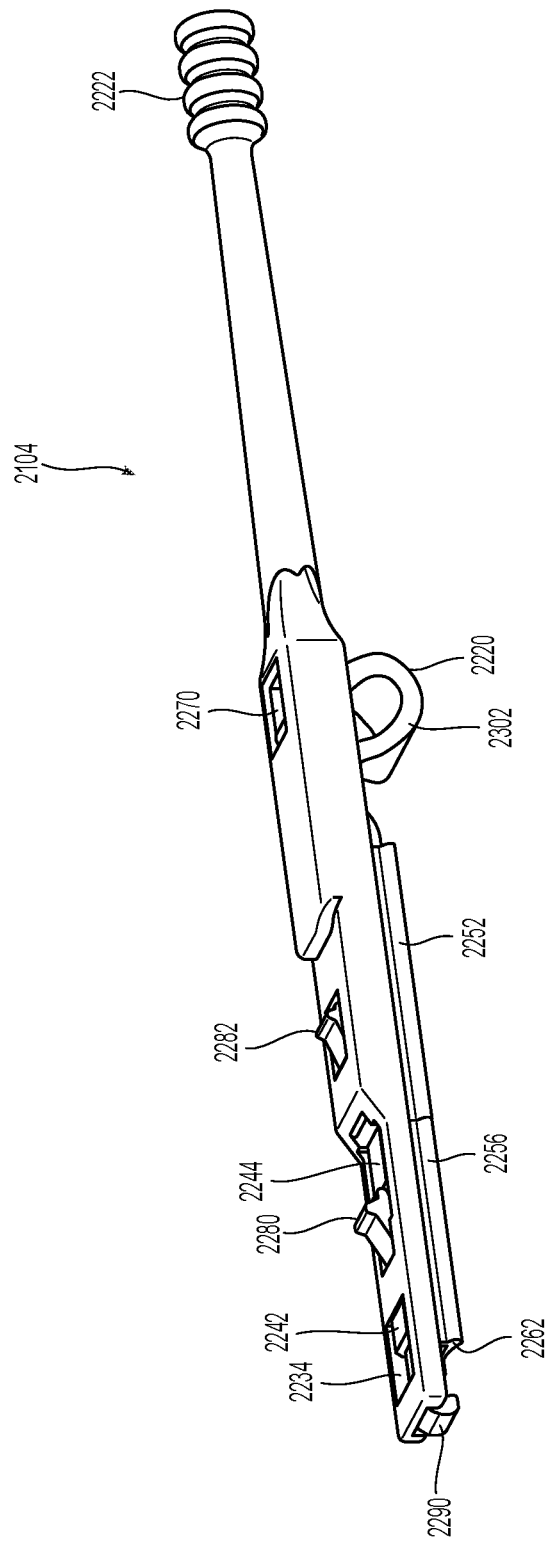
FIG. 44 is a right perspective view of the push-pull mechanism with latch body and flexure mechanism.

Turning to FIGS. 42 and 43, the latch body 2212 has two latches, an adapter latch 2280 and a carrier latch 2282. The latch body 2212 may only have one of the latches, depending upon its uses and the needs of the user. The adapter latch 2280 extends from a forward portion of the latch body 2212 and protrudes through window 2236 of the main body 2210. The carrier latch 2282 also extends from the latch body 2212, from a rear portion thereof, and protrudes through the window 2238 of the main body 2210. As is recognized from FIG. 44, the adapter latch 2280 does not rise as high as the carrier latch 2282 as in the other embodiments as well. The discussion from those embodiments with regard to the position and the composition of the ends of the latches is adopted for this embodiment as well.

The latch body 2212 has a connector latch 2290 as well. The connector latch 2290 extends forward beyond the front surface 2262 of the two extensions 2256, 2258 to engage a latch stop 2292 at the stop surface 2264. The connector latch 2290 has a downward curling portion 2294 that provides a surface to engage the latch stop 2292. The connector latch 2290 may also have a latch rib 2296 that connects the curling portion 2294 to the remainder of the connector latch 2290. The latch stop 2292 may also have a groove 2298 there-in to receive the latch rib 2296. It is the connector latch 2290 that retains the latch body 2212 with the housing 2102. As described below in more detail, when the latch component (push-pull mechanism) 2104 is pulled rearwardly, the connection of the connector latch 2290 with the housing 2102 allows the main body 2210 to move relative to the latch body 2212.

Figure 39:
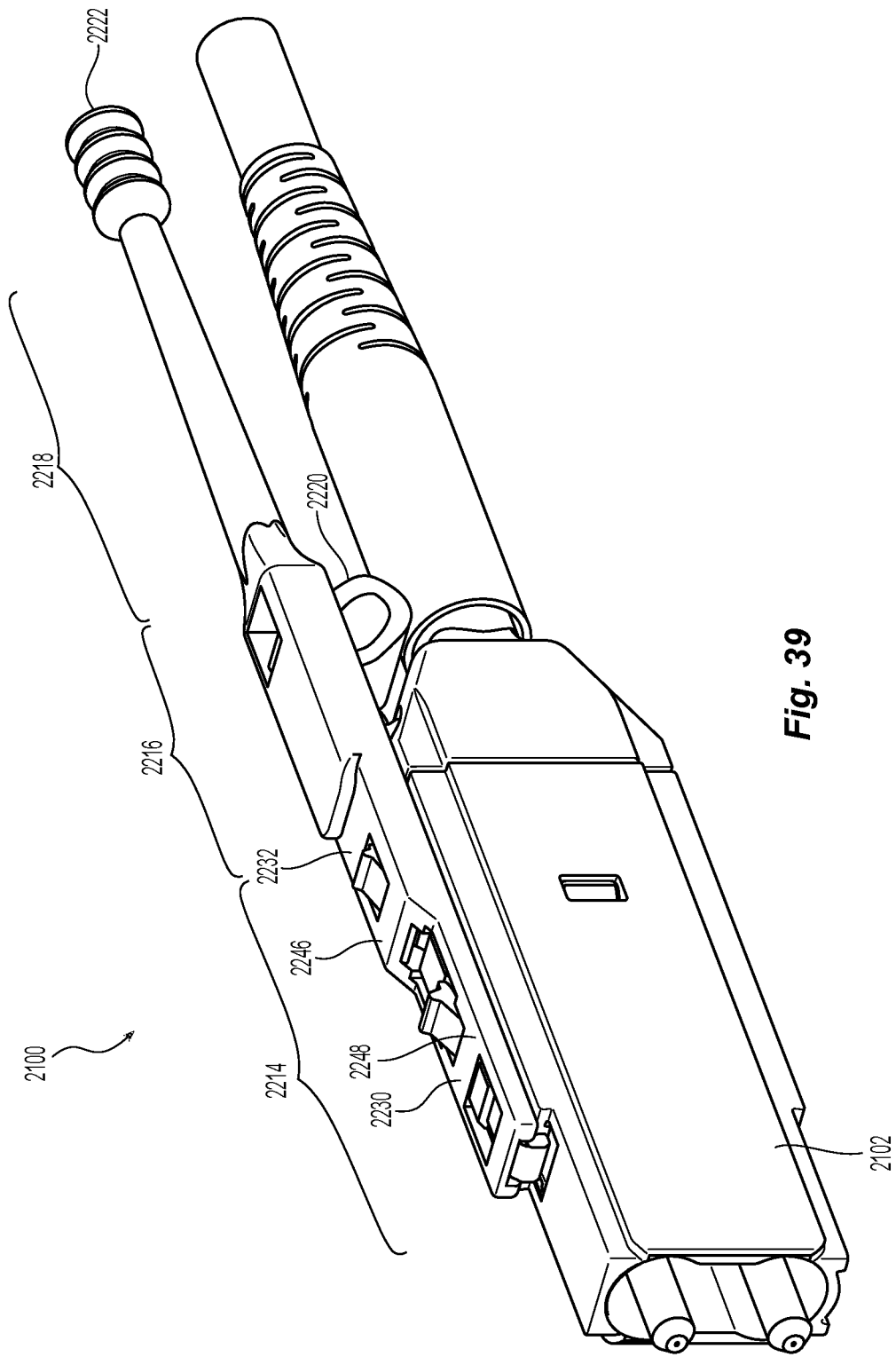
FIG. 39 is an elevational view of another embodiment of a fiber optic connector with a push-pull mechanism, crimp body, and boot according to the present invention.
Figure 40:
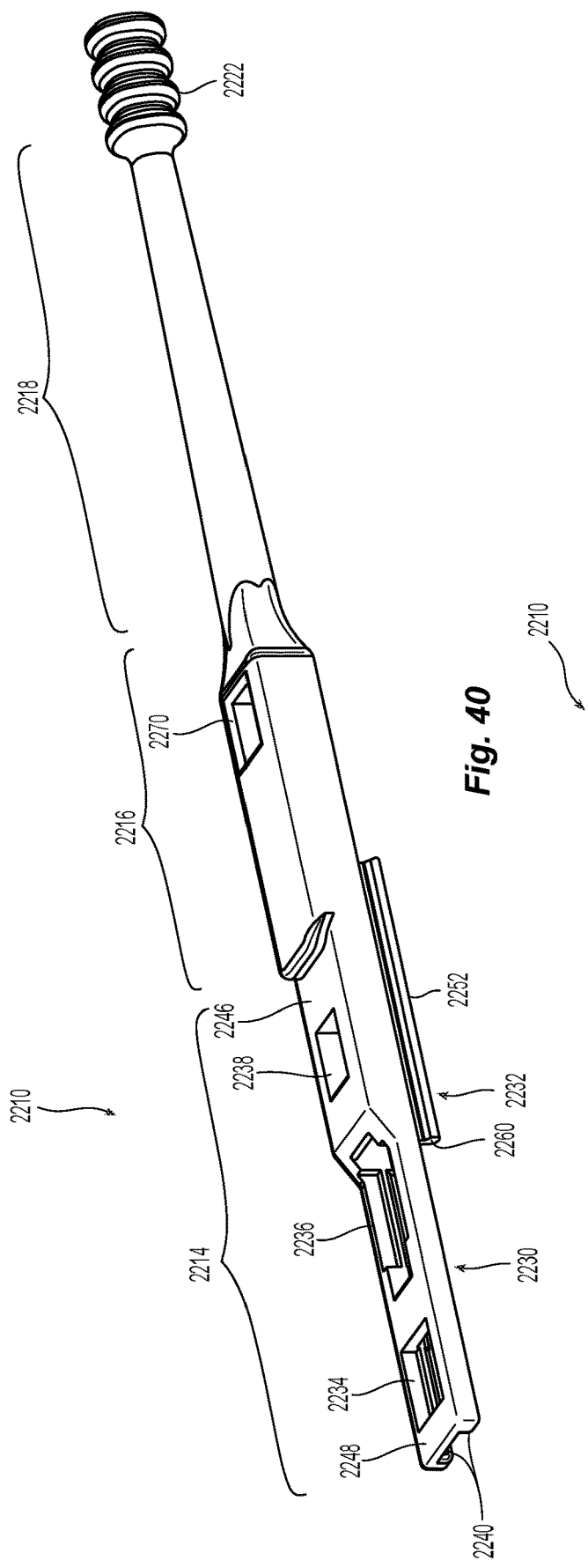
FIG. 40 is a right top perspective view of the push-pull mechanism of FIG. 39.
Figure 41:
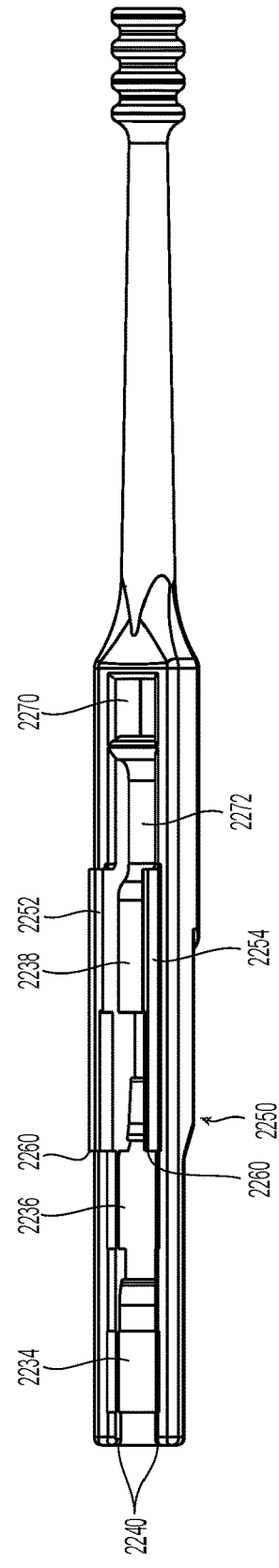
FIG. 41 is a bottom perspective view of the push-pull mechanism of FIG. 39.
Figure 45:
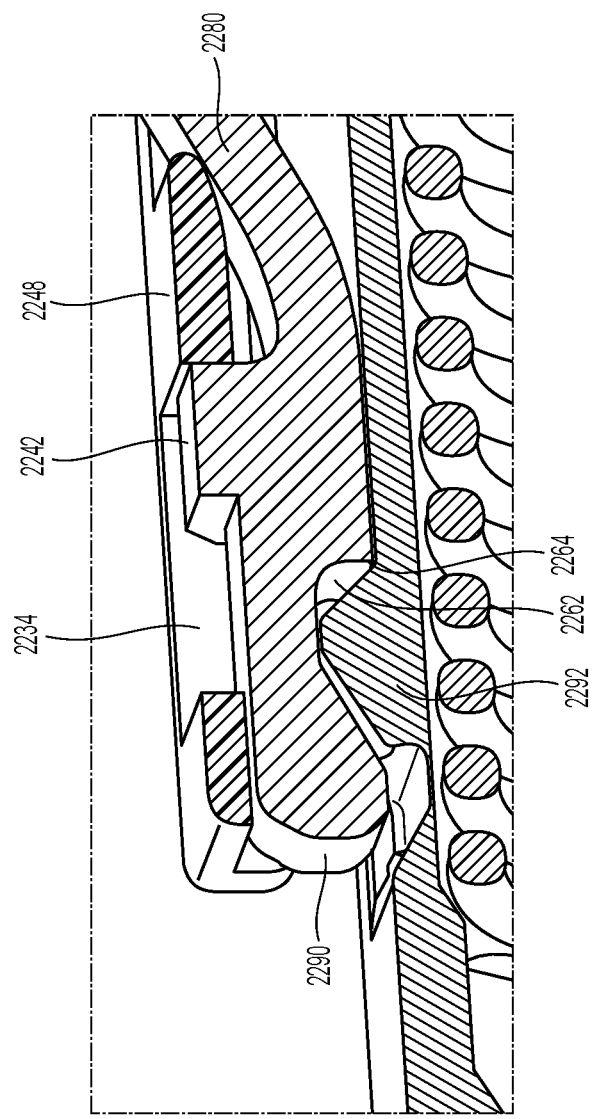
FIG. 45 is an enlarged cross sectional view of a portion of the push-pull mechanism, latch body, and fiber optic connector of FIG. 39.
Figure 48:
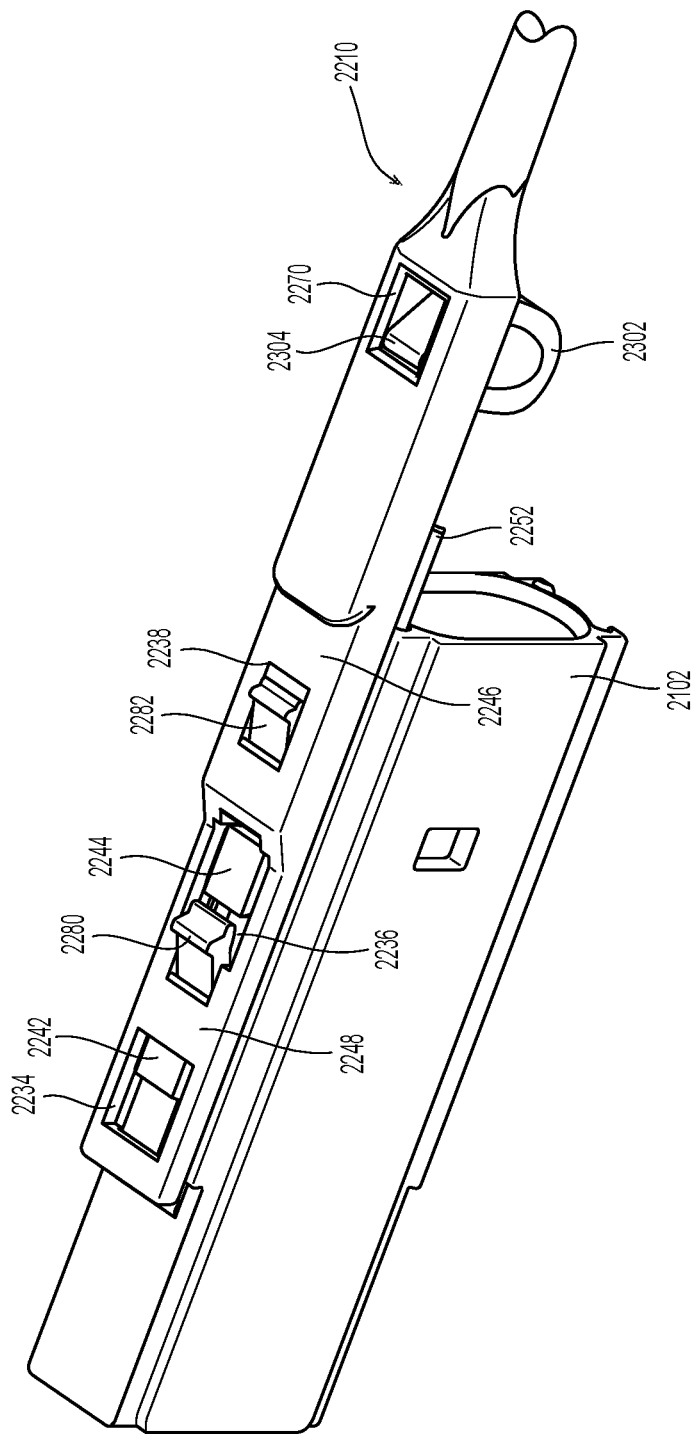
FIG. 48 is a top perspective view of the push-pull mechanism, latch body, and housing.

The latch body 2212 also has two latch pads 2242,2244. The latch pads 2242,2244 have two functions: first to help retain the latch body 2212 in the main body 2210, and second to limit the movement of the latch component (push-pull mechanism) 2104 relative to the housing 2102. As seen in FIGS. 39, 45, and 48, the first latch pad 2242 is disposed within the first window 2234 of the main body 2210. It is evident that as the main body 2210 is pulled relative to the latch body 2212, the first latch pad 2242 will slide relative to the first window 2234 only for certain distance before it engages a portion of the main body 2210. This is true with regard to the second latch pad 2244 as well. Second latch pad 2244 is disposed in the second window 2236 along with the carrier latch 2282. As the main body 2210 is pulled relative to the latch body 2212, the main body 2210 pushes on the adapter latch 2280 (and the carrier latch 2282) in downward out of the window 2236. As the main 2210 body continues in a rearward direction, it will engage the front end of the second pad 2244, prohibiting any further movement of the main body 2210 to the latch body 2212. See FIG. 48.

Figure 46:
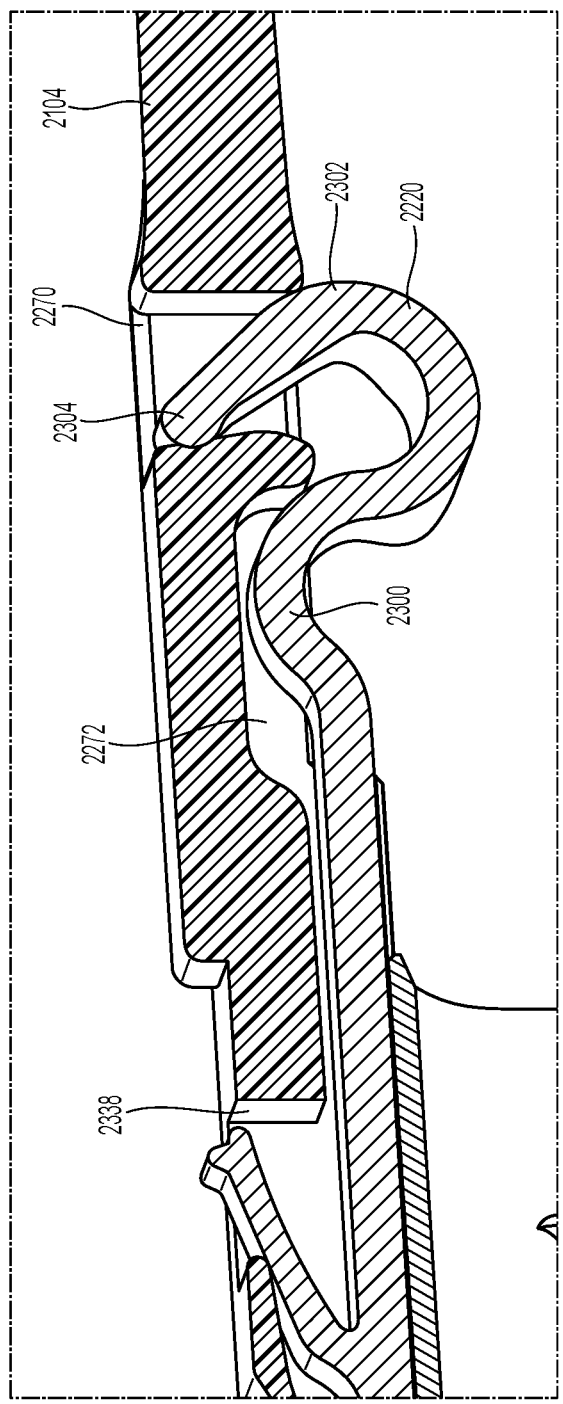
FIG. 46 is enlarged cross sectional view of a portion of the push-pull mechanism, latch body, and fiber optic connector of FIG. 41 at a different location from FIG. 47.
Figure 47:
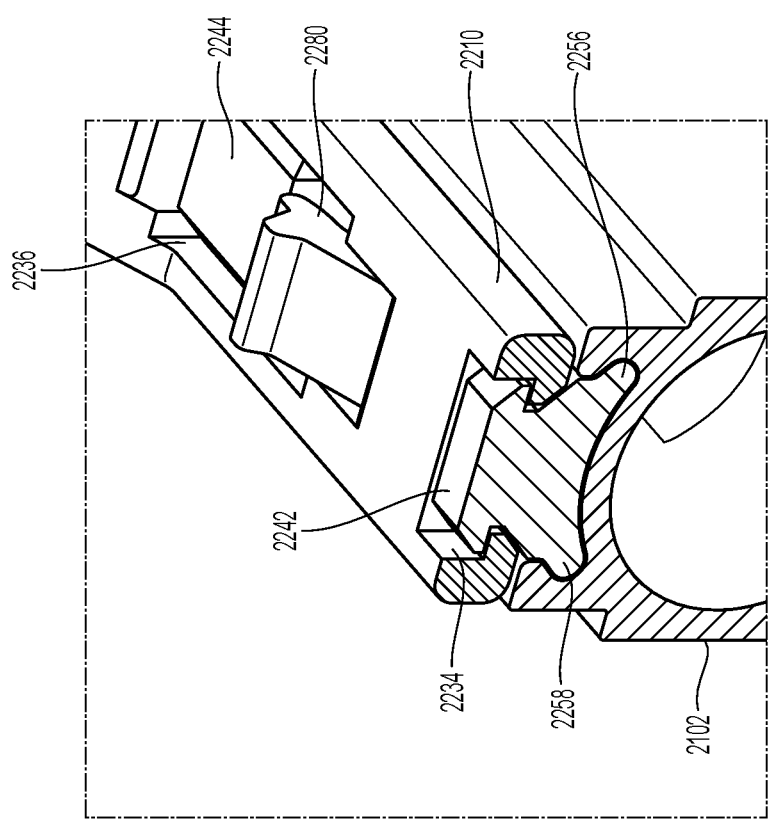
FIG. 47 is a cross sectional view of the push-pull mechanism, latch body, and housing.

Turning to FIGS. 42, 43, 46, the flexure member 2220 will now be described. With particular reference to FIGS. 42 and 43, the flexure member 2220 extends from the rear portion of the latch body 2212. In the embodiment illustrated in the figures, the flexure member 2220 has a first curved portion 2300 and a second curved portion 2302. Second curved portion 2302 terminates at terminal end 2304. The terminal end 2304 is preferably disposed with in the third window 2270 and also preferably makes contact with at least one of the surfaces that define window 2270. See FIG. 46. The first curve portion 2300 also partially resides in the cavity or space 2272. It is also possible that the flexure member 2220 only has one of the two curved portions 2300,2302, depending upon the amount of force required to main body 2210 relative to the latch body 2212.

As the main body 2210 is pulled rearwardly relative to the latch body 2212, the latches 2280, 2282 are moved downward (as also described above) releasing the fiber optic connector 2100 from any adapter and/or carrier. During this movement, the flexure member 2220 is put under tension (the curved portions begin to straighten out or alter from the shape in their state) as the terminal end 2304 presses against the wall of opening 2270. Once the fiber optic connector 2100 is free from the adapter and/or carrier and the user releases the grasping portion 2222, the main body 2210 will return to its original state as the flexure member pulls on the main body 2210. See FIG. 39. The flexure member 2220 acts as a self-return mechanism for the latch component (push-pull mechanism) 2104. Accordingly, there are other self-returning mechanisms that may be used instead of the particular embodiment of the flexure member 2220. For example, a spring could be used to bias the main body 2210 relative to the latch body 2212.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed:

1. An adapter for small form factor duplex fiber optic connectors, the adapter comprising:
   a main body extending between a front end and a rear end and having an opening extending therebetween formed by a top, a bottom and two side walls,
   wherein the top, the bottom, and the two side walls define a generally rectangular perimeter of the main body, the two side walls defining a width of the main body and the top and the bottom defining a height of the main body;
   at least two channels within the opening configured to respectively receive at least two duplex fiber-optic connectors side-by-side, each of the at least two duplex fiber-optic connectors having a housing with a length along a longitudinal axis between a front end and a rear end of the housing, and a rectangular cross section orthogonal to the longitudinal axis,
   wherein the height of the main body is more than a width of each channel and,
   wherein two ferrule sleeves are oriented in each channel in a vertically stacked arrangement such that the two ferrule sleeves are spaced apart from each other along the height of the adapter in a direction between the top and the bottom of the main body; and
   a top alignment feature on the top of the main body and a bottom alignment feature on the bottom of the main body for each channel of the at least two channels, the top and the bottom alignment feature configured to orient a respective one of the at least two duplex fiber-optic connectors into or out of the main body.

2. The adapter of claim 1, wherein between the two side walls and between the at least two channels side-by-side, the main body is without internal walls along the width of the main body.

3. The adapter of claim 1, wherein the at least two channels includes at least three channels.

4. The adapter of claim 1, wherein the at least two channels includes four channels.

5. The adapter of claim 1, further comprising at least one cutout on the top or the bottom of the main body.

6. The adapter of claim 1, wherein the main body has an outward facing surface to contact a carrier, the carrier configured to hold at least one of the at least two duplex fiber-optic connectors.

7. The adapter of claim 1, wherein the main body has a small form-factor pluggable (SFP) footprint.

8. The adapter of claim 1, wherein the main body has a quad small form factor pluggable (QSFP) footprint.

9. The adapter of claim 1, wherein the main body is substantially rectangular.

10. The adapter of claim 1, wherein one of the at least two channels is configured to receive only one of the at least two duplex fiber-optic connectors simultaneously or consecutively with another one of the at least two duplex fiber-optic connectors in the other one of the at least two channels.

11. The adapter of claim 1, wherein the main body includes at least two forward facing surfaces within each of the at least two channels, respectively, for latching the at least two duplex fiber-optic connectors.

12. An adapter for small form factor duplex fiber optic connectors, the adapter comprising:
    a main body extending between a front end and a rear end and having an opening extending therebetween formed by a top, a bottom and two side walls,
    wherein the top, the bottom, and the two side walls define a generally rectangular perimeter of the main body, the two side walls defining a width of the main body and the top and the bottom defining a height of the main body;
    at least two channels within the opening configured to respectively receive at least two duplex fiber-optic connectors side-by-side, each of the at least two duplex fiber-optic connectors having a housing with a length along a longitudinal axis between a front end and a rear end of the housing, and a rectangular cross section orthogonal to the longitudinal axis,
    wherein the height of the main body is more than a width of each channel and,
    wherein two ferrule sleeves are oriented in each channel in a vertically stacked arrangement such that each of the two ferrule sleeves is at a different distance from the top than the bottom of the main body along the height of the adapter; and
    a top alignment feature on the top of the main body and a bottom alignment feature on the bottom of the main body for each channel of the at least two channels, the top and the bottom alignment feature configured to orient a respective one of the at least two duplex fiber-optic connectors into or out of the main body.

13. The adapter of claim 12, wherein between the two side walls and between the at least two channels side-by-side, the main body is without internal walls along the width of the main body.

14. The adapter of claim 12, wherein the at least two channels includes at least three channels.

15. The adapter of claim 14, wherein the at least two channels includes four channels.

16. The adapter of claim 12, further comprising at least one cutout on the top or the bottom of the main body.

17. The adapter of claim 12, wherein the main body has an outward facing surface to contact a carrier, the carrier configured to hold at least one of the at least two duplex fiber-optic connectors.

18. The adapter of claim 12, wherein the main body has a small form-factor pluggable (SFP) footprint or a quad small form factor pluggable (QSFP) footprint.

19. The adapter of claim 12, wherein the main body includes at least two forward facing surfaces within each of the at least two channels, respectively, for latching the at least two duplex fiber-optic connectors.

20. An adapter for small form factor duplex fiber optic connectors, the adapter comprising:
    a main body extending between a front end and a rear end and having an opening extending therebetween formed by a top, a bottom and two opposite side walls,
    wherein the top, the bottom, and the two side walls define a generally rectangular perimeter of the main body, the two opposite side walls defining a width of the main body and the top and the bottom defining a height of the main body;
    at least two channels within the opening configured to respectively receive at least two duplex fiber-optic connectors side-by-side, each of the at least two duplex fiber-optic connectors having a housing with a length along a longitudinal axis between a front end and a rear end of the housing, and a rectangular cross section orthogonal to the longitudinal axis, wherein the height of the main body is more than a width of each channel and, wherein two ferrule sleeves are oriented in each channel in a vertically stacked arrangement in a direction between the top and the bottom of the main body such that a first ferrule sleeve is at a first distance from a first side wall of the two side walls and at a second distance from a second side wall of the two side walls, and such that a second ferrule sleeve is also at the first distance from the first side wall and at the second distance from the second side wall of the main body;

a top alignment feature on the top of the main body and a bottom alignment feature on the bottom of the main body for each channel of the at least two channels, the top and the bottom alignment feature configured to orient a respective one of the at least two duplex fiber-optic connectors into or out of the main body; and at least two forward facing surfaces between the front end and the rear end of the main body within each of the at least two channels, respectively, for latching the at least two duplex fiber-optic connectors.

* * * * *